US012678716B2

(12) United States Patent
Kamath et al.

(10) Patent No.: US 12,678,716 B2
(45) Date of Patent: Jul. 14, 2026

(54) REGENERATIVE MEDIA FILTER WITH FLOW DIFFUSER

(71) Applicant: Evoqua Water Technlogies LLC, Pittsburgh, PA (US)

(72) Inventors: Krishna Kamath, Billerica, MA (US); Li-Shiang Liang, Harvard, MA (US); Joshua Griffis, Ashburnham, MA (US); Joseph Crognale, Dedham, MA (US); Alan Charles Womer, Templeton, MA (US); Benjamin Satterfield, Ayer, MA (US); Suthahar Manoharan, Mettur (IN)

(73) Assignee: Evoqua Water Technologies LLC, Pittsburgh, PA (US)

( * ) Notice: Subject to any disclaimer, the term of this patent is extended or adjusted under 35 U.S.C. 154(b) by 499 days.

(21) Appl. No.: 18/016,320

(22) PCT Filed: Jul. 13, 2020

(86) PCT No.: PCT/US2020/041778
§ 371 (c)(1),
(2) Date: Jan. 13, 2023

(87) PCT Pub. No.: WO2022/015280
PCT Pub. Date: Jan. 20, 2022

(65) Prior Publication Data
US 2023/0271113 A1     Aug. 31, 2023

(51) Int. Cl.
*B01D 24/08*     (2006.01)
*B01D 24/38*     (2006.01)
(Continued)

(52) U.S. Cl.
CPC .............. *B01D 24/08* (2013.01); *B01D 24/38* (2013.01); *C02F 1/001* (2013.01); *C02F 1/283* (2013.01);
(Continued)

(58) Field of Classification Search
None
See application file for complete search history.

(56) References Cited

U.S. PATENT DOCUMENTS 171,056 A * 12/1875 Sinclaire ................ B01D 35/18
351/63
471,811 A * 3/1892 Deutsch ................. B01D 24/14
210/150
(Continued)

FOREIGN PATENT DOCUMENTS

AU     2019431873 A1     9/2021
AU     2020458432 A1 *   3/2023    .............. C02F 1/281
(Continued)

OTHER PUBLICATIONS

International Search Report, corresponding to PCT/US20/41778, dated Oct. 7, 2020.
(Continued)

*Primary Examiner* — Robert J Popovics

(57) ABSTRACT

Water filtration systems are disclosed. The water filtration systems include a regenerative media filter vessel comprising a housing, an inlet, and an outlet, a diffuser fluidly connected to the inlet and disposed within the regenerative media filter vessel, and at least one pump configured to direct water through the water filtration system. The housing of the regenerative media filter vessel comprises a concave lower portion centered about a vertical axis of the vessel. The position of the diffuser along a height of the regenerative media filter vessel is determined by at least a ratio of the height to an inner diameter of the regenerative media filter
(Continued)

vessel and a radius of curvature of the concave lower portion. A regenerative media filter including a diffuser having asymmetrically spaced apertures is also disclosed.

10 Claims, 31 Drawing Sheets

(51) Int. Cl.
| | |
|---|---|
| C02F 1/00 | (2023.01) |
| C02F 1/28 | (2023.01) |
| C02F 103/42 | (2006.01) |
| G06F 30/17 | (2020.01) |
| G06F 30/28 | (2020.01) |
| G06F 113/08 | (2020.01) |

(52) U.S. Cl.
CPC .............. *G06F 30/17* (2020.01); *G06F 30/28* (2020.01); *C02F 2103/42* (2013.01); *G06F 2113/08* (2020.01)

(56) References Cited

U.S. PATENT DOCUMENTS

| | | | | |
|---|---|---|---|---|
| 654,592 | A * | 7/1900 | Barr | B01D 29/15 |
| | | | | 210/411 |
| 926,038 | A | 6/1909 | True | |
| 1,040,342 | A | 10/1912 | Johnson | |
| 1,177,394 | A | 3/1916 | Dickie | |
| 1,203,835 | A * | 11/1916 | Zahm | C02F 1/003 |
| | | | | 210/85 |
| 1,405,406 | A * | 2/1922 | Genter | B01D 24/4673 |
| | | | | 210/436 |
| 1,510,863 | A | 10/1924 | Rose | |
| 1,696,735 | A * | 12/1928 | Scoville | B01D 29/39 |
| | | | | 210/418 |
| 1,706,400 | A * | 3/1929 | Diamond | B01D 29/11 |
| | | | | 210/323.2 |
| 1,771,928 | A * | 7/1930 | Jung | B01D 29/92 |
| | | | | 210/220 |
| 1,873,594 | A * | 8/1932 | Johnson | C02F 1/42 |
| | | | | 210/436 |
| 1,992,101 | A * | 2/1935 | Leslie | B01D 29/46 |
| | | | | 210/488 |
| 2,083,578 | A * | 6/1937 | Roberts | C10G 73/025 |
| | | | | 210/772 |
| 2,098,903 | A * | 11/1937 | Kemper | C02F 1/42 |
| | | | | 210/291 |
| 2,100,266 | A | 11/1937 | Perry | |
| 2,101,961 | A * | 12/1937 | Kemper | C02F 1/42 |
| | | | | 210/275 |
| 2,154,434 | A * | 4/1939 | Bond, Jr. | C10G 25/00 |
| | | | | 208/290 |
| 2,167,236 | A * | 7/1939 | Gieseler | B01D 46/76 |
| | | | | 55/304 |
| 2,301,430 | A * | 11/1942 | Malanowski | B01D 29/52 |
| | | | | 210/497.1 |
| 2,426,618 | A * | 9/1947 | Klein | B01D 25/26 |
| | | | | 210/486 |
| 2,439,463 | A | 4/1948 | Gebauer | |
| 2,468,603 | A * | 4/1949 | Pew | B01D 29/114 |
| | | | | 210/323.2 |
| 2,475,561 | A * | 7/1949 | Cooperider et al. | B01D 33/21 |
| | | | | 210/324 |
| 2,480,653 | A | 8/1949 | Hoefer, Jr. | |
| 2,487,769 | A * | 11/1949 | Ebert | B01D 29/52 |
| | | | | 210/411 |
| 2,523,793 | A * | 9/1950 | Vance | B01D 17/0202 |
| | | | | 210/DIG. 5 |
| 2,562,699 | A * | 7/1951 | Cooperson | B01D 37/02 |
| | | | | 210/411 |
| 2,570,132 | A * | 10/1951 | Koupal | B01D 29/114 |
| | | | | 210/323.1 |

| | | | | |
|---|---|---|---|---|
| 2,578,636 | A * | 12/1951 | Smith | B01D 29/72 |
| | | | | 210/791 |
| 2,600,458 | A * | 6/1952 | Ackley | B01D 29/114 |
| | | | | 210/135 |
| 2,605,903 | A * | 8/1952 | Schuller | B01D 35/00 |
| | | | | 210/399 |
| 2,620,892 | A * | 12/1952 | Stover | B01D 53/26 |
| | | | | 210/DIG. 6 |
| 2,674,376 | A * | 4/1954 | Swan | B01D 29/114 |
| | | | | 210/435 |
| 2,693,882 | A * | 11/1954 | Ebert | B01D 29/52 |
| | | | | 210/345 |
| 2,710,099 | A * | 6/1955 | Kalinske | B01D 29/48 |
| | | | | 210/323.2 |
| 2,731,107 | A * | 1/1956 | Hersey, Jr. | B01D 29/15 |
| | | | | 55/284 |
| 2,742,158 | A * | 4/1956 | Schuller | B01D 29/52 |
| | | | | 210/345 |
| 2,743,230 | A * | 4/1956 | Meyer | C02F 1/42 |
| | | | | 210/281 |
| 2,744,632 | A * | 5/1956 | Gardes | B01D 29/54 |
| | | | | 210/323.2 |
| 2,754,005 | A | 7/1956 | Tursky | |
| 2,757,799 | A * | 8/1956 | Ritchie | B01D 37/00 |
| | | | | 210/345 |
| 2,768,750 | A * | 10/1956 | Kryzer | C02F 1/42 |
| | | | | 210/291 |
| 2,780,363 | A * | 2/1957 | Pew | B01D 29/66 |
| | | | | 210/411 |
| 2,784,846 | A * | 3/1957 | Ebert | B01D 29/52 |
| | | | | 210/456 |
| 2,819,800 | A * | 1/1958 | Goodloe | B01D 25/00 |
| | | | | 210/488 |
| 2,834,473 | A * | 5/1958 | Battey | B01D 29/66 |
| | | | | 210/333.01 |
| 2,848,112 | A * | 8/1958 | Hass | B01D 29/66 |
| | | | | 210/333.01 |
| 2,854,142 | A * | 9/1958 | Baker | B01D 29/15 |
| | | | | 210/342 |
| 2,862,622 | A * | 12/1958 | Jones | B01D 29/66 |
| | | | | 210/411 |
| 2,872,044 | A * | 2/1959 | Kasten | B01D 25/00 |
| | | | | 210/488 |
| 2,887,228 | A * | 5/1959 | Harlan | B01D 35/027 |
| | | | | 210/411 |
| 2,889,933 | A * | 6/1959 | Brundage | B01D 29/52 |
| | | | | 210/323.2 |
| 2,901,115 | A * | 8/1959 | Ledford | B01D 35/16 |
| | | | | 210/785 |
| 2,909,285 | A * | 10/1959 | Besler | B01D 29/94 |
| | | | | 210/330 |
| 2,912,110 | A * | 11/1959 | Stoltenberg | B01D 25/164 |
| | | | | 210/90 |
| 2,946,445 | A | 7/1960 | Tursky | |
| 2,954,873 | A * | 10/1960 | Davis | B01D 29/52 |
| | | | | 210/411 |
| 2,981,416 | A * | 4/1961 | Lawlor | B01D 29/15 |
| | | | | 210/411 |
| 3,011,643 | A * | 12/1961 | Mccoy | B01D 24/004 |
| | | | | 210/167.13 |
| 3,016,984 | A | 1/1962 | Getzin | |
| 3,034,652 | A * | 5/1962 | Hobson, Jr. | B01D 29/52 |
| | | | | 210/232 |
| 3,042,214 | A * | 7/1962 | Arvanitakis | B01D 35/16 |
| | | | | 210/330 |
| 3,050,858 | A * | 8/1962 | Giesse | B01D 35/14 |
| | | | | 210/86 |
| 3,055,290 | A * | 9/1962 | Arvanitakis | B01D 33/0183 |
| | | | | 210/407 |
| 3,060,693 | A | 10/1962 | Taylor | |
| 3,080,060 | A * | 3/1963 | Blumenkranz | B01D 29/114 |
| | | | | 210/429 |
| 3,100,190 | A * | 8/1963 | Hobson, Jr. | B01D 29/52 |
| | | | | 210/497.1 |
| 3,117,233 | A * | 1/1964 | Mittelberger | B01D 35/14 |
| | | | | 96/417 |

(56)                  References Cited

U.S. PATENT DOCUMENTS 3,149,072 A * 9/1964 Silverman .............. B01D 29/66
                                           210/488
3,155,613 A * 11/1964 Felix ...................... B01D 35/20
                                           210/232
3,169,109 A * 2/1965 Hirs ........................ B01D 35/12
                                           210/138
3,170,873 A * 2/1965 May .................... B01D 17/045
                                           210/323.2
3,200,067 A   8/1965 Levendusky
3,204,766 A * 9/1965 Schmidt, Jr. ......... B01D 29/606
                                           210/90
3,212,643 A * 10/1965 Zievers ................. B01D 29/72
                                           55/300
3,225,933 A * 12/1965 Berline ................. B01D 29/15
                                           40/518
3,240,699 A * 3/1966 Duff ........................ B01J 49/90
                                           210/275
3,244,197 A   4/1966 Stilwell
3,244,286 A * 4/1966 Borre .................... B01D 29/52
                                           210/411
3,251,473 A * 5/1966 Fuhring ............... D06F 43/085
                                           210/167.31
3,262,568 A * 7/1966 Zehrbach ............. B01D 29/114
                                           210/138
3,279,608 A * 10/1966 Levendusky .......... B01D 29/52
                                           210/232
3,280,978 A * 10/1966 Winfield ............. B01D 29/885
                                           210/408
3,291,310 A * 12/1966 Marvel ................. B01D 29/21
                                           210/167.13
3,310,175 A * 3/1967 Mclagan ............... B01D 37/02
                                           55/296
3,312,352 A * 4/1967 Shiells ................. B01D 29/114
                                           210/323.2
3,319,793 A * 5/1967 Miller, Jr. ........... B01D 29/902
                                           210/243
3,330,415 A * 7/1967 Wilke .................... B01D 29/39
                                           210/236
3,356,215 A * 12/1967 Miles, Jr. .............. B01D 37/04
                                           210/333.1
3,365,065 A * 1/1968 Varjabedian ........... B01D 29/52
                                           55/341.1
3,386,587 A   6/1968 Mast et al.
3,387,712 A * 6/1968 Schrink ............... B01D 29/114
                                           210/441
3,394,815 A * 7/1968 Harms .................. B01D 29/52
                                           210/457
3,399,777 A * 9/1968 Passalaqua ............ B01D 35/20
                                           210/486
3,405,807 A * 10/1968 Burkhardt ............. B01D 29/96
                                           210/232
3,407,572 A * 10/1968 Tolley .................... B01D 46/76
                                           55/299
3,416,669 A * 12/1968 Hubbard ............. B01D 29/668
                                           210/411
3,422,958 A * 1/1969 Newman ............... B01D 35/16
                                           210/457
3,424,674 A * 1/1969 Webber ............. B01D 24/4684
                                           55/474
3,438,502 A * 4/1969 Borre .................... B01D 29/19
                                           210/232
3,447,690 A * 6/1969 Kracklauer ........ B01D 29/6484
                                           55/299
3,471,022 A * 10/1969 Conrad ................. B01D 29/23
                                           210/167.14
3,482,700 A * 12/1969 Bebech ................. B01D 29/72
                                           210/407
3,491,882 A * 1/1970 Elam ...................... C10G 33/06
                                           210/791
3,491,884 A * 1/1970 Baker .................... B01D 29/41
                                           D23/209

3,498,460 A * 3/1970 Lane ..................... B01D 24/14
                                           210/232
3,503,516 A * 3/1970 Harms .................. B01D 29/52
                                           210/457
3,530,989 A * 9/1970 Koethke .............. B01D 29/52
                                           210/411
3,542,195 A * 11/1970 Soriente ................. B01D 29/52
                                           210/489
3,552,572 A * 1/1971 Lehmann .......... B01D 24/4621
                                           210/271
3,556,304 A * 1/1971 Collard ................. B01D 37/02
                                           210/489
3,568,845 A * 3/1971 Llamas ................. B01D 29/46
                                           210/488
3,618,774 A * 11/1971 Delphia ............ B01D 24/4876
                                           210/167.13
3,623,505 A * 11/1971 Barsness ............... B01J 8/0278
                                           165/174
3,633,753 A * 1/1972 Petitjean ............... B01D 29/66
                                           55/288
3,637,079 A * 1/1972 Strub ..................... B01D 29/94
                                           210/794
3,642,141 A * 2/1972 Hobson, Jr. ........... B01D 29/15
                                           210/457
3,666,097 A * 5/1972 Ryan .................... B01D 29/661
                                           210/333.01
3,669,882 A * 6/1972 Hirs ................... B01D 24/4636
                                           210/189
3,680,700 A * 8/1972 Ryan .................... B01D 36/001
                                           210/777
3,715,033 A * 2/1973 Soriente ................. B01D 29/15
                                           210/338
3,717,254 A * 2/1973 Benecke ................. B01J 49/09
                                           210/279
3,736,641 A * 6/1973 Fosdick ............... B21C 37/124
                                           29/896.62
3,744,633 A * 7/1973 Schmidt, Jr. .......... B01D 29/94
                                           210/785
3,750,889 A * 8/1973 Acosta ................... B01D 29/52
                                           210/499
3,757,954 A * 9/1973 Toth ................... B01D 24/4621
                                           210/284
3,765,152 A   10/1973 Pausch
3,779,386 A * 12/1973 Ryan ..................... B01D 37/02
                                           210/323.2
3,780,868 A * 12/1973 Miles .................... B01D 29/54
                                           210/333.1
3,796,316 A * 3/1974 Matz ..................... B01D 29/52
                                           100/116
3,867,291 A * 2/1975 Schmidt, Jr. .......... B01D 29/39
                                           55/300
3,891,551 A * 6/1975 Tiedemann .......... B01D 29/661
                                           210/323.1
3,928,188 A   12/1975 Link et al.
3,958,966 A * 5/1976 Keller ..................... F01B 31/26
                                           55/DIG. 37
4,014,796 A   3/1977 Sugiyama et al.
4,026,801 A   5/1977 Ward
4,064,045 A   12/1977 Schmidt, Jr.
4,075,102 A * 2/1978 Ferrin ................... B01D 24/42
                                           210/291
4,089,781 A * 5/1978 Asp ........................ B01D 29/52
                                           210/411
4,094,784 A * 6/1978 Hirano .................. B01D 33/52
                                           210/780
4,141,128 A   2/1979 Wonderling
4,153,552 A * 5/1979 Muther ................. B01D 29/66
                                           210/427
4,157,900 A * 6/1979 Margraf ............ B01D 46/0005
                                           55/379
4,163,724 A * 8/1979 Muller ................. B01D 29/114
                                           210/334
4,169,793 A * 10/1979 Lockshaw ............. B01D 24/14
                                           210/167.13
4,176,066 A * 11/1979 Sloan .................... B01D 29/44
                                           210/241

(56) References Cited

U.S. PATENT DOCUMENTS

| | | | | |
|---|---|---|---|---|
| 4,198,220 A * | 4/1980 | Keller | B01D 45/06 | 55/DIG. 37 |
| 4,199,454 A | 4/1980 | Sartore | | |
| 4,201,674 A * | 5/1980 | Schwinghammer | B01D 29/114 | 210/411 |
| 4,204,964 A | 5/1980 | Cailliot | | |
| 4,210,537 A * | 7/1980 | Butterworth | B01D 29/52 | 210/323.2 |
| 4,213,861 A * | 7/1980 | Muller | B01D 29/114 | 210/797 |
| 4,217,700 A * | 8/1980 | Muller | B01D 29/114 | 210/771 |
| 4,243,533 A * | 1/1981 | Savolainen | B01D 29/54 | 210/309 |
| 4,246,114 A * | 1/1981 | Krebs | C02F 3/1242 | 210/220 |
| 4,259,095 A * | 3/1981 | Johnson, Jr. | B01D 46/48 | 55/379 |
| 4,264,345 A * | 4/1981 | Miller | B01D 50/20 | 55/504 |
| 4,264,445 A * | 4/1981 | Lumikko | B01D 29/66 | 210/323.2 |
| 4,265,771 A * | 5/1981 | Lennartz | B01D 29/72 | 210/791 |
| 4,272,263 A * | 6/1981 | Hancock | B01D 46/4281 | 55/377 |
| 4,277,349 A * | 7/1981 | Schwinghammer | B01D 29/114 | 134/113 |
| 4,289,630 A * | 9/1981 | Schmidt, Jr. | B01D 29/843 | 55/300 |
| 4,290,790 A * | 9/1981 | Okubo | B01D 46/06 | 55/379 |
| 4,292,180 A * | 9/1981 | Zylka | B01D 29/15 | 210/497.01 |
| 4,293,111 A | 10/1981 | Henri | | |
| 4,293,414 A * | 10/1981 | Gianneli | B01D 37/02 | 210/323.2 |
| 4,297,115 A * | 10/1981 | Johnson, Jr. | B01D 46/06 | 55/379 |
| 4,317,732 A * | 3/1982 | Shoquist | B01D 37/04 | 210/791 |
| 4,324,571 A * | 4/1982 | Johnson, Jr. | B01D 46/0041 | 55/379 |
| 4,340,477 A | 7/1982 | Hobson, Jr. et al. | | |
| 4,358,383 A * | 11/1982 | Asp | B01D 35/303 | 210/772 |
| 4,388,197 A * | 6/1983 | Lumikko | B01D 29/66 | 162/189 |
| 4,405,466 A * | 9/1983 | Giannelli | B01D 29/114 | 210/411 |
| 4,419,234 A * | 12/1983 | Miller | B01D 29/15 | 210/232 |
| 4,428,838 A * | 1/1984 | Creps | B01D 29/15 | 210/323.2 |
| 4,436,633 A * | 3/1984 | Robinsky | B01D 29/44 | 210/791 |
| 4,439,327 A * | 3/1984 | Muller | B01D 29/114 | 210/791 |
| 4,443,346 A * | 4/1984 | Muller | B01D 29/668 | 210/791 |
| 4,446,030 A * | 5/1984 | Schmidt, Jr. | B01D 29/52 | 210/120 |
| 4,464,257 A * | 8/1984 | Lynch | C02F 11/12 | 210/220 |
| 4,488,965 A * | 12/1984 | Muller | B01D 29/15 | 55/374 |
| 4,511,471 A * | 4/1985 | Muller | B01D 29/114 | 210/333.1 |
| 4,517,086 A * | 5/1985 | Romey | B01D 29/72 | 210/334 |
| 4,522,717 A * | 6/1985 | Brust | B01D 46/4227 | 210/450 |
| 4,525,274 A * | 6/1985 | Willus | B01D 35/30 | 210/333.1 |
| 4,525,275 A * | 6/1985 | Ostlund | B01D 29/52 | 210/334 |
| 4,526,688 A * | 7/1985 | Schmidt, Jr. | B01D 29/15 | 210/489 |
| 4,526,689 A * | 7/1985 | Morgan | B01D 29/117 | 210/345 |
| 4,528,103 A * | 7/1985 | Spilkin | B01D 29/52 | 210/779 |
| 4,540,490 A * | 9/1985 | Shibata | B01D 65/02 | 976/DIG. 380 |
| 4,552,669 A * | 11/1985 | Sekellick | B01D 29/35 | 210/323.2 |
| 4,560,483 A * | 12/1985 | Warning | B01D 29/668 | 210/489 |
| 4,578,197 A * | 3/1986 | Muller | B01D 29/605 | 210/333.1 |
| 4,584,003 A * | 4/1986 | Oda | B01D 46/0042 | 55/341.2 |
| 4,591,446 A * | 5/1986 | Muller | B01D 29/52 | 261/76 |
| 4,592,847 A * | 6/1986 | Schumacher | B01D 29/80 | 210/186 |
| 4,604,201 A * | 8/1986 | Muller | B01D 29/15 | 210/323.2 |
| 4,609,462 A * | 9/1986 | Flynn | B01D 29/52 | 210/232 |
| 4,619,768 A * | 10/1986 | Takahashi | B01D 37/00 | 210/803 |
| 4,622,137 A * | 11/1986 | Kessler | B01D 29/15 | 210/167.13 |
| 4,631,126 A * | 12/1986 | Keith | B01D 29/52 | 210/411 |
| 4,637,879 A | 1/1987 | Hartley | | |
| 4,650,580 A * | 3/1987 | Schumacher | B01D 29/111 | 427/244 |
| 4,652,369 A * | 3/1987 | DePolo | B01D 29/21 | 210/356 |
| 4,655,242 A * | 4/1987 | Hamazaki | F16K 13/10 | 137/247.35 |
| 4,657,673 A * | 4/1987 | Kessler | B01D 24/14 | 210/167.13 |
| 4,678,567 A | 7/1987 | Ueda | | |
| 4,680,111 A | 7/1987 | Ueda | | |
| 4,704,210 A * | 11/1987 | Boze | B01D 35/12 | 210/497.1 |
| 4,713,174 A * | 12/1987 | Zievers | B01D 46/0005 | 55/379 |
| 4,725,356 A * | 2/1988 | Zievers | B01D 29/52 | 210/450 |
| 4,728,423 A * | 3/1988 | Kuwajima | B01D 29/114 | 210/438 |
| 4,735,638 A * | 4/1988 | Ciliberti | F16F 1/022 | 55/498 |
| 4,738,696 A | 4/1988 | Staffeld | | |
| 4,741,841 A * | 5/1988 | Borre | B01D 33/722 | 55/304 |
| 4,742,966 A * | 5/1988 | Szkaradek | B02C 17/161 | 241/171 |
| 4,753,726 A * | 6/1988 | Suchanek | B01D 24/4876 | 210/279 |
| 4,767,424 A * | 8/1988 | McEwan | B01D 45/16 | 55/456 |
| 4,773,998 A * | 9/1988 | Heinrich | B01D 24/4631 | 210/279 |
| 4,775,471 A * | 10/1988 | Nagai | B01D 63/043 | 376/313 |
| 4,781,825 A * | 11/1988 | Grimes | B01D 29/114 | 55/284 |
| 4,804,481 A * | 2/1989 | Lennartz | B01D 29/52 | 210/791 |

(56)                References Cited

U.S. PATENT DOCUMENTS

| | | | | |
|---|---|---|---|---|
| 4,816,155 A * | 3/1989 | Linderman R. Ivan ..................... | | |
| | | | B01D 29/33 | |
| | | | 137/561 A | |
| 4,830,747 A * | 5/1989 | Kubota ................. | B01D 29/66 | |
| | | | 134/22.12 | |
| 4,836,922 A | 6/1989 | Rishel et al. | | |
| 4,836,936 A * | 6/1989 | Schewitz ............... | B01D 29/39 | |
| | | | 210/791 | |
| 4,861,498 A * | 8/1989 | Robinsky ............. | B01D 29/663 | |
| | | | 210/791 | |
| 4,865,627 A * | 9/1989 | Dewitz .................. | B01D 46/46 | |
| | | | 95/286 | |
| 4,872,981 A * | 10/1989 | Hobson, Jr. ............ | B01D 29/90 | |
| | | | 210/420 | |
| 4,876,006 A * | 10/1989 | Ohkubo ................. | B01D 65/02 | |
| | | | 210/321.89 | |
| 4,919,801 A * | 4/1990 | Hobson, Jr. ......... | B01D 35/153 | |
| | | | 210/388 | |
| 4,943,379 A * | 7/1990 | Boze ...................... | B01D 37/02 | |
| | | | 210/411 | |
| 4,944,887 A * | 7/1990 | Frederick .............. | B01D 29/70 | |
| | | | 210/791 | |
| 4,952,317 A * | 8/1990 | Culkin .................... | B01D 63/16 | |
| | | | 210/636 | |
| 4,960,546 A * | 10/1990 | Tharp ................. | B01F 23/2311 | |
| | | | 285/915 | |
| 4,963,271 A * | 10/1990 | Raehse ................ | B01D 29/114 | |
| | | | 210/772 | |
| 5,008,009 A | 4/1991 | Ciaffoni | | |
| 5,061,303 A | 10/1991 | Williams et al. | | |
| 5,066,393 A * | 11/1991 | Padera ...................... | C02F 1/42 | |
| | | | 210/291 | |
| 5,068,033 A * | 11/1991 | Tobias ................... | B01D 24/14 | |
| | | | 210/345 | |
| 5,084,176 A | 1/1992 | Davis et al. | | |
| 5,085,997 A * | 2/1992 | Muller .................. | C12H 1/063 | |
| | | | 210/791 | |
| 5,128,038 A * | 7/1992 | Slavitschek .......... | B01D 29/114 | |
| | | | 376/313 | |
| 5,152,815 A * | 10/1992 | Zievers .................. | B01D 46/58 | |
| | | | 55/374 | |
| 5,173,098 A | 12/1992 | Pipkorn | | |
| D333,505 S | 2/1993 | Matsumura | | |
| 5,203,998 A * | 4/1993 | Benian ................... | B01D 29/76 | |
| | | | 210/493.1 | |
| 5,207,930 A | 5/1993 | Kannan | | |
| 5,209,844 A * | 5/1993 | Zievers ................ | B01D 29/114 | |
| | | | 210/411 | |
| 5,223,012 A * | 6/1993 | Best ....................... | B01D 29/54 | |
| | | | 55/381 | |
| 5,223,138 A * | 6/1993 | Zievers .................. | B28B 1/265 | |
| | | | 162/152 | |
| 5,227,076 A * | 7/1993 | Bogen ................ | B01D 21/0012 | |
| | | | 210/791 | |
| 5,230,131 A * | 7/1993 | Hobson, Jr. ............ | B01D 29/96 | |
| | | | 29/402.06 | |
| 5,279,733 A * | 1/1994 | Heymans ............... | B01D 29/96 | |
| | | | 210/485 | |
| 5,296,010 A * | 3/1994 | Clark ................. | B01D 46/4227 | |
| | | | 55/DIG. 30 | |
| 5,296,134 A * | 3/1994 | Zaiter .................... | B01D 29/66 | |
| | | | 55/482 | |
| 5,346,629 A * | 9/1994 | Wuller .................. | B01D 21/34 | |
| | | | 210/791 | |
| 5,358,552 A * | 10/1994 | Seibert .................. | B01D 46/79 | |
| | | | 95/281 | |
| 5,384,034 A * | 1/1995 | Hetzel ................... | B01D 29/52 | |
| | | | 210/418 | |
| 5,397,465 A * | 3/1995 | Stewart ................. | B01D 29/39 | |
| | | | 210/167.13 | |
| 5,401,406 A * | 3/1995 | Johnson ............. | B01D 46/2407 | |
| | | | 210/450 | |
| 5,407,570 A * | 4/1995 | Hobson, Jr. ............ | B01D 29/15 | |
| | | | 210/232 | |
| 5,421,845 A * | 6/1995 | Gregg .................... | B01D 46/04 | |
| | | | 55/294 | |
| 5,441,633 A * | 8/1995 | Schewitz ............. | B01D 29/908 | |
| | | | 210/323.2 | |
| 5,445,738 A | 8/1995 | Fry et al. | | |
| 5,486,288 A | 1/1996 | Stanford et al. | | |
| 5,518,609 A * | 5/1996 | Karlsson ............. | B01D 29/605 | |
| | | | 210/97 | |
| 5,525,221 A * | 6/1996 | Hohle ................... | B01D 29/15 | |
| | | | 210/323.2 | |
| 5,591,329 A * | 1/1997 | Davidson .............. | B01D 29/21 | |
| | | | 210/493.1 | |
| 5,628,916 A * | 5/1997 | Stevens ................. | B01D 29/52 | |
| | | | 210/799 | |
| 5,637,278 A * | 6/1997 | Smith .................. | B01D 24/167 | |
| | | | 210/275 | |
| 5,667,679 A * | 9/1997 | Bozenmayer .......... | B01D 29/52 | |
| | | | 210/232 | |
| 5,693,362 A * | 12/1997 | Boos ........................ | B01J 8/006 | |
| | | | 118/712 | |
| 5,766,467 A * | 6/1998 | Rech ...................... | B01D 29/15 | |
| | | | 55/508 | |
| 5,766,486 A * | 6/1998 | Cathcart ............... | B01D 46/70 | |
| | | | 210/791 | |
| 5,785,870 A * | 7/1998 | Davis ..................... | B01D 29/48 | |
| | | | 210/488 | |
| 5,788,726 A | 8/1998 | Steele | | |
| 5,792,353 A * | 8/1998 | Jungi ..................... | B01D 29/48 | |
| | | | 210/357 | |
| 5,795,359 A * | 8/1998 | McLeish ................ | B01D 46/70 | |
| | | | 96/233 | |
| 5,800,580 A | 9/1998 | Feldt | | |
| 5,849,375 A * | 12/1998 | Smith ................ | B01D 39/2086 | |
| | | | 428/34.5 | |
| 5,858,217 A * | 1/1999 | Redl ....................... | B01D 29/52 | |
| | | | 210/414 | |
| 5,871,641 A * | 2/1999 | Davidson .............. | B01D 29/21 | |
| | | | 210/167.13 | |
| 5,876,471 A * | 3/1999 | Lippert .................. | B01D 46/58 | |
| | | | 55/508 | |
| 5,882,528 A * | 3/1999 | Davidson ............... | B01D 29/21 | |
| | | | 210/791 | |
| 5,932,092 A | 8/1999 | Hawk et al. | | |
| 5,945,006 A * | 8/1999 | Mignani ............. | B01D 29/114 | |
| | | | 210/411 | |
| 5,948,257 A * | 9/1999 | Custer ................ | B01D 46/2407 | |
| | | | 210/508 | |
| 5,951,726 A | 9/1999 | Allingham et al. | | |
| 5,972,228 A * | 10/1999 | Ingelman .............. | B01D 35/16 | |
| | | | 210/333.1 | |
| 6,051,138 A * | 4/2000 | Hobson, Jr. ............ | B01D 29/72 | |
| | | | 55/379 | |
| 6,077,333 A * | 6/2000 | Wolfs ..................... | B03C 1/288 | |
| | | | 210/695 | |
| D428,469 S | 7/2000 | Puiggros Roig | | |
| 6,100,081 A * | 8/2000 | Buelna .................. | B01D 53/85 | |
| | | | 210/150 | |
| 6,102,978 A | 8/2000 | Butler | | |
| 6,123,746 A * | 9/2000 | Alvin ................. | B01D 46/2407 | |
| | | | 277/633 | |
| 6,177,006 B1 * | 1/2001 | Nagaoka ................. | C02F 1/004 | |
| | | | 210/330 | |
| 6,200,367 B1 * | 3/2001 | Phillips .............. | B01D 46/0086 | |
| | | | 96/417 | |
| D439,950 S | 4/2001 | Fletcher et al. | | |
| 6,217,781 B1 * | 4/2001 | Hobson, Jr. ............ | B01D 29/52 | |
| | | | 210/791 | |
| 6,254,774 B1 * | 7/2001 | Henderson ............ | B01D 29/96 | |
| | | | 376/313 | |
| D446,840 S | 8/2001 | Strand | | |
| 6,309,552 B1 * | 10/2001 | Hobson, Jr. ............ | B01D 29/52 | |
| | | | 210/791 | |
| 6,341,567 B1 * | 1/2002 | Robertson .......... | B01D 46/4263 | |
| | | | 55/482.1 | |

(56) References Cited

U.S. PATENT DOCUMENTS

| | | | |
|---|---|---|---|
| 6,342,158 B1 * | 1/2002 | Wills | B01D 29/15 |
| | | | 210/240 |
| 6,365,054 B1 * | 4/2002 | Kruger | B01D 29/52 |
| | | | 210/411 |
| 6,368,388 B1 | 4/2002 | Kosmider et al. | |
| 6,386,520 B2 * | 5/2002 | McEwan | B01J 19/26 |
| | | | 261/114.1 |
| 6,398,837 B1 * | 6/2002 | Alvin | B01D 39/2075 |
| | | | 55/486 |
| 6,413,422 B1 * | 7/2002 | Schumacher | B01D 29/114 |
| | | | 210/232 |
| 6,419,842 B1 * | 7/2002 | Kupka | F26B 7/00 |
| | | | 210/330 |
| 6,428,593 B1 * | 8/2002 | Bruck | B01D 46/0002 |
| | | | 55/482 |
| 6,428,690 B1 * | 8/2002 | Tse | B01D 24/4631 |
| | | | 210/275 |
| 6,439,273 B1 * | 8/2002 | Kruger | B01D 29/114 |
| | | | 141/69 |
| 6,495,037 B1 | 12/2002 | Schuyler | |
| 6,537,449 B2 * | 3/2003 | Schewitz | B01D 29/52 |
| | | | 210/323.1 |
| 6,576,029 B2 * | 6/2003 | West | B04C 3/00 |
| | | | 55/459.1 |
| 6,626,970 B2 | 9/2003 | Pipkorn et al. | |
| D481,442 S | 10/2003 | Liu | |
| D482,755 S | 11/2003 | Rhinehart et al. | |
| D486,882 S | 2/2004 | Riddell | |
| 6,709,574 B2 * | 3/2004 | James | C02F 3/10 |
| | | | 210/150 |
| 6,709,586 B2 * | 3/2004 | Mason | B01D 29/96 |
| | | | 210/411 |
| 6,790,250 B2 | 9/2004 | Pipkorn et al. | |
| D502,757 S | 3/2005 | Mork et al. | |
| 6,872,310 B2 * | 3/2005 | Trotzki | B01D 29/52 |
| | | | 210/345 |
| 6,905,529 B2 | 6/2005 | Pipkorn et al. | |
| 7,063,790 B2 * | 6/2006 | Hahn | B01D 29/48 |
| | | | 210/497.1 |
| 7,074,338 B2 * | 7/2006 | Mizuno | B01D 29/15 |
| | | | 210/791 |
| 7,077,968 B2 * | 7/2006 | Pfeiffer | B01D 36/04 |
| | | | 210/803 |
| 7,163,626 B1 * | 1/2007 | Cuypers | B04C 3/00 |
| | | | 210/512.1 |
| 7,371,267 B2 | 5/2008 | Pipkorn et al. | |
| 7,381,323 B2 * | 6/2008 | Umezawa | B01D 29/114 |
| | | | 210/791 |
| 7,413,588 B2 | 8/2008 | Holzmann et al. | |
| 7,459,001 B2 * | 12/2008 | Christiansen | B01D 45/16 |
| | | | 55/343 |
| 7,468,134 B2 * | 12/2008 | Hoang | A01K 63/045 |
| | | | 210/287 |
| 7,487,875 B2 * | 2/2009 | Zimmerman | B01D 29/15 |
| | | | 210/345 |
| 7,488,361 B2 * | 2/2009 | Larnholm | B01D 45/16 |
| | | | 55/318 |
| D600,775 S | 9/2009 | Schmitt et al. | |
| 7,785,465 B2 | 8/2010 | Lenz | |
| D633,982 S | 3/2011 | Palmer et al. | |
| 7,913,932 B2 | 3/2011 | Wu | |
| D643,506 S | 8/2011 | Miles et al. | |
| 7,998,353 B2 * | 8/2011 | Vandendijk | B01D 29/15 |
| | | | 210/232 |
| 8,025,718 B2 * | 9/2011 | Kooijman | B01D 19/0042 |
| | | | 95/271 |
| 8,029,680 B2 * | 10/2011 | Shinoda | B01D 29/48 |
| | | | 210/777 |
| 8,070,141 B2 * | 12/2011 | Kooijman | B01D 1/305 |
| | | | 95/271 |
| D654,145 S | 2/2012 | Chatterjee et al. | |
| 8,192,624 B2 | 6/2012 | Takao et al. | |
| 8,221,618 B2 | 7/2012 | Murray et al. | |
| 8,226,738 B2 | 7/2012 | Harris et al. | |
| 8,309,711 B2 * | 11/2012 | Wiley | B01D 29/94 |
| | | | 210/411 |
| D675,705 S | 2/2013 | Mallol et al. | |
| D675,706 S | 2/2013 | Mallol et al. | |
| 8,409,429 B2 * | 4/2013 | Kaske | B01D 29/908 |
| | | | 210/411 |
| D682,387 S | 5/2013 | Tseng | |
| 8,465,654 B2 * | 6/2013 | Leonard | B01D 29/15 |
| | | | 210/232 |
| 8,511,476 B2 | 8/2013 | Cassani | |
| D695,877 S | 12/2013 | Geisen et al. | |
| 8,596,144 B2 | 12/2013 | Rieder | |
| 8,627,848 B2 * | 1/2014 | Bambara | B01D 19/0042 |
| | | | 55/440 |
| 8,888,881 B2 | 11/2014 | Appelo | |
| D719,634 S | 12/2014 | Reed | |
| 8,956,435 B2 | 2/2015 | Appelo | |
| 8,992,775 B2 * | 3/2015 | Swindell | B01D 29/21 |
| | | | 210/411 |
| 9,192,880 B2 * | 11/2015 | Mickan | B01D 29/52 |
| 9,192,886 B2 * | 11/2015 | Nieuwoudt | B04C 5/04 |
| D754,630 S | 4/2016 | Paterson | |
| D755,155 S | 5/2016 | Paterson | |
| 9,327,219 B2 | 5/2016 | Brunswick | |
| D762,834 S | 8/2016 | Kaufmann et al. | |
| 9,643,105 B1 * | 5/2017 | Walker | B01D 45/08 |
| D790,508 S | 6/2017 | Lewis et al. | |
| D792,942 S | 7/2017 | Adey et al. | |
| D793,523 S | 8/2017 | Adey et al. | |
| D795,999 S | 8/2017 | Downie | |
| D796,000 S | 8/2017 | Downie | |
| 9,724,624 B1 * | 8/2017 | Walker | B01D 21/0042 |
| 9,789,429 B2 * | 10/2017 | Schook | B01D 46/10 |
| 9,808,750 B2 | 11/2017 | Klein | |
| D817,440 S | 5/2018 | Lossie et al. | |
| 10,058,802 B2 * | 8/2018 | Castaneda | B01D 29/52 |
| D829,687 S | 10/2018 | Burlingame et al. | |
| D837,182 S | 1/2019 | Elmieh et al. | |
| D841,775 S | 2/2019 | Ghoshal et al. | |
| D844,101 S | 3/2019 | Zheng | |
| D848,399 S | 5/2019 | Burlingame et al. | |
| 10,286,339 B2 | 5/2019 | Crandall et al. | |
| 10,307,701 B2 | 6/2019 | Klein | |
| D854,509 S | 7/2019 | Wu | |
| D855,151 S | 7/2019 | Joo et al. | |
| 10,406,458 B1 * | 9/2019 | Nehlen, III | B01D 29/52 |
| 10,427,076 B2 * | 10/2019 | Swindell | B01D 29/21 |
| 10,434,453 B2 | 10/2019 | Jakop | |
| 10,518,195 B2 * | 12/2019 | Walker | B01D 21/0042 |
| D878,516 S | 3/2020 | Pathan et al. | |
| 10,596,497 B2 * | 3/2020 | Backman | B01D 33/466 |
| 10,661,212 B2 | 5/2020 | Grothues et al. | |
| D892,974 S | 8/2020 | Allen et al. | |
| 10,792,592 B2 * | 10/2020 | Nieuwoudt | B01D 3/008 |
| 10,792,596 B1 | 10/2020 | Mjelde | |
| 10,814,255 B1 * | 10/2020 | Nehlen, III | B01D 29/90 |
| 10,814,256 B1 * | 10/2020 | Nehlen, III | B01D 29/15 |
| D903,063 S | 11/2020 | Mjelde | |
| 10,850,216 B1 * | 12/2020 | Nehlen, III | B01D 29/52 |
| 10,981,091 B1 * | 4/2021 | Nehlen, III | B01D 29/15 |
| 11,014,027 B1 | 5/2021 | Mjelde | |
| 11,065,559 B2 * | 7/2021 | Johnson | B01D 21/0003 |
| 11,065,566 B2 * | 7/2021 | Nehlen, III | B01D 29/906 |
| 11,148,072 B2 * | 10/2021 | Walker | B01D 21/0045 |
| 11,167,226 B2 * | 11/2021 | Nehlen, III | B01D 37/02 |
| 11,229,865 B2 * | 1/2022 | Decker | B01D 46/0001 |
| 11,331,616 B2 * | 5/2022 | Henderson | C02F 1/004 |
| 11,471,798 B2 * | 10/2022 | Vallejo | C02F 1/006 |
| 11,478,741 B2 | 10/2022 | Scott et al. | |
| 11,484,818 B2 | 11/2022 | De Los Reyes, III et al. | |
| 11,484,822 B2 * | 11/2022 | Nieuwoudt | B01D 3/008 |
| 11,524,255 B2 | 12/2022 | Tripathi et al. | |
| 11,559,757 B2 * | 1/2023 | Ruzicka | B01D 35/30 |
| 11,673,079 B2 * | 6/2023 | Nehlen, III | B01D 29/17 |
| | | | 210/323.2 |
| 11,717,775 B2 * | 8/2023 | Maiworm | A23D 9/04 |
| | | | 210/323.1 |

(56) References Cited

U.S. PATENT DOCUMENTS

| | | | | |
|---|---|---|---|---|
| D1,002,793 S * | 10/2023 | Kamath | D23/209 | |
| D1,007,641 S * | 12/2023 | Kamath | D23/207 | |
| 11,883,771 B2 * | 1/2024 | Henderson | B01D 24/14 | |
| 11,958,002 B2 * | 4/2024 | Kim | B01D 29/15 | |
| 12,103,863 B2 * | 10/2024 | Chen | C02F 1/283 | |
| 12,128,344 B2 * | 10/2024 | Henderson | B01D 24/14 | |
| 12,168,190 B2 * | 12/2024 | Stuiver | B01D 29/15 | |
| 12,215,555 B2 * | 2/2025 | John | B01D 37/046 | |
| 12,330,093 B2 * | 6/2025 | Nehlen, III | B01D 29/90 | |
| 12,330,094 B2 * | 6/2025 | Nehlen, III | B01D 29/17 | |
| 12,330,959 B2 * | 6/2025 | Hawksley | C02F 1/004 | |
| 12,343,662 B2 * | 7/2025 | Shaw | B01D 29/33 | |
| 12,352,390 B1 * | 7/2025 | Grayson | F17C 13/126 | |
| 12,528,034 B2 * | 1/2026 | Nehlen, III | B01D 29/52 | |
| 2001/0038156 A1 * | 11/2001 | Mcewan | B01J 4/001 | |
| | | | 261/114.1 | |
| 2002/0000405 A1 * | 1/2002 | Diemer | B01D 29/19 | |
| | | | 210/323.2 | |
| 2002/0006769 A1 * | 1/2002 | Tsuihiji | C02F 1/444 | |
| | | | 451/87 | |
| 2002/0038783 A1 * | 4/2002 | Trotzki | B01D 29/114 | |
| | | | 210/407 | |
| 2002/0104297 A1 | 8/2002 | Pipkorn et al. | | |
| 2002/0158002 A1 * | 10/2002 | Trotzki | B01D 29/114 | |
| | | | 210/384 | |
| 2003/0164342 A1 * | 9/2003 | Mason | B01D 29/114 | |
| | | | 210/323.2 | |
| 2003/0226790 A1 | 12/2003 | Brown et al. | | |
| 2004/0065627 A1 * | 4/2004 | Loser | B01D 29/15 | |
| | | | 210/497.1 | |
| 2004/0094038 A1 * | 5/2004 | Hahn | B01D 29/48 | |
| | | | 99/277 | |
| 2004/0134170 A1 | 7/2004 | Pipkorn et al. | | |
| 2004/0262209 A1 * | 12/2004 | Umezawa | B01D 29/66 | |
| | | | 210/216 | |
| 2005/0034436 A1 * | 2/2005 | Pipkom | B01D 46/06 | |
| | | | 55/379 | |
| 2005/0060970 A1 * | 3/2005 | Polderman | B01D 45/16 | |
| | | | 55/320 | |
| 2005/0183404 A1 | 8/2005 | Pipkorn et al. | | |
| 2005/0204917 A1 * | 9/2005 | Haland | B01D 45/08 | |
| | | | 95/268 | |
| 2006/0107638 A1 | 5/2006 | Holzmann et al. | | |
| 2006/0266685 A1 * | 11/2006 | Umezawa | B01D 37/02 | |
| | | | 210/216 | |
| 2006/0266686 A1 * | 11/2006 | Umezawa | B01D 37/02 | |
| | | | 210/216 | |
| 2006/0266687 A1 * | 11/2006 | Umezawa | B01D 63/089 | |
| | | | 210/791 | |
| 2007/0044437 A1 * | 3/2007 | Larnholm | B01D 50/20 | |
| | | | 55/319 | |
| 2007/0045173 A1 * | 3/2007 | Zimmerman | B01D 29/15 | |
| | | | 210/450 | |
| 2007/0119130 A1 | 5/2007 | Fliszar | | |
| 2007/0251876 A1 * | 11/2007 | Krogue | B01D 39/2062 | |
| | | | 210/497.1 | |
| 2008/0099408 A1 * | 5/2008 | Swindell | B01D 29/96 | |
| | | | 210/797 | |
| 2008/0149557 A1 * | 6/2008 | Reynders | B01D 29/15 | |
| | | | 210/323.2 | |
| 2008/0168753 A1 * | 7/2008 | Christiansen | B01D 45/16 | |
| | | | 55/440 | |
| 2008/0203614 A1 | 8/2008 | Holzmann et al. | | |
| 2008/0237152 A1 * | 10/2008 | Benachenhou | B01D 17/10 | |
| | | | 210/442 | |
| 2008/0290532 A1 * | 11/2008 | Kooijman | B01D 1/305 | |
| | | | 261/108 | |
| 2009/0045128 A1 | 2/2009 | Murray et al. | | |
| 2009/0045149 A1 | 2/2009 | Murray et al. | | |
| 2009/0050581 A1 * | 2/2009 | Kaske | B01D 21/34 | |
| | | | 210/313 | |
| 2009/0078118 A1 * | 3/2009 | Kooijman | B01D 3/008 | |
| | | | 96/207 | |
| 2009/0101601 A1 * | 4/2009 | Kaske | B01D 29/114 | |
| | | | 210/411 | |
| 2009/0249756 A1 | 10/2009 | Schrage et al. | | |
| 2009/0283481 A1 * | 11/2009 | Vandendijk | B01D 29/15 | |
| | | | 210/232 | |
| 2010/0032372 A1 * | 2/2010 | Adam | B01D 37/02 | |
| | | | 210/660 | |
| 2010/0126131 A1 | 5/2010 | Scott et al. | | |
| 2010/0223895 A1 | 9/2010 | Peshina | | |
| 2011/0006015 A1 * | 1/2011 | Leonard | B01D 29/15 | |
| | | | 210/489 | |
| 2011/0031192 A1 * | 2/2011 | Wiley | B01D 29/52 | |
| | | | 210/411 | |
| 2011/0277428 A1 | 11/2011 | Harris et al. | | |
| 2012/0018369 A1 * | 1/2012 | Markgraf | B01D 29/48 | |
| | | | 210/435 | |
| 2012/0279185 A1 | 11/2012 | Appelo | | |
| 2013/0020248 A1 * | 1/2013 | Mickan | B01D 29/52 | |
| | | | 210/345 | |
| 2013/0025454 A1 | 1/2013 | Moredock et al. | | |
| 2013/0115588 A1 | 5/2013 | Davis et al. | | |
| 2013/0153471 A1 | 6/2013 | Cassani | | |
| 2013/0227921 A1 | 9/2013 | Appelo | | |
| 2013/0319928 A1 * | 12/2013 | Zuber | B01D 29/66 | |
| | | | 210/440 | |
| 2014/0190138 A1 | 7/2014 | Palomino | | |
| 2014/0353229 A1 | 12/2014 | Klein | | |
| 2015/0027092 A1 | 1/2015 | Schulz et al. | | |
| 2015/0121822 A1 | 5/2015 | Neate et al. | | |
| 2015/0136689 A1 | 5/2015 | Butters et al. | | |
| 2015/0165354 A1 | 6/2015 | Brunswick | | |
| 2015/0174515 A1 * | 6/2015 | Swindell | B01D 29/52 | |
| | | | 210/791 | |
| 2015/0375148 A1 | 12/2015 | Klein | | |
| 2016/0303515 A1 * | 10/2016 | Diaz Mesa | B01D 65/02 | |
| 2017/0080362 A1 | 3/2017 | Ries et al. | | |
| 2017/0136391 A1 | 5/2017 | Crandall et al. | | |
| 2017/0252691 A1 * | 9/2017 | Johnson | B01D 46/523 | |
| 2017/0312675 A1 | 11/2017 | Grothues et al. | | |
| 2018/0071967 A1 * | 3/2018 | Schröder | B29C 48/503 | |
| 2018/0291911 A1 | 10/2018 | Ward et al. | | |
| 2019/0055903 A1 | 2/2019 | Pattullo | | |
| 2019/0291028 A1 * | 9/2019 | Nehlen, III | B01D 29/90 | |
| 2019/0329165 A1 * | 10/2019 | Backman | B01D 33/466 | |
| 2020/0086242 A1 | 3/2020 | Mcfarlen et al. | | |
| 2020/0159589 A1 | 5/2020 | Capes et al. | | |
| 2020/0176151 A1 | 6/2020 | Sprengers et al. | | |
| 2020/0384387 A1 * | 12/2020 | Nehlen, III | B01D 29/52 | |
| 2020/0384388 A1 * | 12/2020 | Stuiver | B01D 29/52 | |
| 2021/0002145 A1 * | 1/2021 | Chen | C02F 1/001 | |
| 2021/0039023 A1 * | 2/2021 | Nehlen, III | B01D 29/52 | |
| 2021/0052996 A1 * | 2/2021 | Nehlen, III | B01D 29/15 | |
| 2021/0086111 A1 * | 3/2021 | Nehlen, III | B01D 29/62 | |
| 2021/0197106 A1 * | 7/2021 | Nieuwoudt | B01D 3/008 | |
| 2021/0214240 A1 * | 7/2021 | Itai | C02F 1/001 | |
| 2021/0229006 A1 * | 7/2021 | Nehlen, III | B01D 29/52 | |
| 2021/0245078 A1 * | 8/2021 | Maiworm | C11B 3/008 | |
| 2021/0268409 A1 * | 9/2021 | Ruzicka | B01D 35/30 | |
| 2021/0268421 A1 | 9/2021 | Currell et al. | | |
| 2021/0331098 A1 * | 10/2021 | Nehlen, III | B01D 24/047 | |
| 2021/0346824 A1 * | 11/2021 | Curley | B01D 24/16 | |
| 2021/0362078 A1 | 11/2021 | De Los Reyes, III et al. | | |
| 2021/0362083 A1 * | 11/2021 | Decker | B01D 46/0001 | |
| 2021/0370215 A1 | 12/2021 | Ehrenberg et al. | | |
| 2021/0379521 A1 * | 12/2021 | Heidenreich | B01D 46/60 | |
| 2022/0016552 A1 | 1/2022 | Mania | | |
| 2022/0062802 A1 * | 3/2022 | Nehlen, III | B01D 29/90 | |
| 2022/0080337 A1 * | 3/2022 | Kim | B01D 29/6438 | |
| 2022/0096968 A1 * | 3/2022 | Wieseneder | B01D 24/12 | |
| 2022/0143534 A1 * | 5/2022 | Vallejo | B01D 29/902 | |
| 2022/0176300 A1 * | 6/2022 | Graham | B01D 46/04 | |
| 2022/0193591 A1 | 6/2022 | Lin et al. | | |
| 2022/0212121 A1 * | 7/2022 | Liu | B01D 29/15 | |
| 2022/0233978 A1 * | 7/2022 | Stuiver | B01D 29/66 | |
| 2022/0274043 A1 | 9/2022 | Williams et al. | | |
| 2022/0362690 A1 * | 11/2022 | Shaw | B01D 46/2407 | |
| 2023/0001335 A1 * | 1/2023 | Powell | B01D 29/52 | |
| 2023/0052718 A1 * | 2/2023 | Hawksley | C02F 1/004 | |

(56) References Cited

U.S. PATENT DOCUMENTS

| | | | | |
|---|---|---|---|---|
| 2023/0149836 A1* | 5/2023 | Hawksley | B01D 37/046 | |
| | | | | 210/741 |
| 2023/0226470 A1* | 7/2023 | Strasser | B01D 29/66 | |
| | | | | 210/798 |
| 2023/0226479 A1* | 7/2023 | Strasser | B01D 46/2407 | |
| | | | | 55/350.1 |
| 2023/0271113 A1* | 8/2023 | Kamath | G06F 30/17 | |
| | | | | 210/268 |
| 2024/0131456 A1* | 4/2024 | Nehlen, III | B01D 29/52 | |
| 2024/0226782 A9* | 7/2024 | Nehlen, III | B01D 29/52 | |
| 2025/0296855 A1* | 9/2025 | Hawksley | C02F 1/004 | |

FOREIGN PATENT DOCUMENTS

| | | | | | |
|---|---|---|---|---|---|
| CN | 209338316 U | 9/2019 | | | |
| DE | 3433472 A1 | 3/1986 | | | |
| EP | 3636602 A1 * | 4/2020 | | C02F 3/02 | |
| EP | 3636602 A4 | 1/2021 | | | |
| EP | 3636602 B1 * | 7/2022 | | B01D 29/6438 | |
| ES | 2690100 B2 | 4/2019 | | | |
| FR | 1374625 A | 10/1964 | | | |
| GB | 1342082 A | 12/1973 | | | |
| JP | H08-024851 | 1/1996 | | | |
| TW | M262249 U | 4/2005 | | | |
| TW | I389733 B | 3/2013 | | | |
| WO | 98/16297 A1 | 4/1998 | | | |
| WO | 2018/211161 A1 | 11/2018 | | | |
| WO | 2020/159589 A1 | 8/2020 | | | |
| WO | 2020/176151 A1 | 9/2020 | | | |
| WO | 2022101528 A1 | 5/2022 | | | |

OTHER PUBLICATIONS https://www.dripdepot.com/item/amiad-mini-signia-automatic-filter-size-2-inch-micron-200-orientation-on-line?gclid=EAlaLQobChMIme0CrPPu6gIVLwilCR26NgTWEAkYBiABEgJbXPD_BwE (Year: 2019).

Multi Media Sand Water Filter System, Apr. 12, 2023, aquafilteruae.ae, Jun. 30, 2023 https://aquafilteruae.ae/product/multi-media-sand-water-filter-system/ (Year: 2023).

Unknown, "Examination Report", Taiwanese Patent Application No. 109127577, mailed Jun. 14, 2024, 23 pages.

Hilt, Daniel, "Extended European Search Report", European Patent Application No. 20945251.5, mailed Feb. 9, 2024, 7 pages.

Cázares Avila, Jose E., "First Requirement Substantive Examination Result", Mexican Patent Application No. MX/A/2023/000566, mailed Oct. 31, 2025, 15 pages.

Unknown, "Notice to Submit Response", South Korean Patent Application No. 10-2023-7004830, mailed Sep. 23, 2025, 7 pages.

* cited by examiner

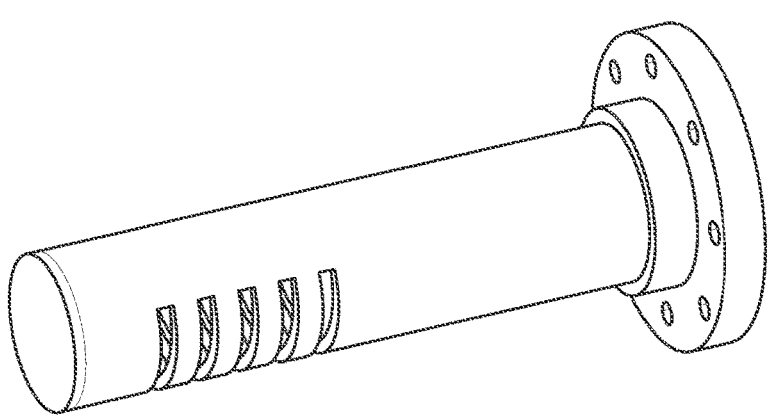
FIG. 3A
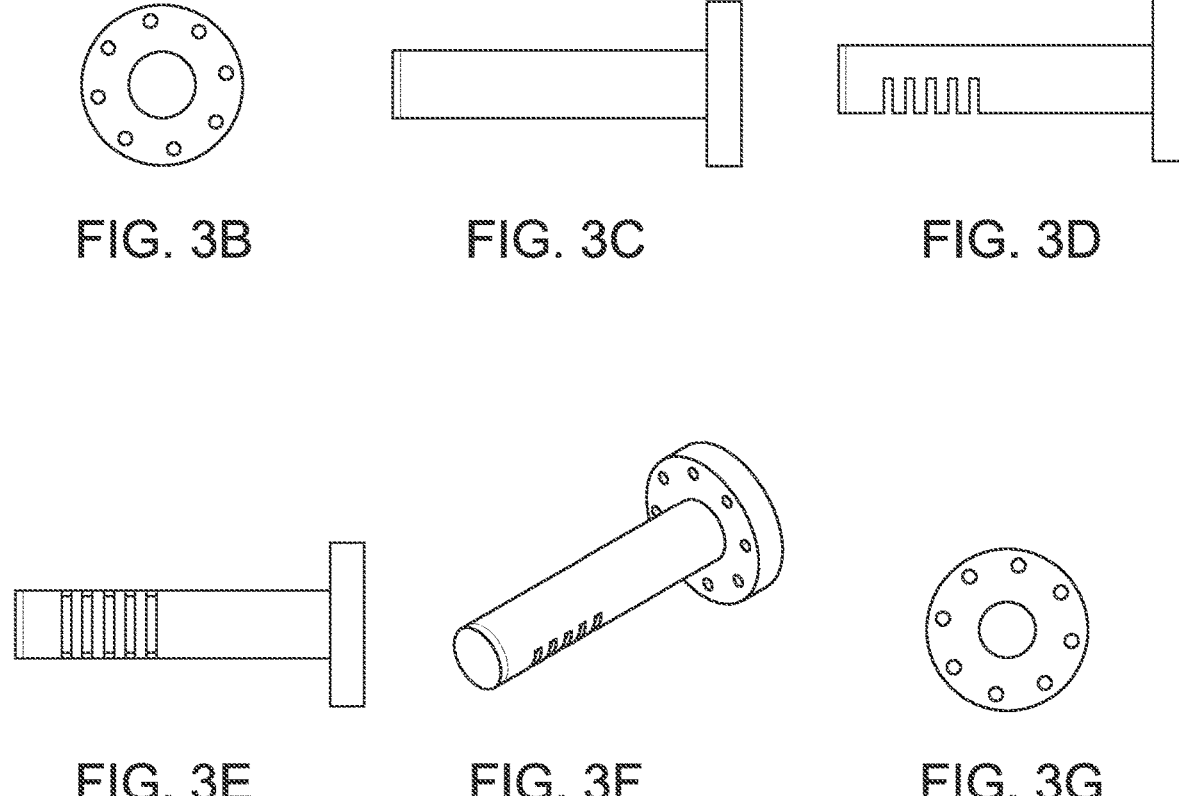
FIG. 3B      FIG. 3C      FIG. 3D
FIG. 3E      FIG. 3F      FIG. 3G

REGENERATIVE MEDIA FILTER WITH FLOW DIFFUSER

FIELD OF TECHNOLOGY

Aspects and embodiments disclosed herein are generally directed to water treatment systems, and more specifically, to water treatment systems for use in aquatics or recreational facilities.

SUMMARY

In accordance with one aspect, there is provided a water filtration system. The water filtration system may comprise a regenerative media filter vessel comprising a housing, an inlet, an outlet, and particulate media disposed within the vessel, the housing comprising a concave lower portion centered about a vertical axis of the vessel, a diffuser fluidly connected to the inlet and disposed within the regenerative media filter vessel, and at least one pump configured to direct water through the water filtration system. The diffuser may comprise a conduit and a plurality of apertures defined in at least a lower side of a wall of the conduit and sized to allow the particulate media to pass through. A position of the diffuser along a height of the regenerative media filter vessel may be determined by at least a ratio of the height to an inner diameter of the regenerative media filter vessel and a radius of curvature of the concave lower portion such that, in operation, a flow of water directed out of the diffuser and into the regenerative media filter vessel has a minimum flow velocity that exceeds a settling velocity of the particulate media in the regenerative media filter vessel.

In accordance with another aspect, there is provided a water filtration system. The water filtration system may comprise a regenerative media filter vessel comprising a housing, an inlet, an outlet, and particulate media disposed within the vessel, the housing comprising a concave lower portion, a diffuser fluidly connected to the inlet and disposed within the regenerative media filter vessel, and at least one pump configured to direct water through the water filtration system. The diffuser may comprise a conduit and a plurality of apertures defined in at least a lower side of a wall of the conduit and sized to allow the particulate media to pass through. A position of the diffuser in the regenerative media filter vessel may be determined by at least a radius of curvature of the concave lower portion and a ratio of a height to an inner diameter of the regenerative media filter vessel. A length of the diffuser, the position of the diffuser, and the inner diameter of the regenerative media filter vessel may be chosen such that, in operation, the diffuser provides a uniform fluid flow distribution of a flow of water directed into the regenerative media filter vessel.

In accordance with another aspect, there is provided a water filtration system. The water filtration system may comprise a regenerative media filter vessel comprising a housing, an inlet, and an outlet, the housing comprising a concave lower portion centered about a vertical axis of the vessel, a diffuser fluidly connected to the inlet and disposed within the regenerative media filter vessel, and at least one pump configured to direct water through the water filtration system. The diffuser may comprise a conduit and a plurality of apertures defined in at least a lower side of a wall of the conduit. A position of the diffuser along a height of the regenerative media filter vessel is determined by at least a ratio of the height to an inner diameter of the regenerative media filter vessel and a radius of curvature of the concave lower portion such that, in operation, a flow of water directed out of the diffuser and into the regenerative media filter vessel has a flow velocity profile having a highest flow velocity at the lower portion and decreasing in velocity as the water approaches a top of the regenerative media filter vessel.

In some embodiments, the ratio of height to inner diameter is at least 0.25:1. In particular embodiments, the ratio of height to inner diameter is no more than 0.55:1.

In some embodiments, the position of the diffuser along a height of the regenerative media filter vessel is further determined by a ratio of the radius of curvature of the concave lower portion to the inner diameter. The ratio of the radius of curvature of the concave lower portion to the inner diameter may be at least 0.5:1 and may be no more than 2:1.

In some embodiments, a sum of an open area of the plurality of apertures is at least 1.5 times an entrance area of the diffuser. In some embodiments, the sum of the open area of the plurality of apertures is no more than 5 times the entrance area of the diffuser. In particular embodiments, the sum of the open area of the plurality of apertures may be from 2 to 3.5 times the entrance area of the diffuser.

In some embodiments, the plurality of apertures spans a portion of a perimeter of the diffuser.

In certain embodiments, the diffuser is configured to provide for a reduction in the flow velocity into the regenerative media filter vessel of at least 50% relative to a flow velocity of water provided to the diffuser from the at least one pump.

In particular embodiments, the flow velocity trends towards zero as the water approaches the top of the regenerative media filter vessel.

In particular embodiments, the flow of water directed into the regenerative media filter vessel has a minimum flow velocity near a bottom of the regenerative media filter vessel that exceeds a settling velocity of the particulate media throughout the water in the regenerative media filter vessel.

In some embodiments, the regenerative media filter vessel further comprises a tube sheet comprising a plurality of tube elements. The diffuser may be positioned between a lowermost extent of the plurality of tube elements and the concave lower portion.

In some embodiments, a pattern of the plurality of apertures is asymmetric along the length of the diffuser. For example, the asymmetric pattern of the plurality of apertures may comprise variable spacing between each of the plurality of apertures. In some embodiments, the asymmetric pattern of the plurality of apertures may comprise variable width of each of the plurality of apertures.

In some embodiments, the plurality of apertures comprises longitudinally extending apertures. In some embodiments, the plurality of apertures comprises transverse apertures. In certain embodiments, a spacing between each of the plurality of apertures is symmetric. In some embodiments, a spacing between each of the plurality of apertures is asymmetric. In any of the embodiments for the plurality of apertures, the plurality of apertures may comprise circular apertures.

In further embodiments, the length of at least one of the plurality of apertures of the diffuser is the same as the length of at least one other of the plurality of apertures. For example, the length of each of the plurality of apertures of the diffuser may be the same. In further embodiments, the length of at least one of the plurality of apertures of the diffuser is different from the length of at least one other of the plurality of apertures. In some instances, the length of each of the plurality of apertures of the diffuser may be different.

In further embodiments, the width of at least one of the plurality of apertures of the diffuser is different from the width of at least one other of the plurality of apertures. For example, the width of each of the plurality of apertures of the diffuser may be different. In further embodiments, the width of at least one of the plurality of apertures of the diffuser is the same as a width of at least one other of the plurality of apertures. For example, the width of each of the plurality apertures of the diffuser may be the same.

In further embodiments, the diffuser includes one or more internal structures positioned above the plurality of apertures.

In accordance with another aspect, a regenerative media filter is provided. The regenerative media filter may comprise a housing having a concave lower portion and a diffuser disposed within the housing proximate the concave lower portion. The diffuser may comprise a conduit with a plurality of apertures defined in at least a lower side of a wall of the conduit. The plurality of apertures may be sized to allow a particulate media to pass therethrough and may be spaced asymmetrically along a length of the conduit.

In some embodiments, each of the plurality of apertures is identical in size and shape.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A illustrates a vessel having a flat lower portion. FIG. 2B illustrates a vessel having a concave lower portion;

FIGS. 3A-3G illustrate views of a diffuser, according to different embodiments. FIG. 3A illustrates an embodiment of a diffuser with apertures along a portion of its length. FIG. 3B illustrates the connection flange of the diffuser of FIG. 3A. FIG. 3C illustrates a top down view of the diffuser of FIG. 3A. FIG. 3D illustrates a side down view of the diffuser of FIG. 3A. FIG. 3E illustrates an upside-down view of the diffuser of FIG. 3A. FIG. 3F illustrates a perspective view of the diffuser of FIG. 3A. FIG. 3G illustrates the diffuser of FIG. 3A viewed along the axis of flow;

FIG. 4A illustrates a diffuser having tapered longitudinally extending apertures. FIG. 4B illustrates a diffuser having short oblong longitudinally extending apertures. FIG. 4C illustrates a diffuser having asymmetrically spaced circular apertures. FIG. 4D illustrates a diffuser having symmetrically spaced circular apertures. FIG. 4E illustrates a diffuser having asymmetrically spaced transverse apertures. FIG. 4F illustrates a diffuser having short oblong longitudinally extending apertures. FIG. 4G illustrates a diffuser having short oblong longitudinally extending apertures and internal structures. FIG. 4H illustrates a diffuser having symmetrically spaced circular apertures of varying diameters. FIGS. 4I and 4J illustrate diffusers having symmetrically spaced transverse apertures;

FIG. 7A illustrates a vertical cross-section cut perpendicular through the flow axis of the diffuser and FIG. 7B illustrates a vertical cross-section cut parallel through the flow axis of the diffuser;

FIG. 9A illustrates the computational domain. FIG. 9B illustrates different sectional fluid flow planes;

FIG. 10A illustrates a perspective view of a regenerative media filter vessel with arrows indicating the direction of fluid flow. FIG. 10B illustrates a vertical cutaway cross-section of the regenerative media filter vessel illustrated in FIG. 10A. FIG. 10C illustrates a perspective view of the vessel base of the regenerative media filter vessel illustrated in FIG. 10A. FIG. 10D illustrates the tube element illustrated in FIG. 10B;

DETAILED DESCRIPTION

Figure 1:
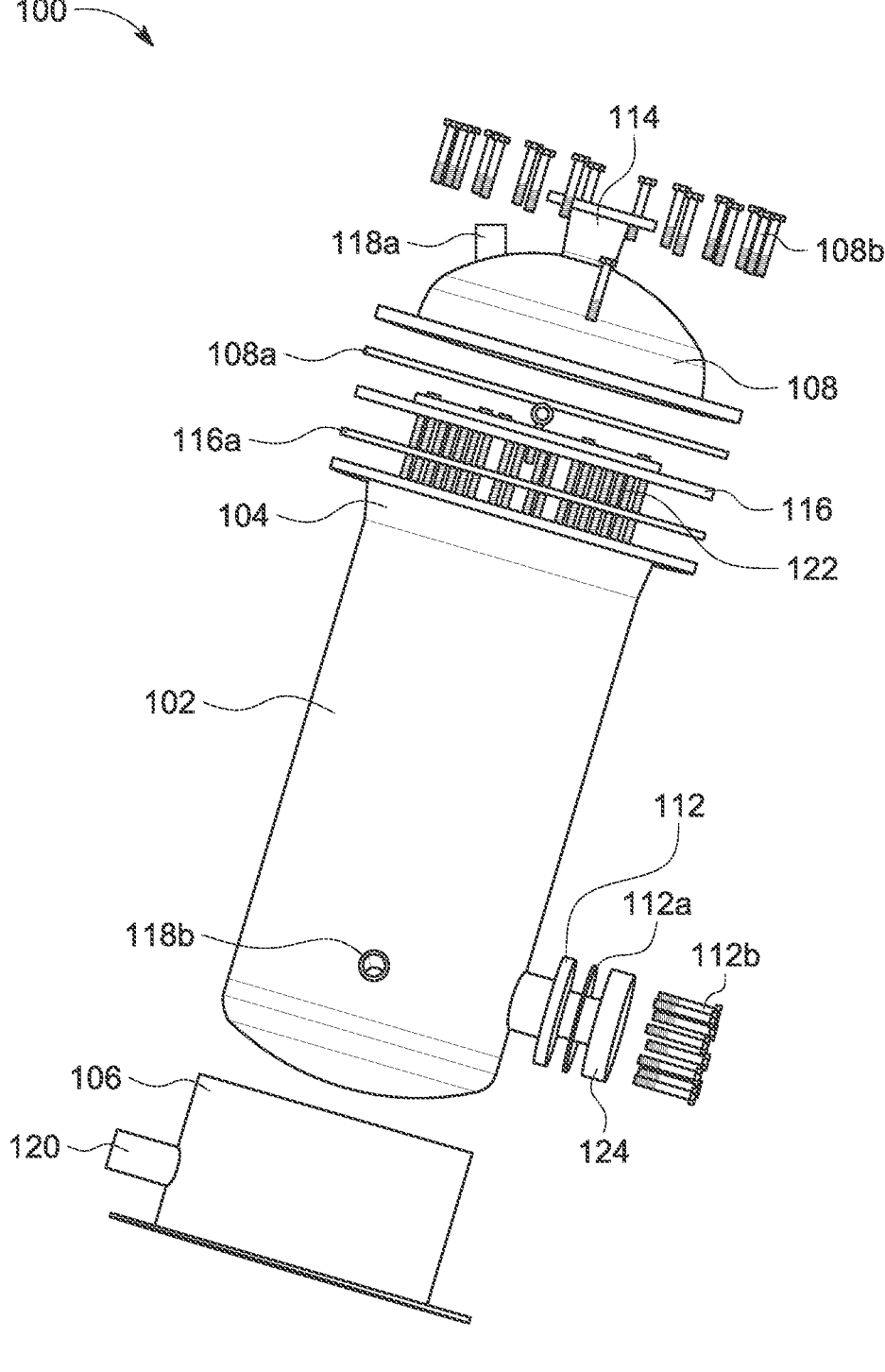
FIG. 1 illustrates an exploded view of a regenerative media filter vessel, according to one or more embodiments.

Systems for the treatment of water for use in aquatics and recreational facilities are disclosed herein. The systems described herein may provide filtration of the aquatic and/or recreational water by treatment with a media filter. Media filters typically function as particle removal filters by using a structure, for example, a porous structure, on which a medium may be coated. For example, a regenerative media filter may comprise a tube sheet containing a plurality of porous tube elements and a perlite or diatomaceous earth (DE) media.

Media filters generally employ a special grade particulate media to treat water. The special grade medium may be contained in a vessel or other container. The media filter may be a pressure-fed or high-rate media filter. During filtration, the water to be treated may be fed to the media filter vessel, for example, by one or more pumps. Inside the media filter vessel, the water may be distributed by a water distribution head before coming into contact with the special grade medium in the vessel. Generally, the special grade medium acts as a substrate and catches solid contaminants contained in the water. The filtered water is removed from the vessel and may be returned to the source for further use in the aquatic or recreational facility.

In accordance with certain embodiments, the media filter may be a regenerative media filter, an activated carbon filter, or a walnut shell filter. The media filter may comprise any suitable particulate media for filtering aquatic and/or recreational water. The media filter may comprise perlite or DE media. In some embodiments, the media filter may be, for example, a DEFENDER® media filter (distributed by Evoqua Water Technologies LLC, Pittsburgh, PA).

The regenerative media filter vessel may comprise a structure coated with the media. For example, the regenerative media filter vessel may comprise plastic tube elements, optionally porous plastic tubes. A plurality of tube elements may be suspended inside of a regenerative media filter vessel by having an end releasably connected to a supporting structure, such as a sheet of a polymer or other similarly supportive substrate. In such an embodiment, the porous tubes may be used to prevent the media from passing into the filtrate of the regenerative media filter vessel. Once coated, the water to be treated may pass through the coating and then through the plurality of tube elements. The coating layer may include very fine filtration media, such that the regenerative media filter vessel may filter liquids to a small particle size. In some embodiments, the regenerative media filter vessel may be configured to filter liquids to remove particles less than 10 μm in size. The term size, as used herein with respect to particle sizes, refers to the greatest dimension of a particle. The regenerative media filter vessel may be configured to filter liquids to remove particles less than about 10 μm, less than about 5 μm, less than about 3 μm, or less than about 1 μm in size.

The regenerative media filter vessel may generally be connectable, and in use fluidly connected, to a source of the aquatic and/or recreational water. In accordance with one aspect, there is provided a system for treating water. The water may be destined for use in aquatics or recreational facilities. The system may comprise a regenerative media filter vessel connectable to a source of water. The system may comprise one or more pipes, valves, or pumps positioned to distribute the water within the system and optionally to return the treated water to a destination after treatment.

In some embodiments, the aquatic and/or recreational water to be treated may include water for human or veterinary applications. For example, the aquatic or recreational water may be used for swimming. The aquatic and/or recreational water may be associated with a pool, spa, hot tub, water park, water fountain, aquarium, zoo, animal reserve, and the like. Typically, the regenerative media filter vessel may be positioned in the vicinity of the source of the aquatic and/or recreational water. In some embodiments, the regenerative media filter vessel may be remote from the source of the aquatic and/or recreational water.

While embodiments described herein generally refer to aquatic and recreational facilities water, such an application is exemplary. It should be understood that the systems disclosed may be employed for filtration of any fluid to be filtered with a particulate media filter. For instance, systems disclosed herein may be employed for filtration of potable water, aquaculture, irrigation, stormwater management, water for use of oil and gas processing, and other applications.

The regenerative media filter vessel may be of a size suitable for processing between 25 and 3000 gallons per minute (GPM) of water. For example, the regenerative media filter vessel may be sized to process between about 25 GPM and about 100 GPM, between about 50 GPM and about 250 GPM, between about 150 GPM and about 300 GPM, between about 200 GPM and about 400 GPM, between about 300 GPM and about 450 GPM, between about 400 GPM and about 500 GPM, between about 450 GPM and about 800 GPM, between about 600 GPM and about 1000 GPM, between about 800 GPM and about 1500 GPM, between about 1000 GPM and about 2000 GPM, between about 1500 GPM and about 2500 GPM, or between about 2000 GPM and about 3000 GPM. The regenerative media filter vessel may comprise more than one vessel, arranged in series or in parallel. Generally, the size and arrangement of regenerative media filter vessels may vary with the size of aquatic or recreational structure to be filtered.

In accordance with one or more embodiments, a water filtration system may include a regenerative media filter vessel. Examples of regenerative media filter vessels are disclosed in PCT/US2019/062373 filed Nov. 20, 2019 titled "REGENERATIVE MEDIA FILTER AIR SCOURING APPARATUS AND METHOD," PCT/US2019/056850 filed Oct. 18, 2019 titled "REGENERATIVE MEDIA FILTER AND RELATED METHODS," and WO 2019/055903 filed Sep. 17, 2018 titled "SAND FILTER LED STATUS LIGHT," all assigned to Evoqua Water Technologies LLC, Pittsburgh, PA, the disclosures of which being incorporated herein by reference in their entireties for all purposes.

An example of a regenerative media filter vessel is illustrated in FIG. 1 in an exploded view. The regenerative media filter vessel 100 includes a vessel housing 102, a vessel top 104, and a vessel base 106. The vessel top 104 includes top cover 108, and vessel outlet 114. Housed within the vessel housing 102 is tube sheet assembly 116 including a plurality of tube elements 122. The tube sheet assembly 116 is sealed to the vessel top 104 using tube sheet gasket 116*a*. The top cover 108 is sealed to the tube sheet assembly 116 using top cover gasket 108*a*. The top cover 108 and tube sheet assembly 116 are connected to the vessel top 104 using top cover fasteners 108*b*. The vessel base 106 includes a vessel inlet 112 comprising a diffuser 124 that is sealed to the vessel base 106 using an inlet gasket 112*a* and inlet fasteners 112*b*. The vessel base 106 also includes a vessel drain 120, with both the top cover 108 and vessel base 106 including vacuum ports 118*a*, 118*b*, respectively.

The regenerative media filter vessel may be manufactured from any suitable material that is compatible with aquatic environments and can maintain internal pressures consistent with those applied from pumps and other equipment. For example, the regenerative media filter vessel may be manufactured from polymeric materials such as polyvinyl chloride (PVC), fiberglass-reinforced polymer (FRP), polyethylene (PE), or polypropylene (PP). Other suitable materials are known in the art. An exemplary material is PVC and it provides numerous advantages over other materials. PVC is a relatively inexpensive material that is readily available that can withstand applied pressures beyond those of the systems described herein. PVC has excellent chemical compatibility with the chemicals found in aquatic environments (for example, salts, hypochlorite ions, and ozone) and thus has a notably long working life cycle before needing to be replaced. Certain thicknesses of PVC, such as Schedule 40, have attained regulatory approval, for example NSF-50 that sets a design pressure rating of 4× the maximum operating pressure, for use in residential and commercial aquatic settings. Further, PVC is a highly workable material, readily taking to solvent welding to form continuous structures and surface treatments to improve UV resistance and weatherability.

The regenerative media filter vessel may have a ratio of a height to an inner diameter of at least 0.25:1. As used herein, the "height" refers to the distance measured between the centerline of the diffuser and the maximum of the radius of curvature of concave lower portion of the regenerative media filter vessel. The height to inner diameter ratio may be used, at least in part, to determine the position of a flow diffuser within the regenerative media filter vessel. In some embodiments, the regenerative media filter vessel may have a ratio of the height to the inner diameter of no more than 0.55:1. For example, the ratio of the height to the inner diameter of the regenerative media filter vessel may be from 0.25:1 to 0.30:1, from 0.275:1 to 0.35:1, from 0.30:1 to 0.375:1, from 0.35:1 to 0.40:1, from 0.375:1 to 0.425:1, from 0.40:1 to 0.475:1, from 0.425:1 to 0.50:1, or from 0.45:1 to 0.55:1. An exemplary regenerative media filter vessel has a ratio of height to inner diameter of 0.46.

In some embodiments, the regenerative media filter vessel may have a ratio of the radius of curvature of the concave lower portion to the inner diameter of at least 0.5:1. A ratio of 0.5:1 describes a perfect hemisphere. As the ratio increases, the concavity of the concave lower portion is reduced. If this ratio is too large, the concave lower portion may, in effect, be a flat portion that may not allow for a flow of water to have a uniform flow distribution within the regenerative media filter vessel. The radius of curvature of the concave lower portion to inner diameter ratio may be used, at least in part, to determine the position of the diffuser within the regenerative media filter vessel. In some embodiments, the regenerative media filter vessel may have a ratio of the radius of curvature of the concave lower portion to the inner diameter of no more than 2:1. For example, the regenerative media filter vessel may have a ratio of the radius of curvature of the concave lower portion to the inner diameter from 0.5:1 to 1:1, from 0.75:1 to 1.25:1, from 1:1 to 1.5:1, from 1.25:1 to 1.75:1, or from 1.5:1 to 2:1.

In some embodiments, the inlet of the regenerative media filter vessel includes a diffuser fluidly connected to the inlet and disposed within the regenerative media filter vessel. The diffuser is designed and constructed to provide for a uniform fluid flow distribution within the regenerative media filter vessel. By "uniform fluid flow distribution," it is meant that flow entering the regenerative media filter vessel has a reduced flow velocity as compared to the flow velocity of water entering the diffuser, is substantially laminar, and is symmetric about a central vertical axis of the regenerative media filter vessel over a majority of the height of the vessel.

Uniform fluid flow distribution of water entering the vessel is a consideration for the efficiency of filtration and the coating of the plurality of tube elements with particulate media. Fluid flow that is not uniformly distributed may, for example, reduce the effective media coating thickness on some or all of the plurality of tube elements. Uncoated surfaces of tube elements, or surfaces with less than the minimum media coating thickness, may contribute to filter breakthrough and a reduction in filtrate quality. Further, turbulent flow into the regenerative media filter vessel may inadvertently deposit particulate media onto surfaces where it is not intended, increasing particulate media use and costs. A uniform fluid flow distribution of water entering the vessel may aid in uniformly coating the plurality of tube elements and thus reduce cycle time of the regenerative media filter vessel.

Figures 2A, 2B:
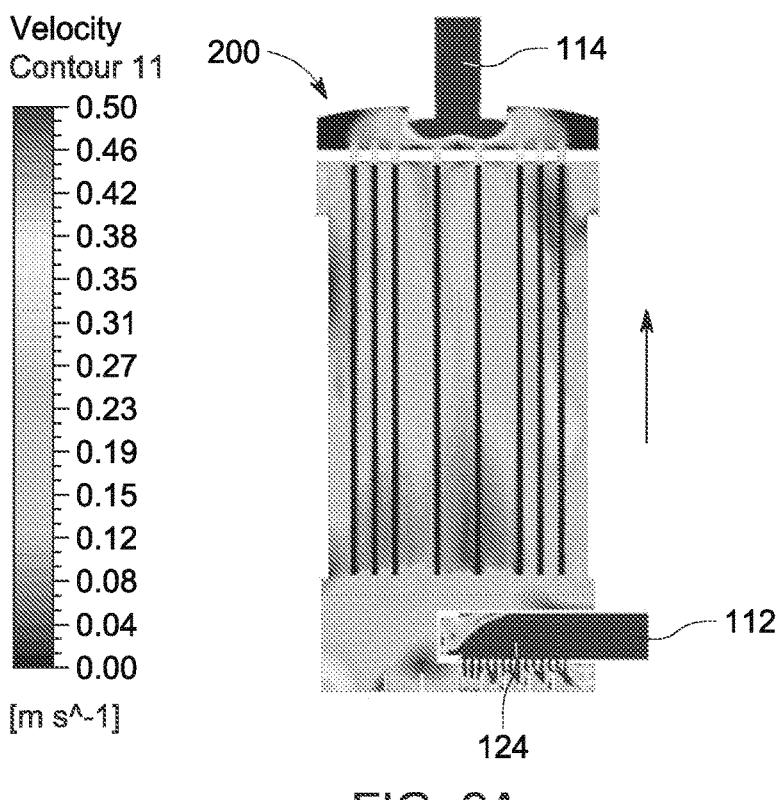
FIGS. 2A-2B illustrate contour plots of the velocities of water at various points within a regenerative media filter vessel housing with a diffuser installed.

In some embodiments, the diffuser is positioned within the regenerative media filter proximate the concave lower portion. The diffuser generally includes a conduit having a plurality of apertures defined in at least a lower side of a wall of the conduit. The plurality of apertures may be configured, that is, sized and shaped, to allow a particulate media within the regenerative media filter vessel to pass through. The diffuser is generally configured to receive a flow of water at any velocity or flow characteristics and output a smoother flow with a reduced velocity and more uniform flow distribution. For example, the diffuser may be configured to receive a turbulent flow of water, such as water from a pump at a high velocity and provide for a reduction in the flow velocity of water into the regenerative media filter vessel. In some embodiments, the diffuser may be configured to provide for a reduction in the flow velocity into the regenerative media filter vessel of at least 50% relative to water provided to the diffuser from the at least one pump. For example, the diffuser may be configured to reduce a 300 GPM flow with a velocity of 12 feet per second (fps) down to between 3-4 fps. Examples of the reduction in velocity of water pumped through the diffuser and into the vessel are illustrated in FIGS. 2A and 2B.

Example embodiments of diffusers are illustrated in FIGS. 3A-3G and FIGS. 4A-4J. In the illustrated examples, the diffusers include a conduit and a plurality of apertures positioned in at least a lower wall of the conduit. The plurality of apertures may be transverse, that is, orthogonal, to the axis of flow through the diffuser, as shown in FIGS. 3A-3G, 4E, 4I, and 4J. Alternatively, the plurality of apertures may be longitudinally extending apertures, that is, parallel to the axis of flow through the diffuser. Example embodiments of diffuser having longitudinally extending apertures are illustrated in FIGS. 4A, 4B, 4F, and 4G. In some embodiments, the plurality of apertures may be circular apertures, such as the embodiments illustrated in FIGS. 4C, 4D, and 4H. In embodiments that include circular apertures, the circular apertures may be arranged transverse to or longitudinally with the axis of flow through the diffuser. Alternatively, or in addition, circular apertures may be positioned in any pattern independent of the axis of flow through the diffuser. In some embodiments, the plurality of apertures spans a portion of a perimeter of the diffuser. For example, the plurality of apertures may be located only on the perimeter of a lower portion or lower region of the diffuser, such as the lower portion of the generally cylindrical diffusers illustrated in FIGS. 3A-3G and 4A-4J. Alternatively, the plurality of apertures may span any portion of perimeter of the diffuser to provide the desired reduction in flow velocity. The number of apertures may be any suitable number, that is, the number of apertures may be from 1 to 100, inclusive. In the diffuser configuration shown in FIGS. 3A-3G and 4A-4J that is generally cylindrical, water introduced to the diffuser can flow down and away from the diffuser.

The overall length of the diffuser, that is, the portion of the diffuser that is disposed with the regenerative media filter vessel, is sufficient such that the water directed out of the diffuser and into the regenerative media filter vessel can uniformly contact each of the plurality of tube elements. A diffuser length that is too short may not be able to include a sufficient number of apertures to achieve the desired reduction in flow velocity and/or may not be able to direct water to each of the plurality of tube elements.

Figure 5:
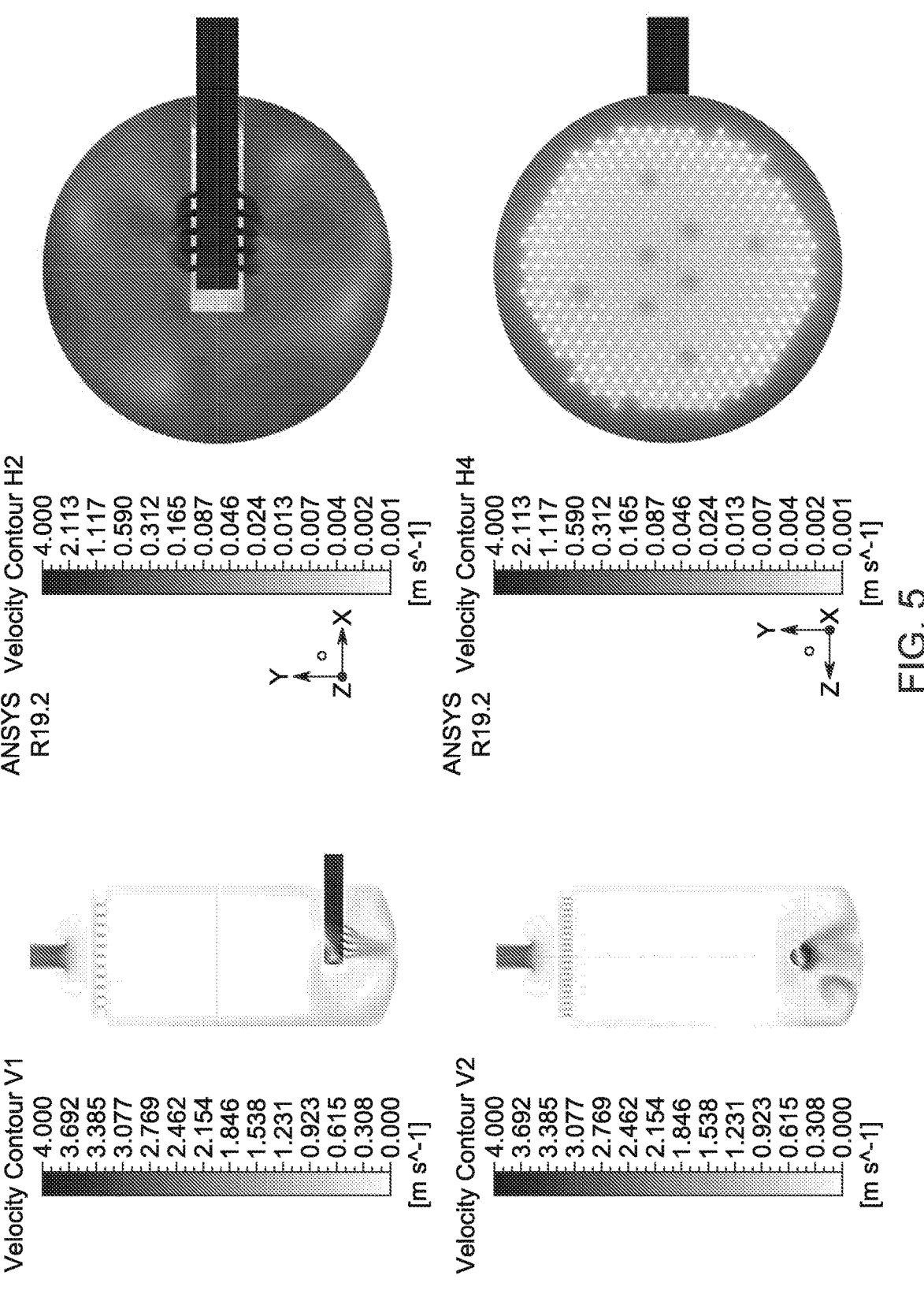
FIG. 5 illustrates flow velocity contours at various planes for a regenerative media filter vessel including the diffuser illustrated in FIGS. 3A-3G.
Figure 6:
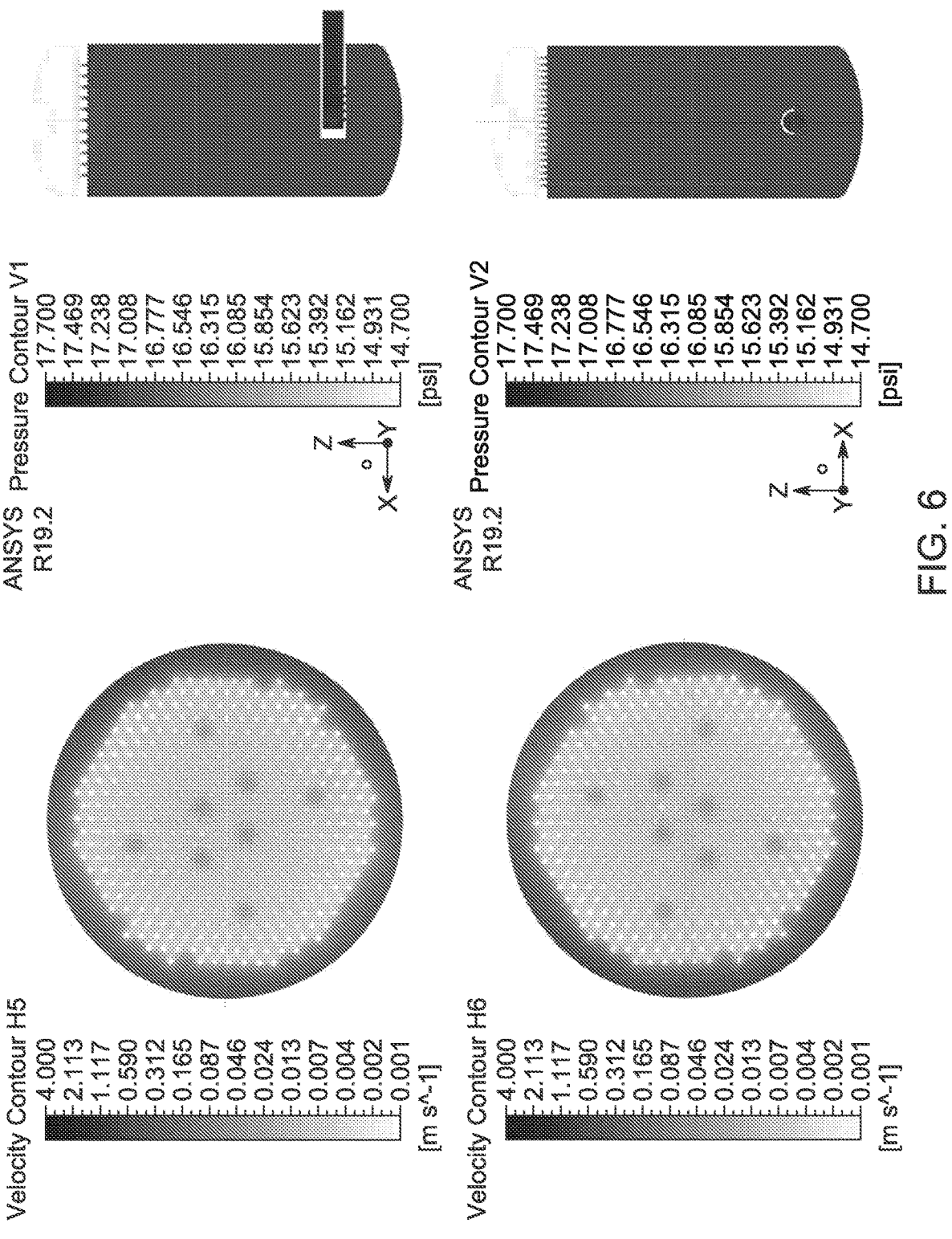
FIG. 6 illustrates flow velocity and fluid pressure contours at various planes for a regenerative media filter vessel including the diffuser illustrated in FIGS. 3A-3G.

The plurality of apertures may be sized, that is, in length and width, and shaped to provide for a reduction in the flow velocity of water through the diffuser. For example, FIGS. 5 and 6 illustrate flow velocity and pressure contours of flow into a regenerative media filter vessel equipped with the diffuser illustrated in FIGS. 3A-3G showing the reduction in flow velocity into the vessel. Apertures that are too large may not have sufficient water pressure to direct water introduced into the vessel into contact the plurality of tube elements, and apertures that are too small may be prone to becoming clogged with particulate media as water flows within the vessel. The apertures may have a minimum dimension (that is, a length or width) of at least 0.5 inches to avoid being clogged with particulate media.

In some embodiments, a sum of an open area of the plurality of apertures may be at least 1.5 times an entrance area of the diffuser. As used herein, the "entrance area" of the diffuser refers to the area of the opening in the connection flange of the diffuser where water is directed into. For a generally cylindrical diffuser as disclosed herein, the open area of the diffuser is the area of the perpendicular cross-section of the diffuser, $\pi r^2$. Other diffuser shapes are within the scope of this disclosure. In some embodiments, the sum of the open area of the plurality of apertures may be no more than 5 times the entrance area of the diffuser. For example, the regenerative media filter vessel may have a diffuser that has a sum of the open area of the plurality of apertures from 1.5 to 2.5 times the entrance area of the diffuser, from 2 to 3 times the entrance area of the diffuser, from 2.5 to 3.5 times the entrance area of the diffuser, from 3 to 4 times the entrance area of the diffuser, from 3.5 to 4.5 times the entrance area of the diffuser, or from 4 to 5 times the entrance area of the diffuser. Exemplary diffusers may have a sum of the open area of the plurality of apertures between 2 and 3.5 times the entrance area of the diffuser. The increased open area of the plurality of apertures of the diffuser may be sufficient to provide for a reduction in flow velocity into the regenerative media filter vessel while maintaining sufficient water pressure into the regenerative media filter vessel for a desired level of filter vessel performance and/or coating of the plurality of tube elements with particulate media.

Figure 4A:
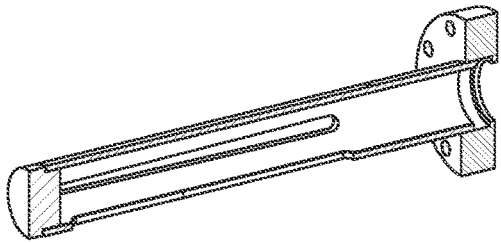
FIGS. 4A-4J illustrate different diffuser designs.
Figure 4B:
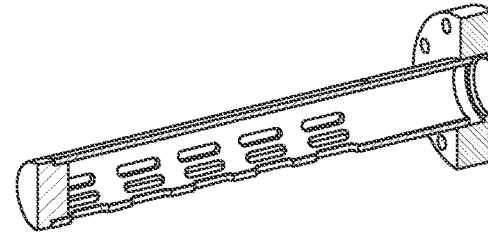

In some embodiments, the pattern of the plurality of apertures along the length of the diffuser may be asymmetric. The asymmetry may be in any aspect of the diffuser, such as a variable length and/or width of each of the plurality of apertures and/or a variable spacing between each of the plurality of apertures. For example, each of the plurality of apertures of the diffuser may have a variable width. Embodiments of a diffuser having apertures with varying width and/or diameter are illustrated in FIGS. 4H, 4I and 4J, where the width and/or diameter of the apertures decreases along the length of the diffuser from the entrance to the capped end. Alternatively, or in addition, each of the plurality of apertures of the diffuser may have a variable spacing between the apertures. An embodiment of a diffuser having apertures with varying spacing is illustrated in FIG. 4E, where the apertures are depicted as uniformly sized rectangular transverse apertures that have increased spacing along the length of the diffuser from the entrance to the capped end. In this configuration, there is an increased number of apertures located at the entrance to the diffuser and fluid flow into the diffuser may be more effectively diffused as the flow travels along the length of the diffuser and into the regenerative media filter vessel. In some embodiments, the diffuser may contain any combination of aperture shapes, dimensions, and/or spacings, and the invention is not limited to the shapes, dimensions, and/or spacing between apertures in the diffuser.

In some embodiments, each of the plurality of apertures may have uniform or identical dimensions. For example, FIGS. 3A-3G and 4E illustrate embodiments of diffusers with apertures shown as rectangular openings where the width of each aperture is uniform, that is, identical in size and shape, and positioned closer to the capped end of the diffuser. As another example, FIGS. 4B, 4F, and 4G illustrate embodiments of diffusers with apertures shown as uniformly shaped longitudinally extending oblong apertures where each aperture is identical in size and shape. Alternatively, each of the plurality of apertures may have a dimension that is non-uniform, that is, the aperture may be tapered. An embodiment of a diffuser with tapered longitudinally extending apertures is illustrated in FIG. 4A. In embodiments with circular apertures, each of the circular apertures may have substantially the same diameter, such as the embodiments illustrated in FIGS. 4C-4D. Alternatively, each of the circular apertures may have different diameters, such as the embodiment illustrated in FIG. 4H. In some embodiments, the length of at least one of the plurality of apertures of the diffuser may be the same as the length of at least one other of the plurality of apertures. Alternatively, or in addition, the length of at least one of the plurality of apertures of the diffuser may be different from the length of at least one other of the plurality of apertures. Alternatively, the length of each of the plurality of apertures of the diffuser may be different.

In some embodiments, the width of at least one of the plurality of apertures of the diffuser may be the same as the width of at least one other of the plurality of apertures. Alternatively, or in addition, the width of at least one of the plurality of apertures of the diffuser may be different from the width of at least one other of the plurality of apertures. For example, the length of each of the plurality of apertures and the width of each of the plurality of apertures of the diffuser may be the same, such as the apertures illustrated in FIGS. 3A-3G. In FIGS. 3A-3G, the apertures are configured as rectangular slots that are identical in length and width positioned orthogonal to the flow axis through the diffuser.

In some embodiments, the diffuser may include one or more internal structures configured to reduce flow velocity of fluid before passing through the plurality of apertures. For example, a diffuser may include one or more internal structures, such as baffles, positioned above the plurality of apertures to guide fluid towards the plurality of apertures. An example of a diffuser including internal projections is illustrated in FIG. 4G. One of skill in the art can appreciate that the total number, physical dimensions, position along the diffuser for each of the plurality of apertures, and any other internal structural features of the diffuser may be chosen for a desired level of performance, for example, flow velocity reduction, tube element coating efficiency, or overall filtration performance.

Figure 7A:
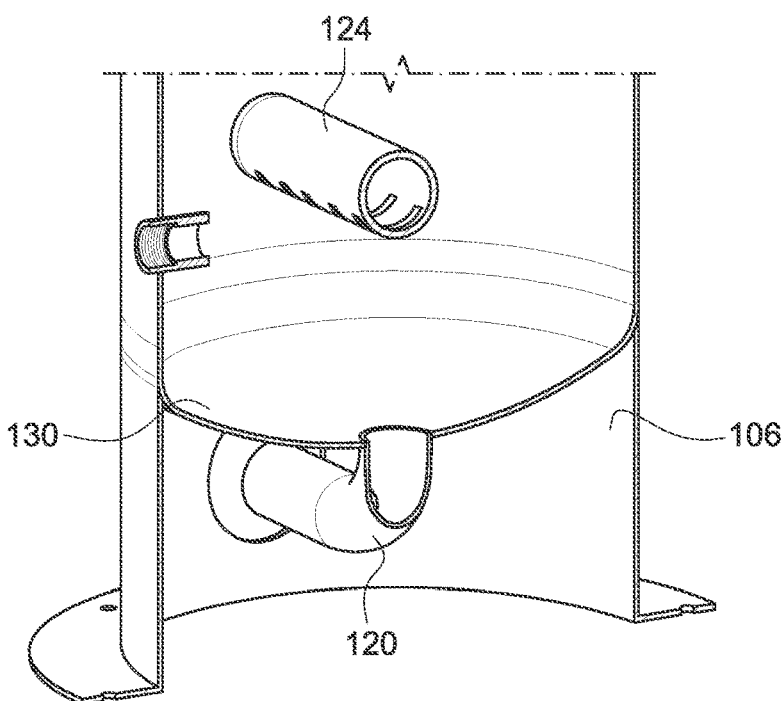
FIGS. 7A-7B illustrate cutaway views of a lower portion of a regenerative media filter vessel housing with a diffuser installed, according to one embodiment.
Figure 7B:
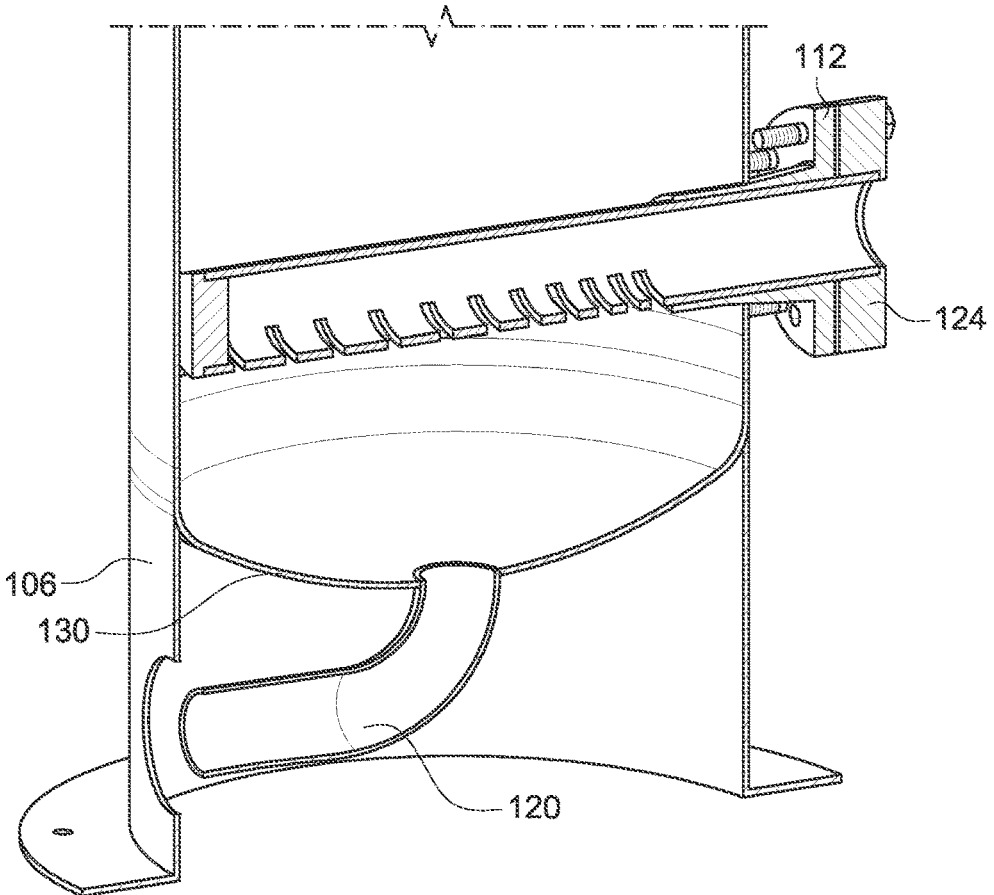

In some embodiments, the housing of the regenerative media filter vessel may include a concave lower portion that is centered about a vertical axis of the vessel. The concave lower portion may be configured to promote the flow of water, and any component of the water such as particulate media, up and through the vessel. The concave lower portion prevents, at least in part, clogging of the particulate media as it passes through the apertures of the diffuser. The concave lower portion further prevents buildup of particulate media in certain areas of the regenerative media filter vessel. The concave lower portion may also facilitate the draining of liquid and spent particulate media out of the regenerative media filter vessel prior to replacement of the particulate media. Examples of regenerative media filter vessels having a concave lower portion 130 are illustrated in FIGS. 1, 7A, and 7B. With reference to FIGS. 7A and 7B, the diffuser 124 inserted into inlet 112 may be positioned over the approximate point of highest curvature of the concave lower portion 130 (part of the vessel base 106) over the drain 120. In this configuration, water that is pumped through the diffuser 124 is able to follow the curvature of the concave lower portion 130 and flow up the height of the regenerative media filter vessel in a controlled and uniform fashion to ensure that water, and in some instances, fresh particulate media as described herein, can contact the plurality of tube elements within the regenerative media filter vessel. As shown in FIGS. 7A and 7B, the concave lower portion may be circular in profile, that is, have a circular arc. In other embodiments, the concave lower portion may also be elliptical in profile. In any embodiment of a regenerative media filter vessel having a concave lower portion, a fillet may be added to the junction between the concave lower portion and the vertical wall of the vessel to provide a smooth transition between the two sections.

In a regenerative media filter vessel, the particulate media may be removed from the plurality of tubes once the filtration performance has eroded, indicating that the interstitial spaces between media particles are clogged with contaminants. Water is typically directed through the plurality of tube elements or the plurality of tube elements are mechanically agitated to facilitate media removal. Fresh media is typically added back onto the plurality of tube elements in a pre-filtration process where new particulate media is added to the vessel and water is introduced to the inlet of the regenerative media filter vessel and through the diffuser to suspend the particulate media and allow it to build up on the surfaces of the plurality of tube elements. In some embodiments, the coating of particulate media on the plurality of tube elements may be up to about 5 mm thick, for example, from 2-5 mm thick. In some embodiments, the efficiency and timescale of the pre-filtration process may be determined by the position of the diffuser along the height of the regenerative media filter vessel.

The position of the diffuser within the regenerative media filter vessel, that is, the height at which it is positioned and its overall length into the regenerative media filter vessel, may be determined by a number of factors that provide a flow of water with a desired level of performance. In general, for regenerative media filter vessels described herein that include a plurality of tube elements, the diffuser should be positioned between the lowermost extent of the plurality of tube elements and the concave lower portion. The dimensions of the space between the lowermost extent of the plurality of tube elements and the concave lower portion may depend on the length of the tube elements, which in some embodiments, may be from 1 foot to 6 feet in length. For example, the position of the diffuser along the height of the regenerative media filter vessel may be determined by at least the ratio of the height to the inner diameter of the regenerative media filter vessel and a radius of curvature of the concave lower portion such that, in operation, a flow of water directed out of the diffuser and into the regenerative media filter vessel has a minimum flow velocity near a bottom of the regenerative media filter vessel that exceeds a settling velocity of the particulate media throughout the water in the regenerative media filter vessel. Other factors that may be used to determine the position of the diffuser within the regenerative media filter vessel include, but not limited to, the length of the diffuser, the diameter of the diffuser, the ratio of the inner diameter to the radius of curvature of the concave lower portion, and the length, number, and size of each of the plurality of apertures and the relative spacing therebetween.

In some embodiments, there may be a minimum distance between the centerline of the diffuser and the concave lower portion of the regenerative media filter vessel. This minimum distance may be set to, at least in part, reduce clogging of the apertures of the diffuser with the particulate media. For example, if the diffuser is positioned too close to the concave lower portion, the diffuser may become clogged with particulate media and/or the concave lower portion may become filled with particulate media and not allow it to pass into the regenerative media filter vessel. On the other hand, if the diffuser is positioned too far from the concave lower portion, the particulate media may not be able to coat the full length of each of the plurality of tube elements and/or the coating process may not occur on a timescale that is practical to an end user or operator. In addition, a diffuser that is positioned too far from the concave lower portion may not allow for fluid flow to reach the bottom of the regenerative media filter vessel. This may result in the formation of stagnant zones into which the particulate media may settle and accumulate during a tube element coating process or during filter operation. Thus, the position of the diffuser may be determined by measuring the amount of time necessary to properly coat the plurality of tube elements with particulate media.

For the particulate media to build up a sufficient coating on the tube elements, the particulate media should be in suspension such that it can contact the tube elements and allow for additional media-to-media contact. In such implementations, for the particulate media to remain suspended, the flow of water in the regenerative media filter vessel from the concave lower portion into the plurality of tube elements should have an upward velocity component that exceeds the settling velocity of the particulate media in water under gravity. If this condition is not met, the particulate media will settle to the bottom of the regenerative media filter vessel without coating the plurality of tube elements. The settling velocity of the particulate media is a function of the density of the media, which for typical media used in a regenerative media filter vessel, such as perlite, is about 1.1 g/cm$^3$. In the context of the present disclosure, for the particulate media to remain suspended in the regenerative media filter vessel such that it can effectively coat the plurality of tube elements, the flow of water should be sufficient to overcome the force of gravity acting on the particulate media as it moves through the water, which in the context of this disclosure may be considered a dilute suspension of particulate media. This relationship may be illustrated by Stokes' equation for laminar flow, which describes the relationship between particle velocity, gravitational acceleration, and the viscosity of the medium the particle travels in. The settling velocity of a particle through water may be described by the following equation:

$$v = \frac{2}{9}(\rho_s - \rho_w)\frac{gr^2}{\mu}$$

Where:
  v=settling velocity of particle (m/s);
  $\rho_s$=density of particle (kg/m$^3$);
  $\rho_s$=density of water (kg/m$^3$);
  g=gravitation acceleration (m/s$^2$);
  r=particle radius (μm); and
  μ=viscosity of water (kg/(s·m)).
As a non-limiting example, perlite particulate media having a specific gravity of 2.3 and a particle radius of 160 μm (which is the 90$^{th}$ percentile in the typical measured perlite particle size distribution) would have a settling velocity in water of approximately 0.02 m/s. Thus, water flow within a regenerative media filter vessel of this disclosure having a velocity component in the upward direction greater than 0.02 m/s would keep these particles in suspension within the regenerative media filter vessel.

In some embodiments, the position of the diffuser in the regenerative media filter vessel may be determined by at least a radius of curvature of the concave lower portion and a ratio of a height to an inner diameter of the regenerative media filter vessel. The length of the diffuser, the position of the diffuser, and the inner diameter of the regenerative media filter vessel, in addition to the radius of curvature of the concave lower portion and the ratio of height to inner diameter of the regenerative media filter vessel, may be chosen such that, in operation, the diffuser provides a uniform fluid flow distribution of a flow of water directed into the regenerative media filter vessel. As noted herein, the ratio of the inner diameter to radius of curvature may be additionally used, at least in part, to determine the position of the diffuser within the regenerative media filter vessel.

In some embodiments, the position of the diffuser along a height of the regenerative media filter vessel may be determined by at least the ratio of the height to the inner diameter of the regenerative media filter vessel and the radius of curvature of the concave lower portion such that, in operation, a flow of water directed out of the diffuser and into the regenerative media filter vessel has a flow velocity profile having a highest flow velocity at the lower portion and decreasing in velocity as the water approaches a top of the regenerative media filter vessel. The flow velocity of water within the regenerative media filter vessel may not be the same throughout the vessel. Rather, flow velocity may be a continuum, having the greatest magnitude at a point closest to the inlet and decreasing along the height of the regenerative media filter vessel such that the magnitude is essentially zero at the top of the regenerative media filter vessel where the tube sheet is positioned. This is illustrated in FIGS. 2A and 2B, where the water entering the diffuser has high velocity at the inlet of the regenerative media filter vessel and diffuses throughout. There is also an area of high velocity that is in the immediate area near the outlet, as illustrated in FIGS. 2A and 2B, that is separated from the continuum of water velocities within the main interior of the regenerative media filter vessel by the tube sheet.

Health Departments typically regulate a turnover rate of water filtration in a swimming pool. For instance, Health Departments may instruct a maximum turnover rate. The systems disclosed may be operated to have an aquatic or recreational water turnover rate of at most 4 hours, 5 hours, 6 hours, 7 hours, or 8 hours.

Flow rate of water being filtered through the media filter may have an effect on turnover rate. In accordance with certain embodiments, the system may be operated at a flow rate of at least a threshold flow rate to provide the desired turnover rate. In such embodiments, the systems disclosed herein may have flow rates monitored or controlled. The systems disclosed herein may be operated in a cleaning or drain mode responsive to the flow rate being lower than a threshold flow rate.

The threshold flow rate may be calculated by the following equation:

$$F = \frac{V}{t}$$

Where:
  F=threshold flow rate (GPM);
  V=volume of water in swimming pool (g); and
  t=maximum turnover time (min).
A regenerative media filter vessel comprising a plurality of tube elements with porous media, such as a DEFENDER® filter, may be cleaned by expelling the media and contaminants from the plurality of tube elements within the vessel and into suspension. The cleaning process generally allows the tube elements to receive a fresh coating of porous media once the media particles reattach to the tube elements. After cleaning, the tube elements may be recoated with media using a coating or pre-filtering process. The recoated media filter may be placed back into service.

Systems disclosed herein may employ a hydraulic cleaning process. The hydraulic cleaning process generally employs a recirculating pump and one or more valves to functionally achieve reverse recirculation of water through the plurality of tube elements. The one or more valves may be manually actuated by a user or service provider to open or close in a predetermined sequence to perform the hydraulic cleaning process. The hydraulic effect from the actuation sequence may dislodge the media from the plurality of tube elements and send it into suspension, without causing significant mechanical stress on the plurality of tube elements. Specifically, the hydraulic process may effectively remove media and contaminants from the plurality of tube elements without physically raising and lowering the plurality of tube elements.

Systems described herein may be operated in a cleaning mode. The cleaning mode may include directing water through the media filter in a direction that is opposite that of the filtration mode. The flow of water in the second direction may cause the particulate media to be suspended in the filtered water. The cleaning mode may generally comprise manually closing a feed valve to block passage of water into the regenerative media filter vessel and closing an end use valve to block passage of the filtered water out of the regenerative media filter vessel. One or more recirculation valves may be opened to allow passage of the filtered water through a recirculation line of the regenerative media filter vessel.

Systems as described herein may be operated in the cleaning mode for a period of time sufficient to decrease the internal pressure of the regenerative media filter vessel to be within an operating pressure range associated with restored operation of the regenerative media filter. When the internal pressure of systems as described herein has been restored to normal operating level, the systems may be returned to the filtration mode.

Systems described herein may be operated in a pre-filtration mode. The pre-filtration mode may comprise directing the water through the regenerative media filter vessel in the first direction. The pre-filtration mode may be configured to coat the plurality of tube elements with the particulate media in preparation for the filtration mode. The pre-filtration mode may generally comprise operating the system with the same valve configuration as the cleaning mode but reversing directionality of the water through the recirculation line. Thus, during the pre-filtration mode, the feed valve may be closed to block passage of water into the system and the end use valve may be closed to block passage of the filtered water out of the system. One or more recirculation valves may be opened to allow passage of the filtered water through the recirculation line of the system. The one or more valves may be manually actuated by a user or service provider to open or close in a predetermined sequence to perform the pre-filtration mode.

The systems disclosed herein may be operated in the pre-filtration mode for a period of time sufficient to coat the plurality of tube elements with the particulate media. The period of time may be between about 8-15 minutes. The period of time may be between about 8-10 minutes, 10-12 minutes, or 12-15 minutes. After coating the tube elements in the pre-filtration mode, the systems disclosed herein may be returned to operating in the filtration mode.

In certain embodiments, the systems described herein may be operated in the pre-filtration mode upon start-up. In such embodiments, the system may be loaded with water or feed water prior to operation in the pre-filtration mode. After a period of time sufficient to coat the plurality of tube elements, the systems described herein may be operated in the filtration mode, as previously described.

The regenerative media filter vessel may be periodically drained. During cycled use, as previously described, contaminants may build up within the media adsorbed onto the plurality of tube elements. The contaminants may be removed from the porous media by operating in the cleaning mode. However, the contaminants are generally retained within the regenerative media filter vessel during and after the cleaning mode, until the media filter vessel is drained. Thus, the systems described herein may be operated in a drain mode. The drain mode may include opening a drain valve on the regenerative media filter vessel and draining the regenerative media filter vessel of water, particulate media, and contaminants. The drain mode may additionally comprise opening a feed valve to flush the regenerative media filter vessel. A regenerative media filter vessel having a drain 120 is illustrated in FIGS. 1, 7A, and 7B. After draining, the particulate media of the systems may be replaced. In some embodiments, the systems described herein may be operated in the drain mode responsive to a period of time of operation in the filtration mode being less than about 4 hours, less than about 3 hours, less than about 2 hours, less than about 1 hour, or less than about 0.5 hours from a predetermined threshold value. The systems described herein may be operated in the drain mode responsive to a period of time of operation in the filtration mode being less than about 10 minutes, less than about 5 minutes, less than about 2 minutes, less than about 1 minute, less than about 30 seconds, less than about 10 seconds, or less than about 1 second from a predetermined threshold value. The predetermined threshold value may be the threshold value which triggers operation in the drain mode.

EXAMPLES

The function and advantages of these and other embodiments can be better understood from the following examples. These examples are intended to be illustrative in nature and are not considered to be in any way limiting the scope of the invention.

Example 1A

Vessel Fabrication

Figure 8:
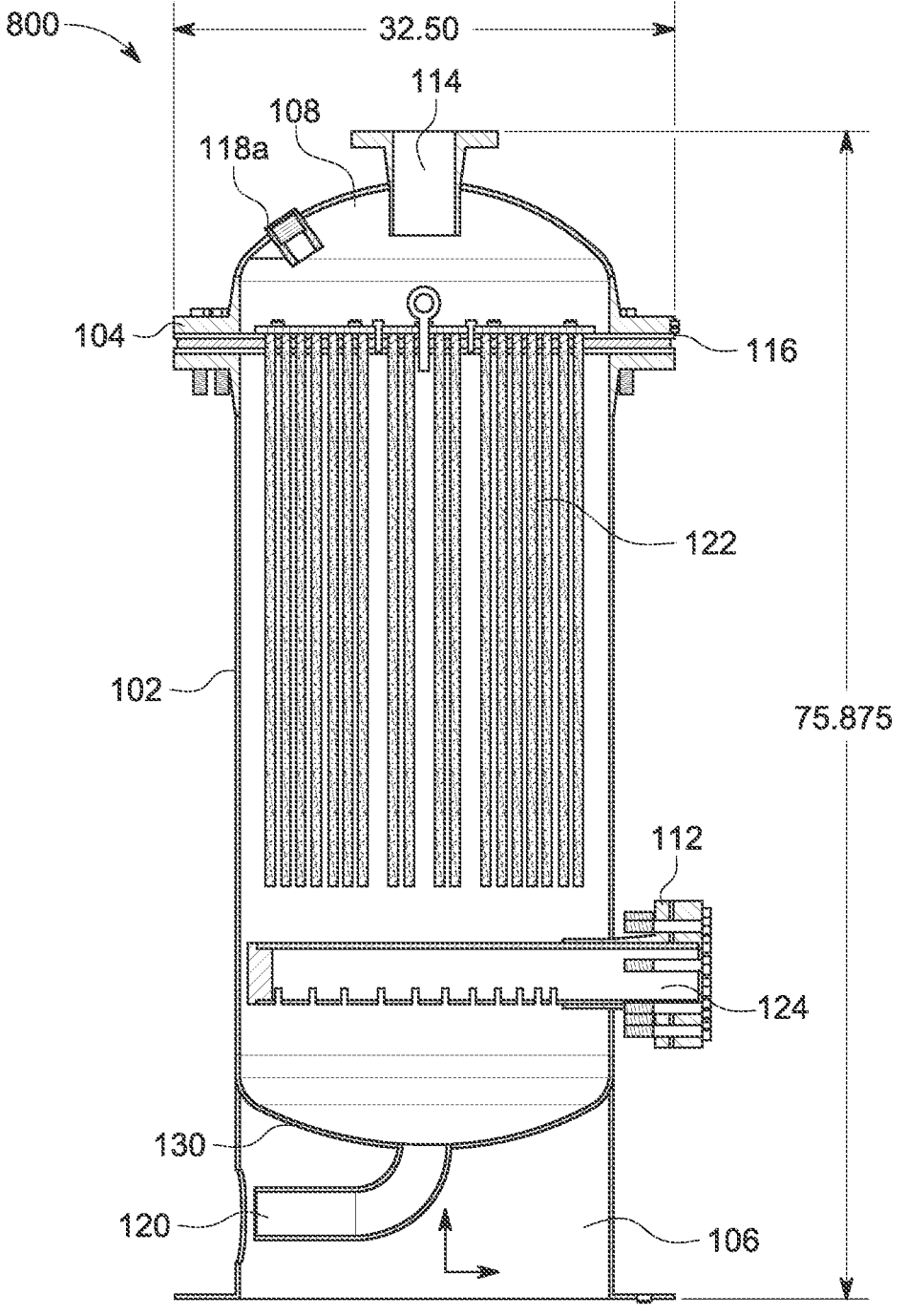
FIG. 8 illustrates a vertical cutaway cross-section of a regenerative media filter vessel housing with the tube sheet and plurality of tube elements installed, according to one embodiment.

As an illustrative example of the invention described herein, a regenerative media filter vessel was designed and constructed from FRP. Embodiments of regenerative media filter vessels including a tube sheet including a plurality of tube elements and a diffuser connected to the inlet are illustrated in FIGS. 1 and 8, with the general construction of the constructed regenerative media filter vessel illustrated in FIG. 1. With reference to FIG. 1, the illustrated regenerative media filter vessels include standard fittings on all connectors, for example, female NPT 1.5-inch connections for the drain 120 and vacuum connections 118a, 118b that are used for particulate media loading.

The overall dimensions of the designed and constructed regenerative media filter vessel, as illustrated in FIGS. 1 and 8, were chosen such that the unit would be able fit through a standard doorway, for example, approximately 80" tall by 33" wide, in the installation location. With reference to FIG. 8, the regenerative media filter vessel 800 included a vessel body 102, a vessel top 104, and a vessel base 106 having a concave lower portion 130. The vessel top 104 included top cover 108 secured to vessel body 102. Housed within the vessel body 102 was tube sheet assembly 116 having plurality of tube elements 122. Each of the plurality of tube elements 122 was 36" long. The top cover 108 was sealed to the tube sheet assembly 116. The vessel base 106 included a vessel inlet 112 that included a diffuser 124, with the connection flange of the diffuser 124 sealed to the inlet 112 of the vessel base 106. The vessel base 106 also included a vessel drain 120, with both the top cover 108 and vessel base 106 including vacuum port 118a (vacuum port on base not shown), respectively.

The tube sheet assembly included both an upper tube sheet and a lower tube sheet configured to hold the plurality of tube elements fixed in position, with the assembly containing 367 tube elements. The lower tube sheet was manufactured from a ¾" thick portion of the same material used to fabricate the regenerative media filter vessel and was designed to separate the unfiltered water in the lower portion of the regenerative media filter vessel from entering the upper portion of the regenerative media filter vessel. The upper ends of each of the plurality of tube elements, which included a metal lip, were secured to the lower tube sheet using a felt gasket. The upper tube sheet was manufactured from a ½" thick portion of the same material as the lower tube sheet and was configured to direct water from the plurality of tube elements to the outlet. The tube sheet assembly, that is, the upper and lower tube sheets with the plurality of tube elements installed into the lower sheet, was secured together using a plurality of ⅜" 316SS corrosion-resistant bolts that threaded into helical inserts pressed into the lower tube sheet. In operation, unfiltered water was forced through the particulate media coated tube elements, each of which provided about 0.6 ft² of filtration area, for a total of 220.2 ft².

Example 1B

Vessel Flow Modeling

As a further illustrative prophetic example of the invention described in this disclosure, the regenerative media filter vessel constructed in Example 1A was computationally rendered and had water flow modeled through it using CFD. The dimensions of the regenerative media filter vessel, the position, the dimensions, and number of apertures of the diffuser were chosen to provide for a reduction in flow velocity of water entering the regenerative media filter vessel. In particular, the diffuser modeled in this example had apertures of uniform width and spacing along the length of the diffuser. The flow into the diffuser was modeled using CFD for a regenerative media filter vessel as described herein that contained a plurality of tube elements. The modeled flow into the regenerative media filter vessel was set to an inlet flow velocity of about 3 m/s.

Figure 9A:
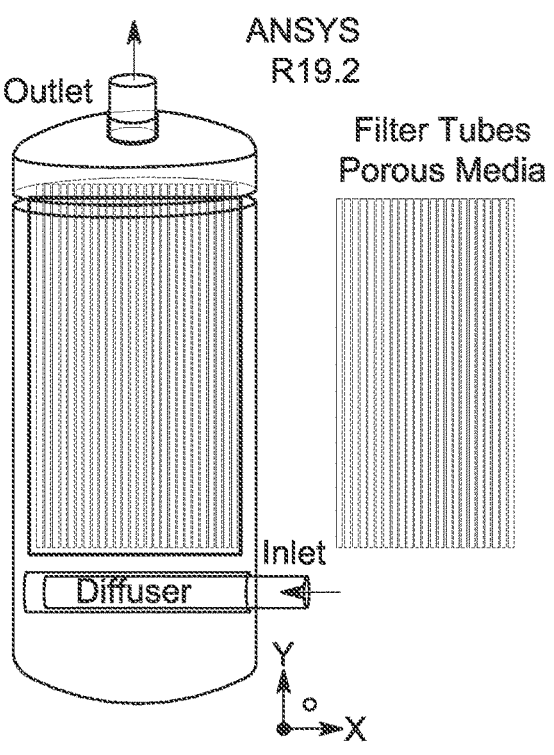
FIGS. 9A and 9B illustrate aspects of the parameters chosen for the computational fluid dynamics (CFD) model of the regenerative media filter vessel illustrated in FIGS. 1, 7A, 7B, and 8.
Figure 9B:
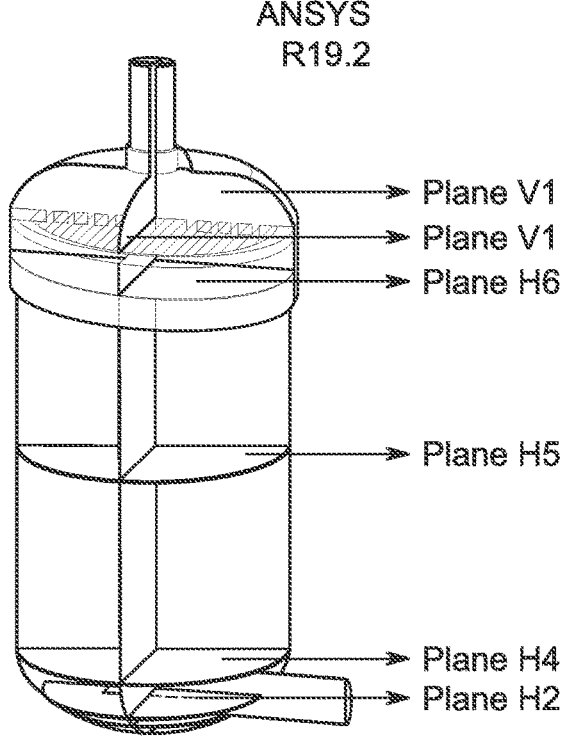

FIG. 9A illustrates the CFD computational domain (defined by the black border box around the plurality of tube elements) where the flow was modeled in the vessel from the inlet, through the diffuser, and out through the outlet at the top of the regenerative media filter vessel. FIG. 9B illustrates exemplary horizontal and vertical sectional fluid flow planes used for plotting velocity contours and vectors to observe the effects of the different diffuser designs on the flow within various locations of the regenerative media filter vessel. With reference to FIG. 9B, the flow through the regenerative media filter vessel was examined in the vertical planes V1 and V2, particularly directly below the diffuser. With continued reference to FIG. 9B, the flow through the regenerative media filter vessel was examined in the horizontal plane at plane H2 directly below the plurality of apertures of the diffuser, plane H4 directly above the upper wall of the diffuser, plane H5 at the midsection of the regenerative media filter vessel, and plane H6 below the tube sheet.

As noted herein, FIG. 5 illustrates velocity contour plots taken through a horizontal cross-section of the lower portion of a regenerative media filter vessel equipped with the diffuser illustrated in FIGS. 3A-3G and a plurality of tube elements installed. As is seen, the diffuser having uniformly shaped and spaced apertures transverse or orthogonal to the axis of flow reduced the velocity of the water directed into it from a value of approximately 3 m/s to a velocity of approximately 1 m/s at positions immediately in front of the apertures. The sharp corners and narrow width of the orthogonal apertures created small areas of high velocity directly at the apertures, but this velocity was reduced once the water entered the vessel. The diffuser allowed for a continued reduction in velocity as positions further away from the diffuser.

FIG. 6 illustrates a velocity contour plot taken through a horizontal cross-section of a center plane the regenerative media filter vessel equipped with the diffuser illustrated in FIGS. 3A-3G and a plurality of tube elements installed. The flow velocity of the water at this plane was reduced by at least 50% from the inlet velocity of approximately 3 m/s, with the majority of the water in this plane having flow velocities of less than 0.5 m/s. The contour plots indicated that the diffuser of this design was able to reduce the flow velocity of water entering the regenerative media filter vessel and to create a flow velocity continuum that allowed for the uniform distribution of water throughout the vessel with a smooth flow.

Example 2

Different Diffuser Designs

This prophetic example illustrates the flow characteristics for diffuser designs that vary in the orientation, size, pattern, and spacing between the plurality of apertures of the diffuser. The flow characteristics for each diffuser design were modeled using CFD using the vessel described in Examples 1A and 1B and under identical simulation conditions (that is, water at the same temperature and flow characteristics). Example geometries of the various regenerative media filter vessel components used to model the flow characteristics for each diffuser design are illustrated in FIGS. 10A-10D.

Figure 4C:
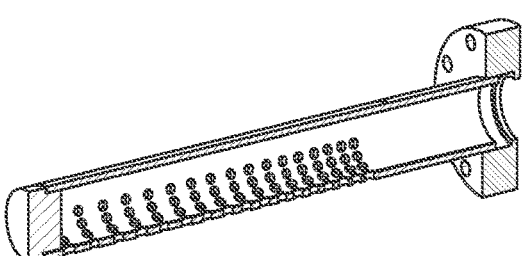
Figure 4D:
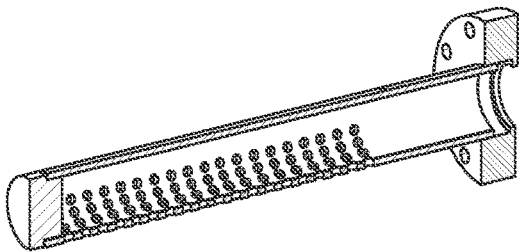
Figure 4E:
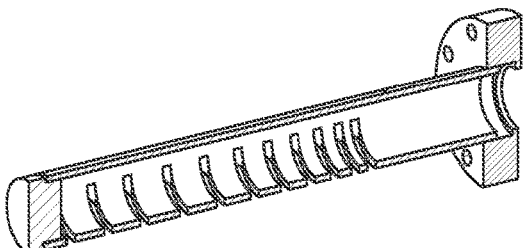
Figure 4F:
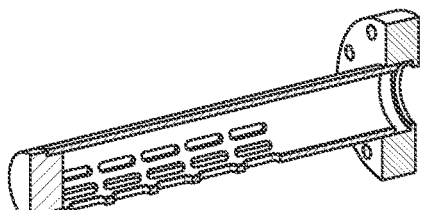
Figure 4G:
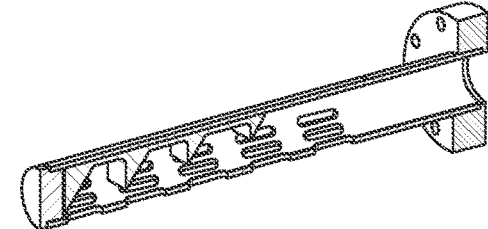
Figure 4H:
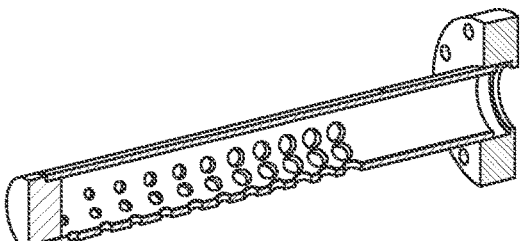
Figure 4I:
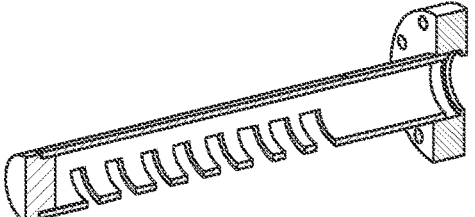
Figure 4J:
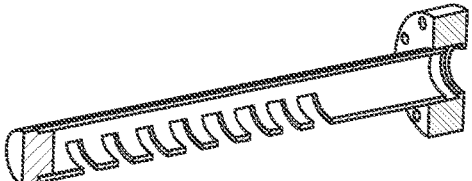

Modeled diffuser design embodiments are illustrated in FIGS. 4A-4J. FIG. 4A illustrates a diffuser having tapered longitudinally extending apertures. In the diffuser of FIG. 4A, the apertures were designed as long single openings spanning the length of the diffuser. The width of the apertures is largest at the connection flange and decreases along the length of the diffuser. FIG. 4B illustrates a diffuser having short oblong longitudinally extending apertures. The apertures of FIG. 4B were shorter that those illustrated in FIG. 4A and were spaced evenly apart from one another along the length of the diffuser. FIGS. 4C and 4D illustrate diffuser embodiments having circular apertures, with FIG. 4C illustrating a diffuser having asymmetrically spaced circular apertures and FIG. 4D illustrating a diffuser having symmetrically spaced circular apertures. In each of FIGS. 4C and 4D, the plurality of circular apertures had a constant diameter along the length of the diffuser. FIG. 4E illustrates a diffuser having asymmetrically spaced transverse apertures. The apertures illustrated in FIG. 4E were rectangular shaped and were of uniform width with the spacing between each aperture increasing from the connection flange along the length of the diffuser. FIGS. 4F and 4G illustrate diffusers having short oblong longitudinally extending apertures similar in shape to the longitudinally extending apertures illustrated in the embodiment of FIG. 4B. The embodiment illustrated in FIG. 4F has identical apertures as the diffuser illustrated in FIG. 4B but has a shorter overall length. The embodiment illustrated in FIG. 4G further included a series of internal triangular shaped projections above each grouping of apertures that were configured to reduce flow velocity of fluid before it exited the diffuser. The face length of each of the internal projections increased from the connection flange to the end of the diffuser. FIG. 4H illustrates a diffuser having symmetrically spaced circular apertures of varying diameters. The diameters of the circular apertures decreased from the connection flange along the length of the diffuser. FIGS. 4I and 4J illustrate diffusers having symmetrically spaced transverse apertures of non-uniform width. The width of the apertures decreased from the connection along the length of the diffuser. The diffuser illustrated in FIGS. 4I and 4J differ in their diameters. The diffuser of FIG. 4I, as with the diffusers illustrated in FIGS. 4A-4H, was designed with a 3.5-inch inner diameter. The diffuser illustrated in FIG. 4J had a 3.0-inch inner diameter.

Figure 10A:
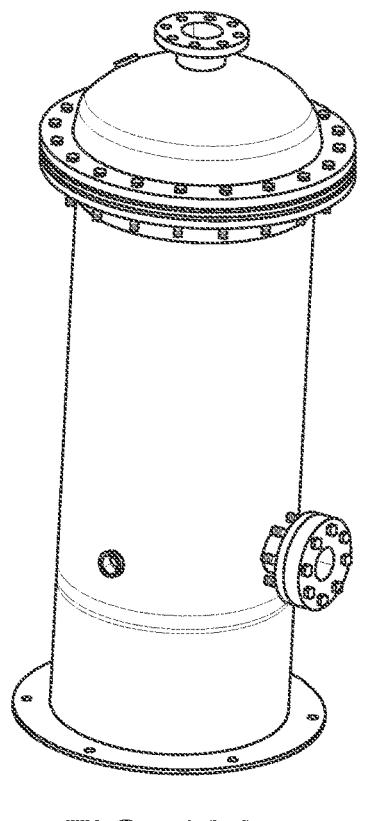
FIGS. 10A-10D illustrate example geometries of various regenerative media filter vessel components used to model diffuser designs.
Figure 10B:
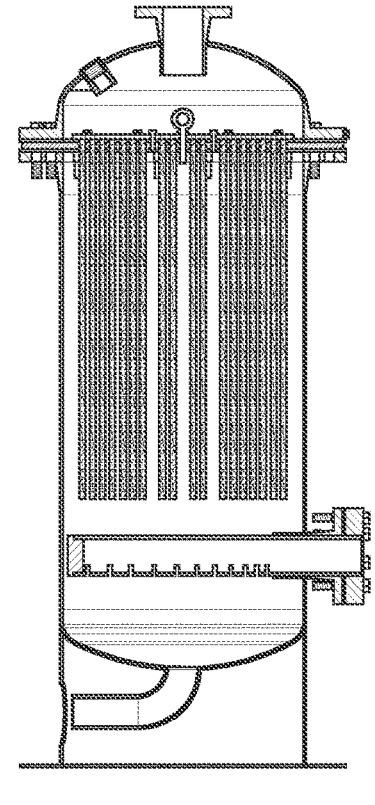
Figure 10C:
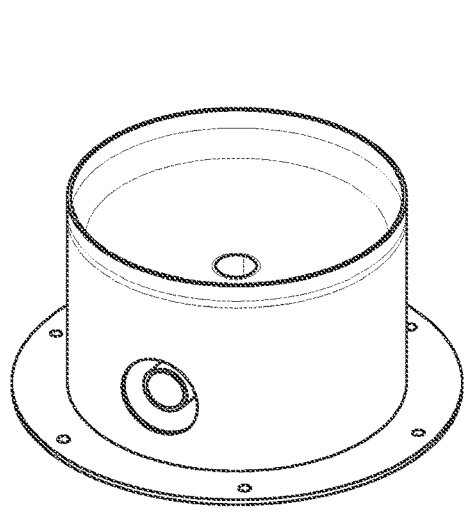
Figure 10D:
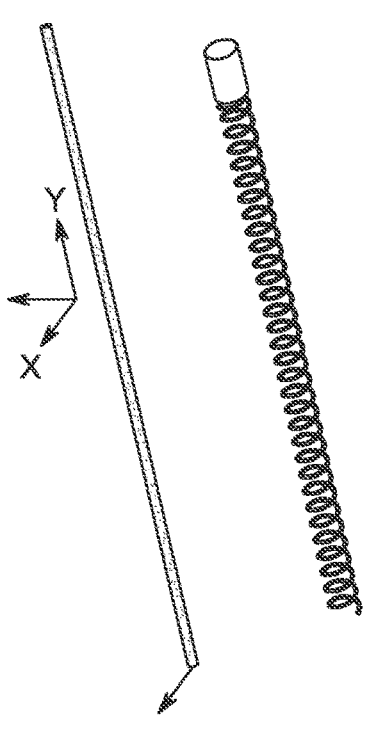
Figure 11:
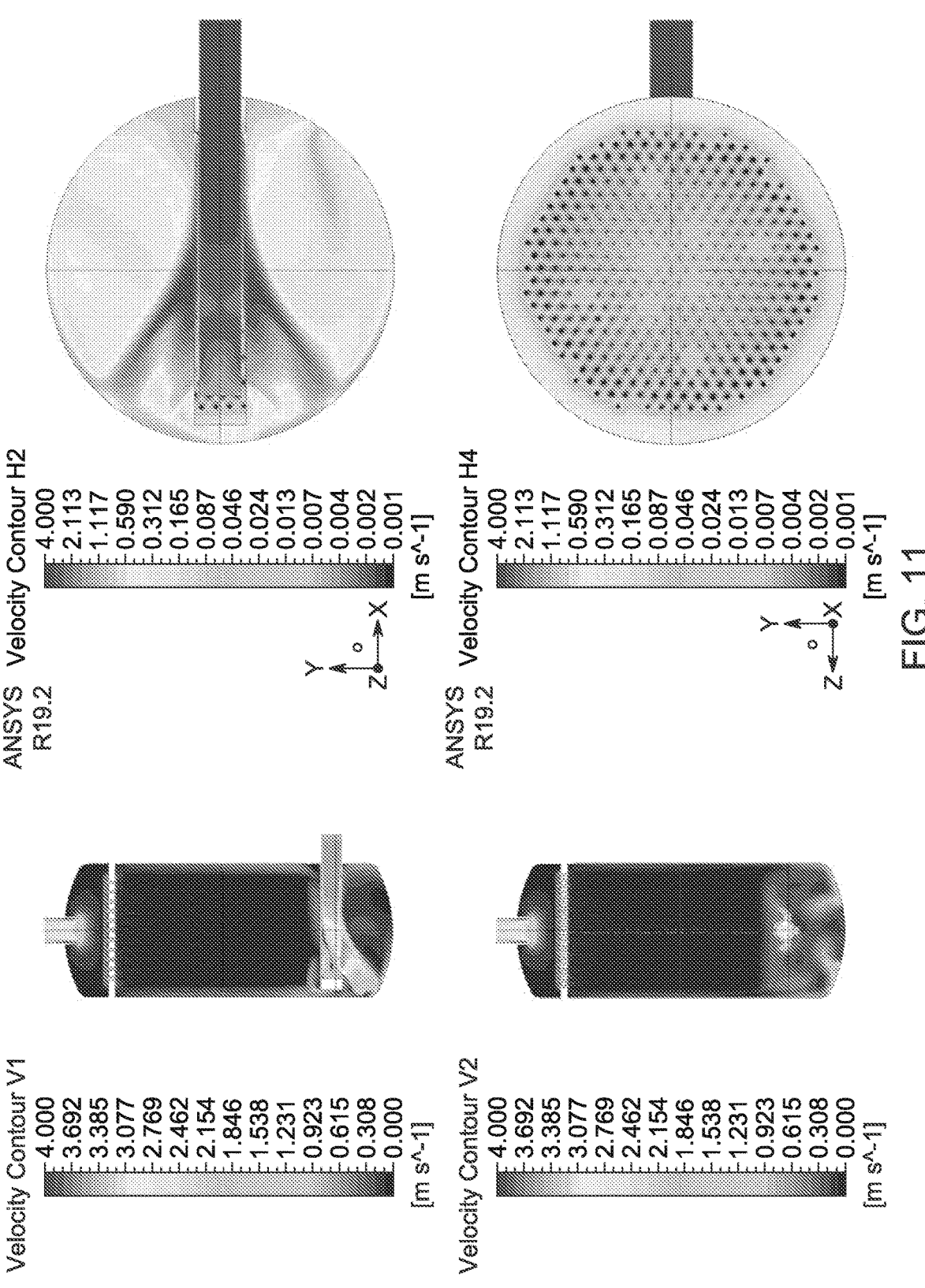
FIG. 11 illustrates flow velocity contours at various planes for a regenerative media filter vessel including the diffuser illustrated in FIG. 4A.
Figure 12:
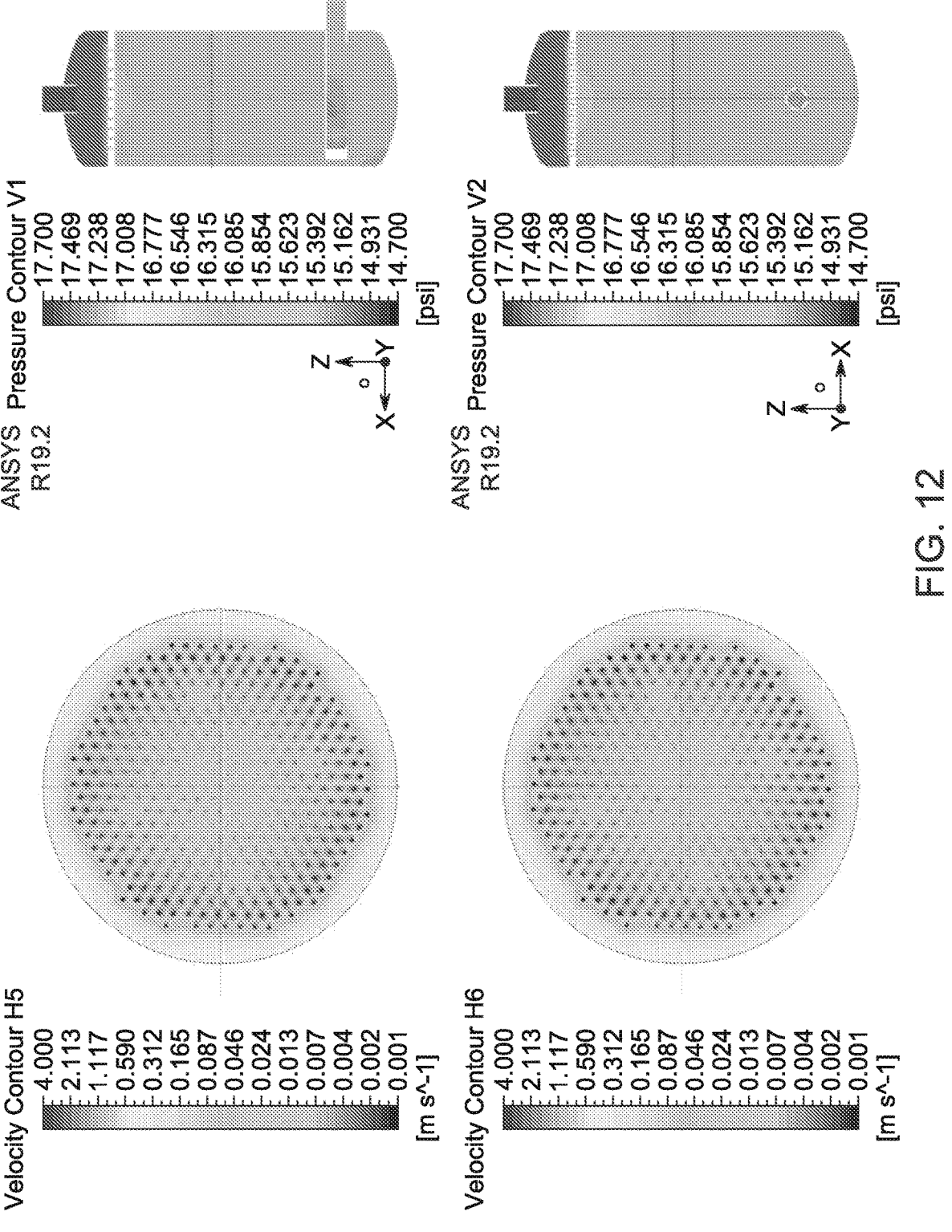
FIG. 12 illustrates flow velocity and fluid pressure contours at various planes for a regenerative media filter vessel including the diffuser illustrated in FIG. 4A.
Figure 13:
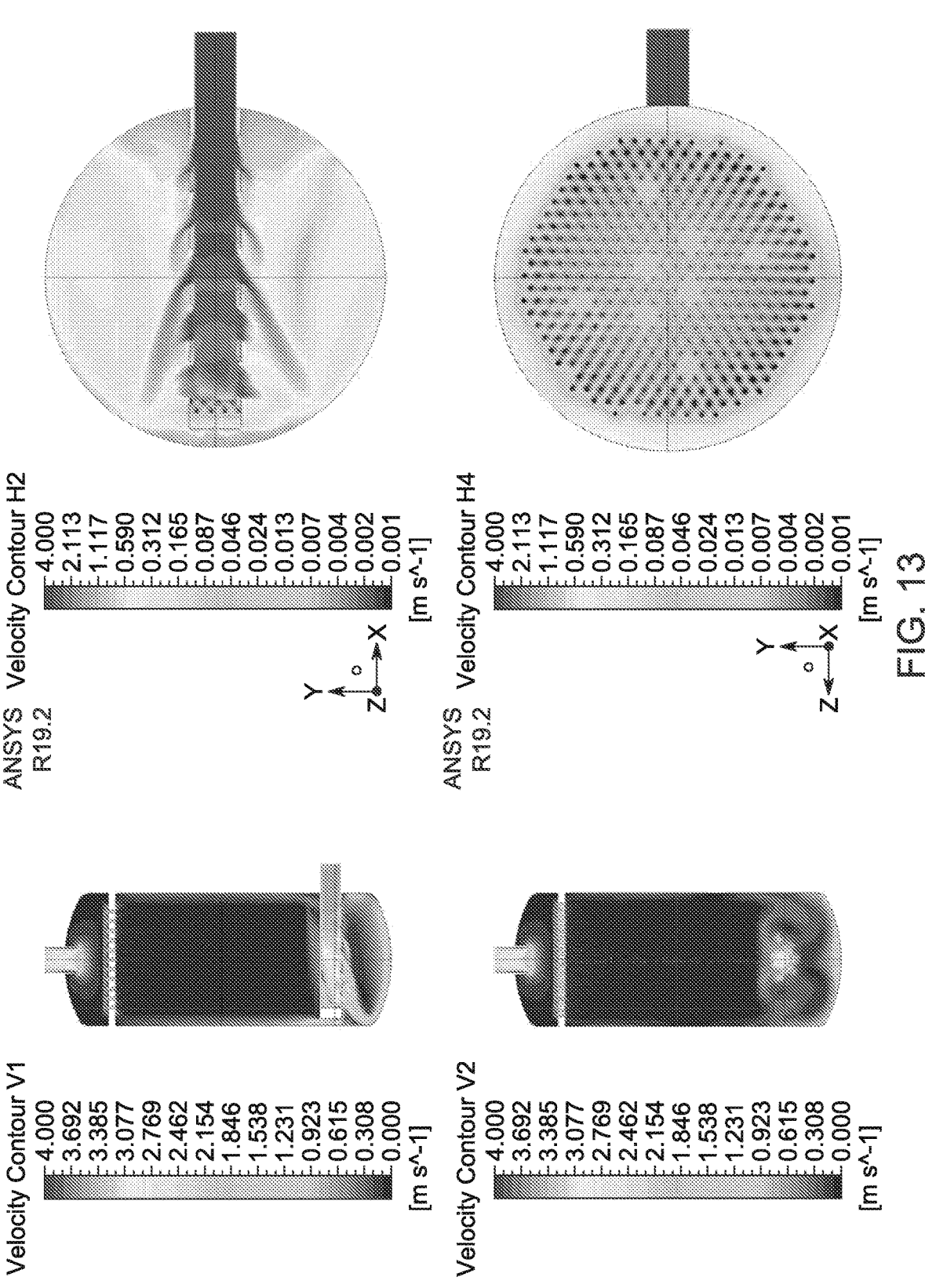
FIG. 13 illustrates flow velocity contours at various planes for a regenerative media filter vessel including the diffuser illustrated in FIG. 4B.
Figure 14:
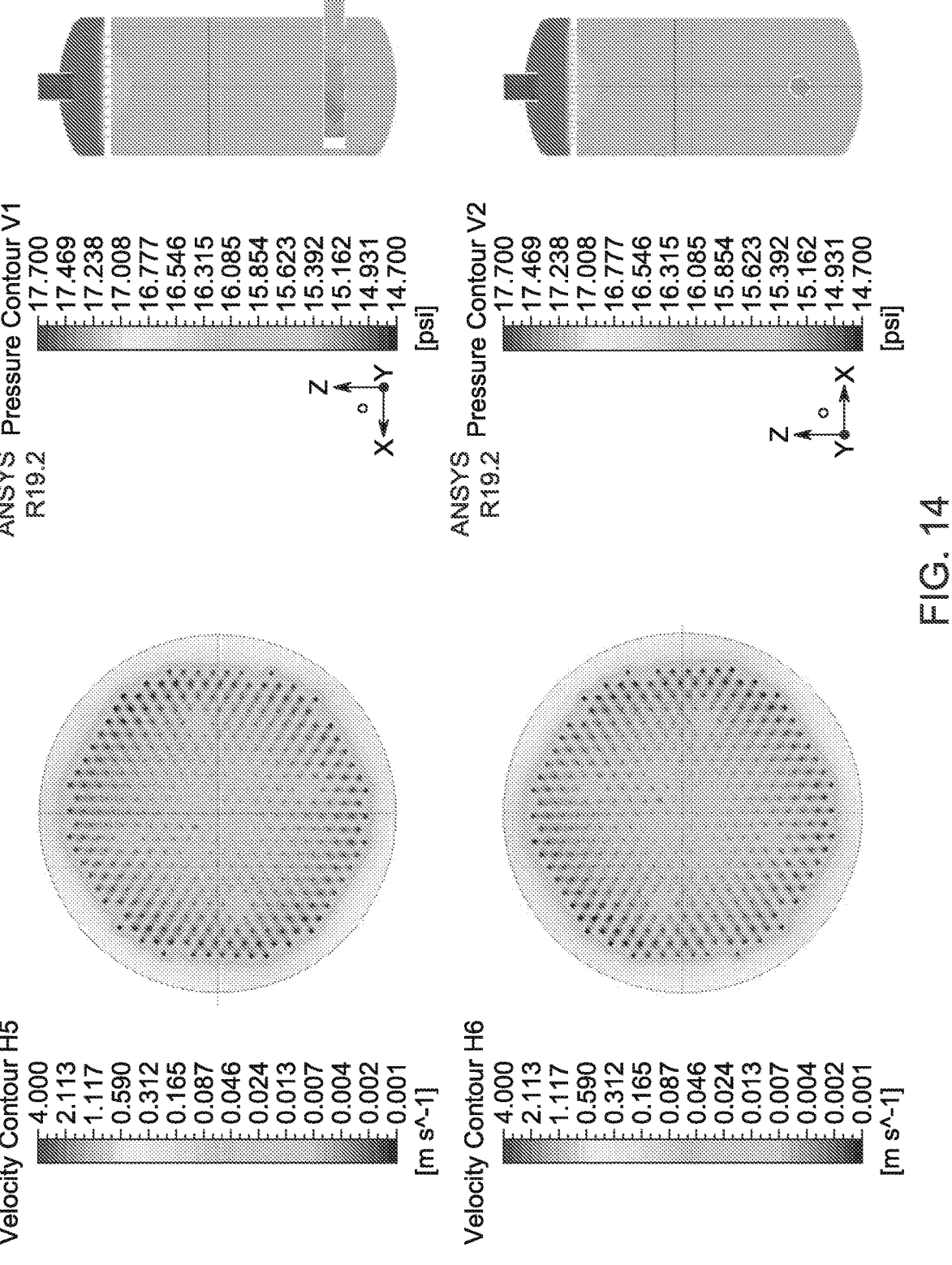
FIG. 14 illustrates flow velocity and fluid pressure contours at various planes for a regenerative media filter vessel including the diffuser illustrated in FIG. 4B.
Figure 15:
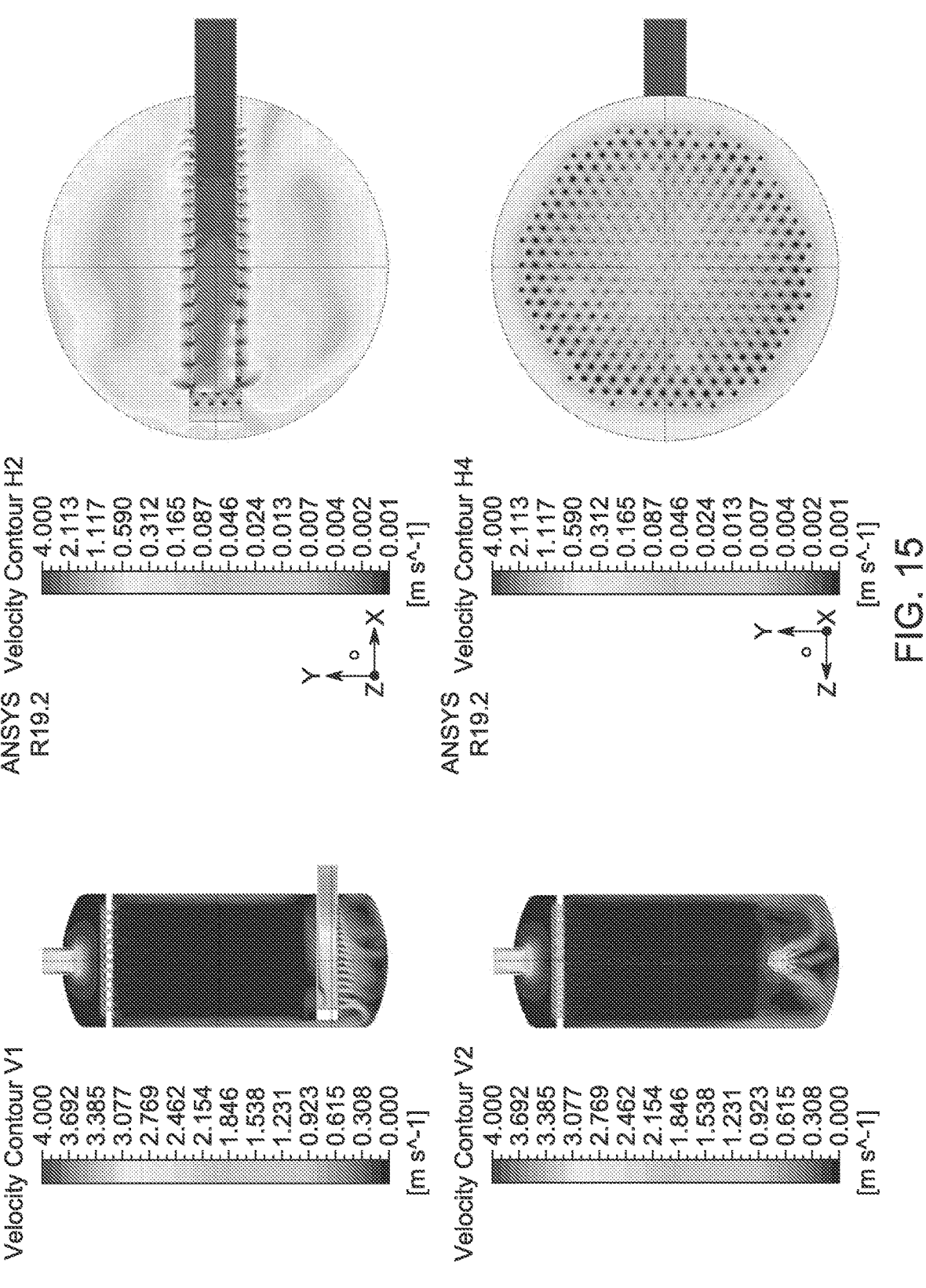
FIG. 15 illustrates flow velocity contours at various planes for a regenerative media filter vessel including the diffuser illustrated in FIG. 4C.
Figure 16:
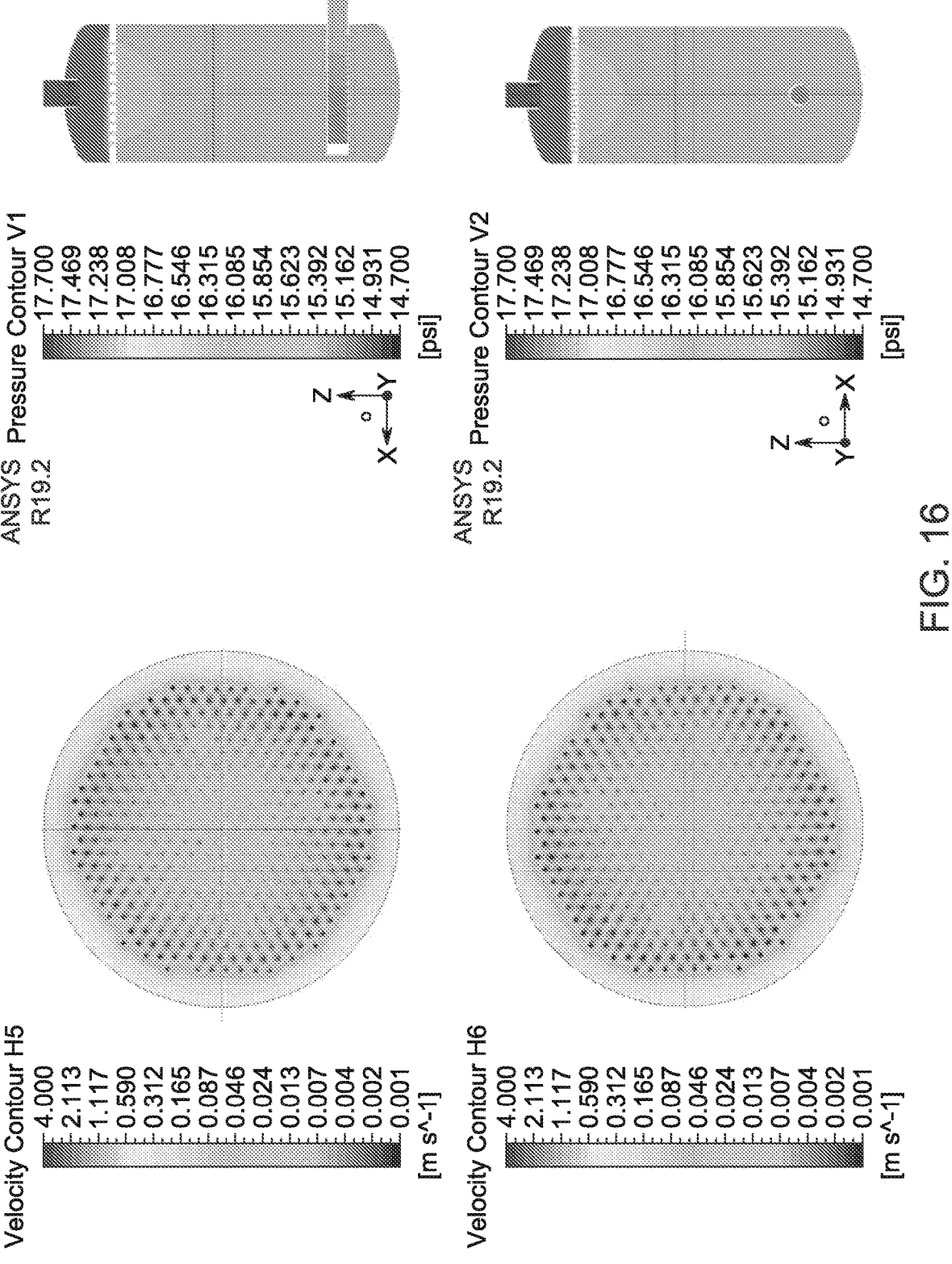
FIG. 16 illustrates flow velocity and fluid pressure contours at various planes for a regenerative media filter vessel including the diffuser illustrated in FIG. 4C.
Figure 17:
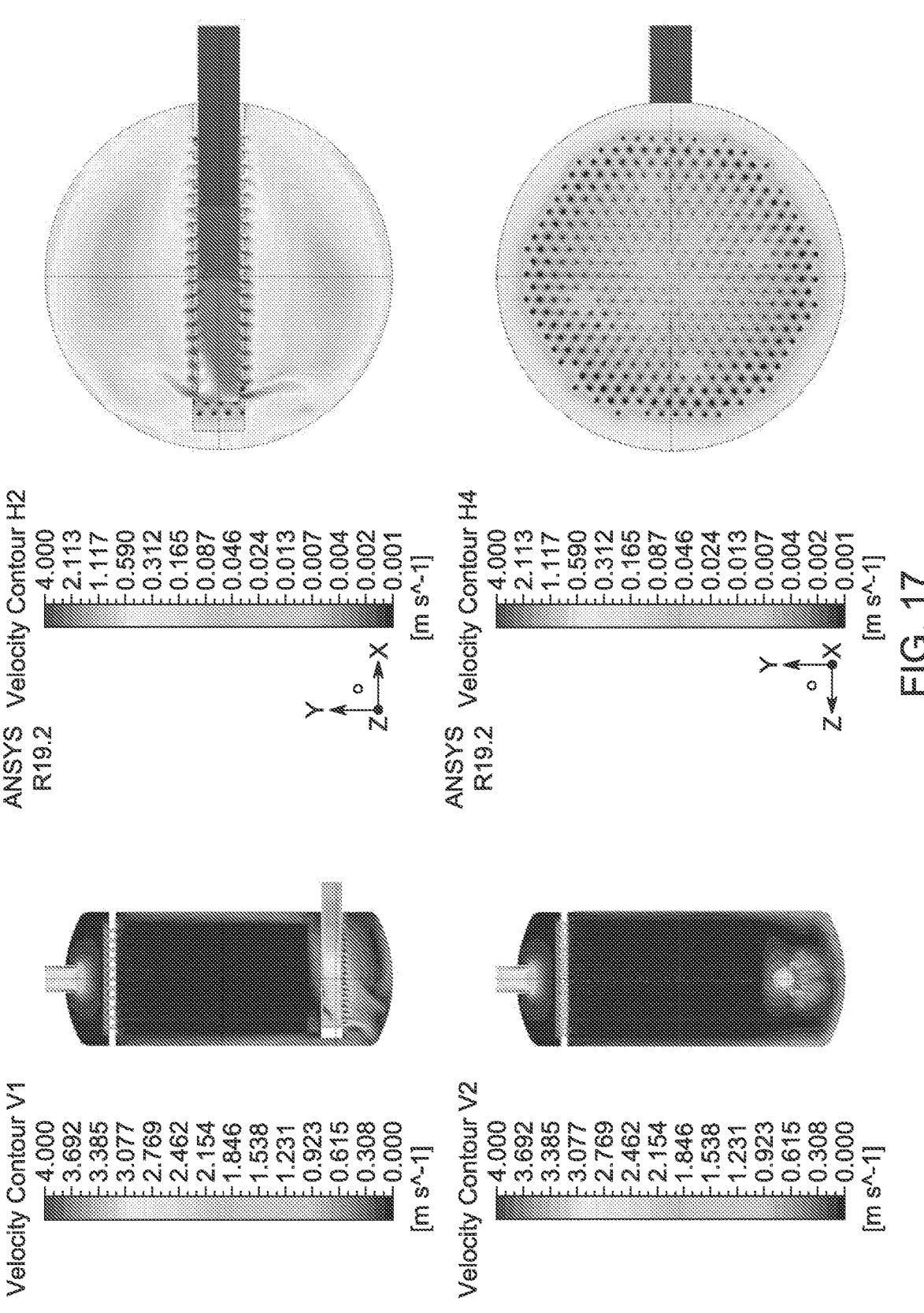
FIG. 17 illustrates flow velocity contours at various planes for a regenerative media filter vessel including the diffuser illustrated in FIG. 4D.
Figure 18:
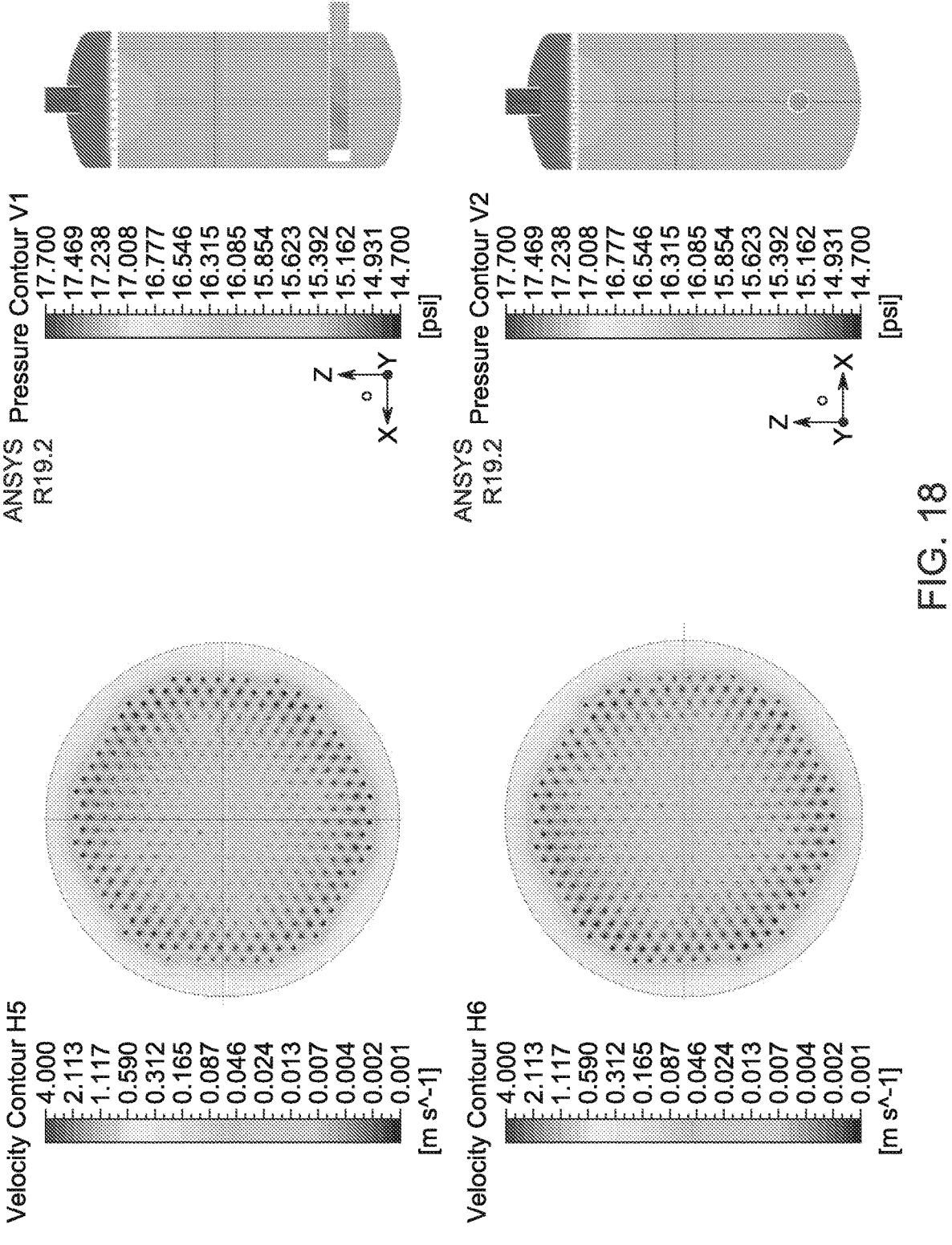
FIG. 18 illustrates flow velocity and fluid pressure contours at various planes for a regenerative media filter vessel including the diffuser illustrated in FIG. 4D.
Figure 19:
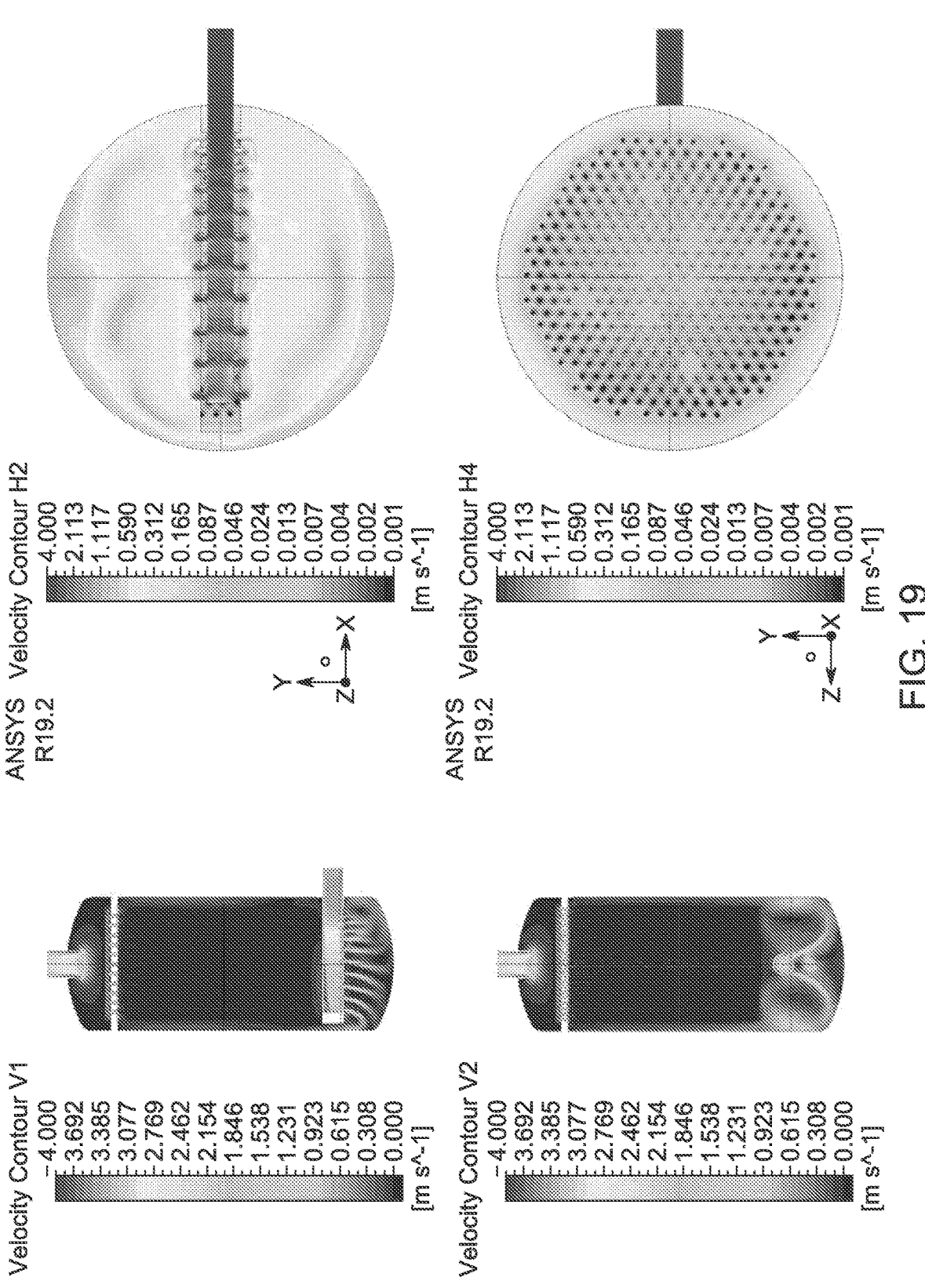
FIG. 19 illustrates flow velocity contours at various planes for a regenerative media filter vessel including the diffuser illustrated in FIG. 4E.
Figure 20:
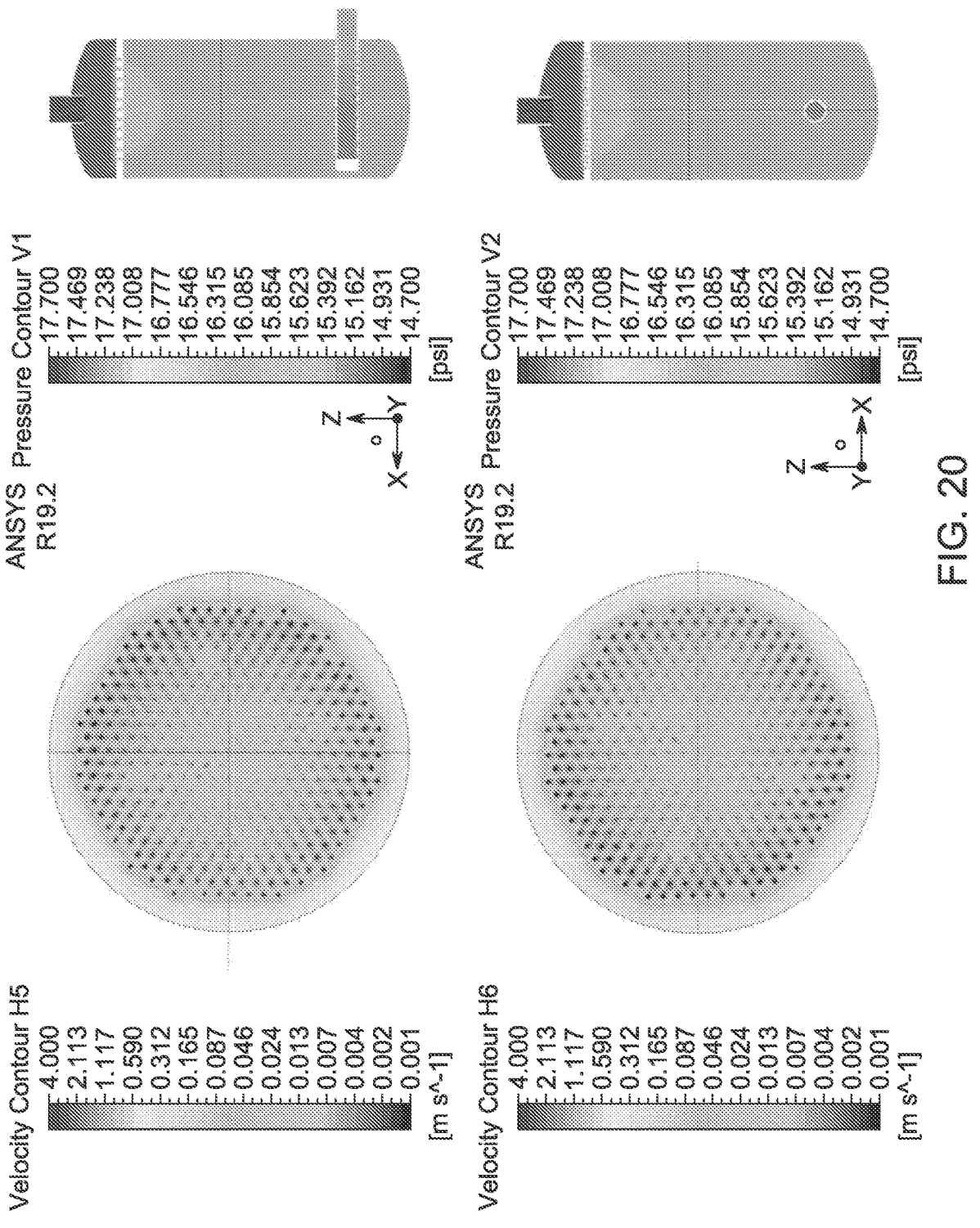
FIG. 20 illustrates flow velocity and fluid pressure contours at various planes for a regenerative media filter vessel including the diffuser illustrated in FIG. 4E.
Figure 21:
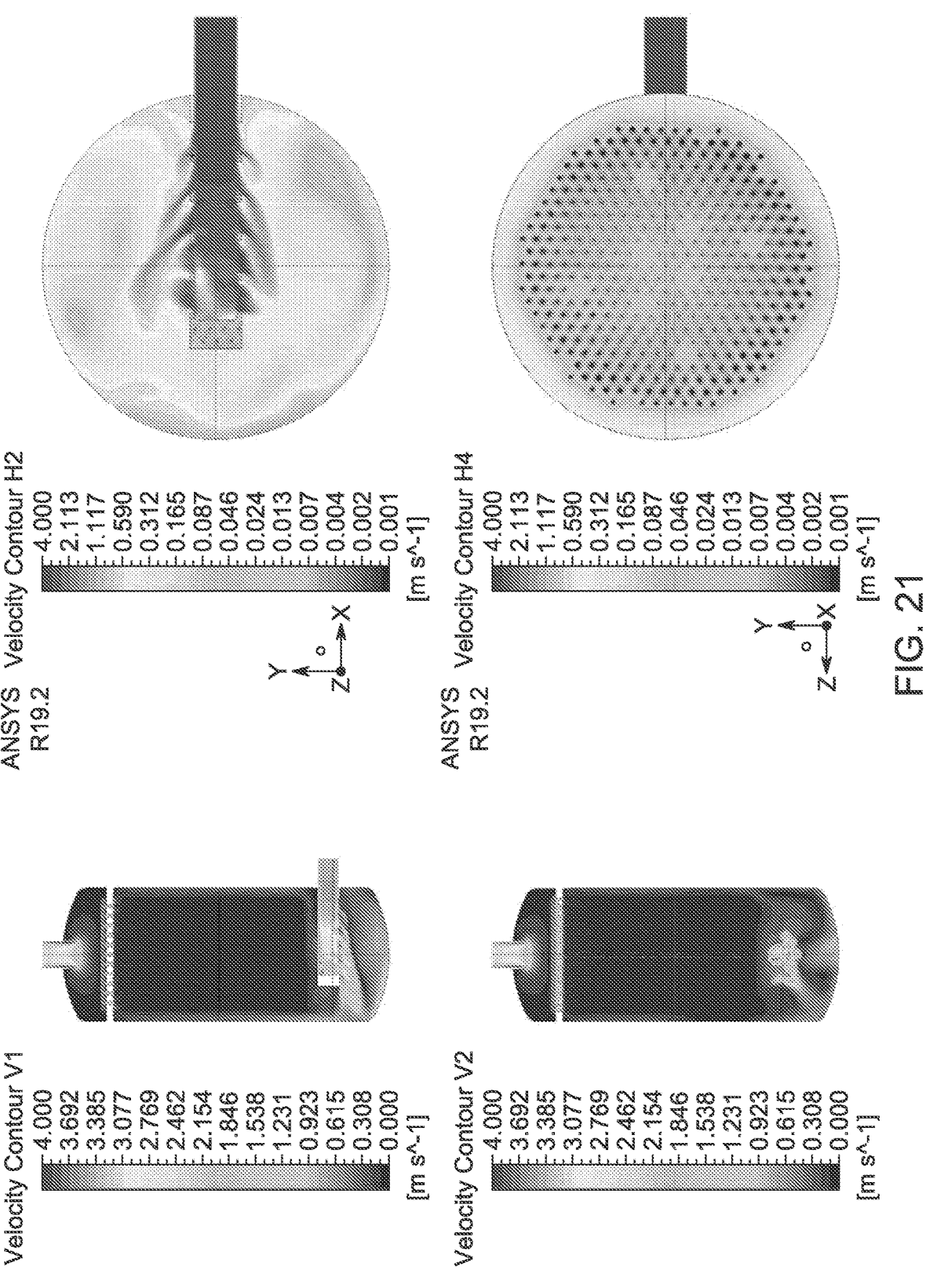
FIG. 21 illustrates flow velocity contours at various planes for a regenerative media filter vessel including the diffuser illustrated in FIG. 4F.
Figure 22:
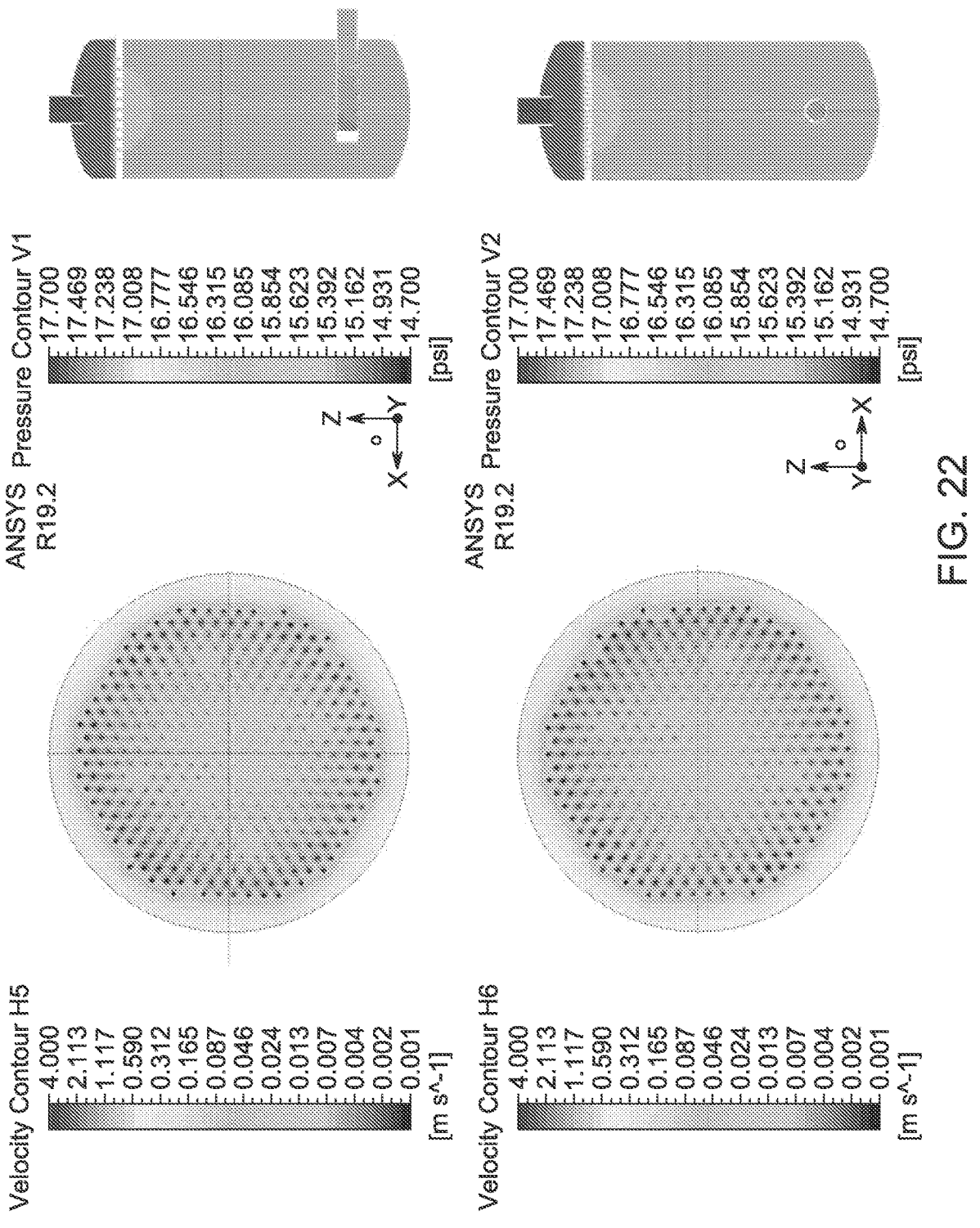
FIG. 22 illustrates flow velocity and fluid pressure contours at various planes for a regenerative media filter vessel including the diffuser illustrated in FIG. 4F.
Figure 23:
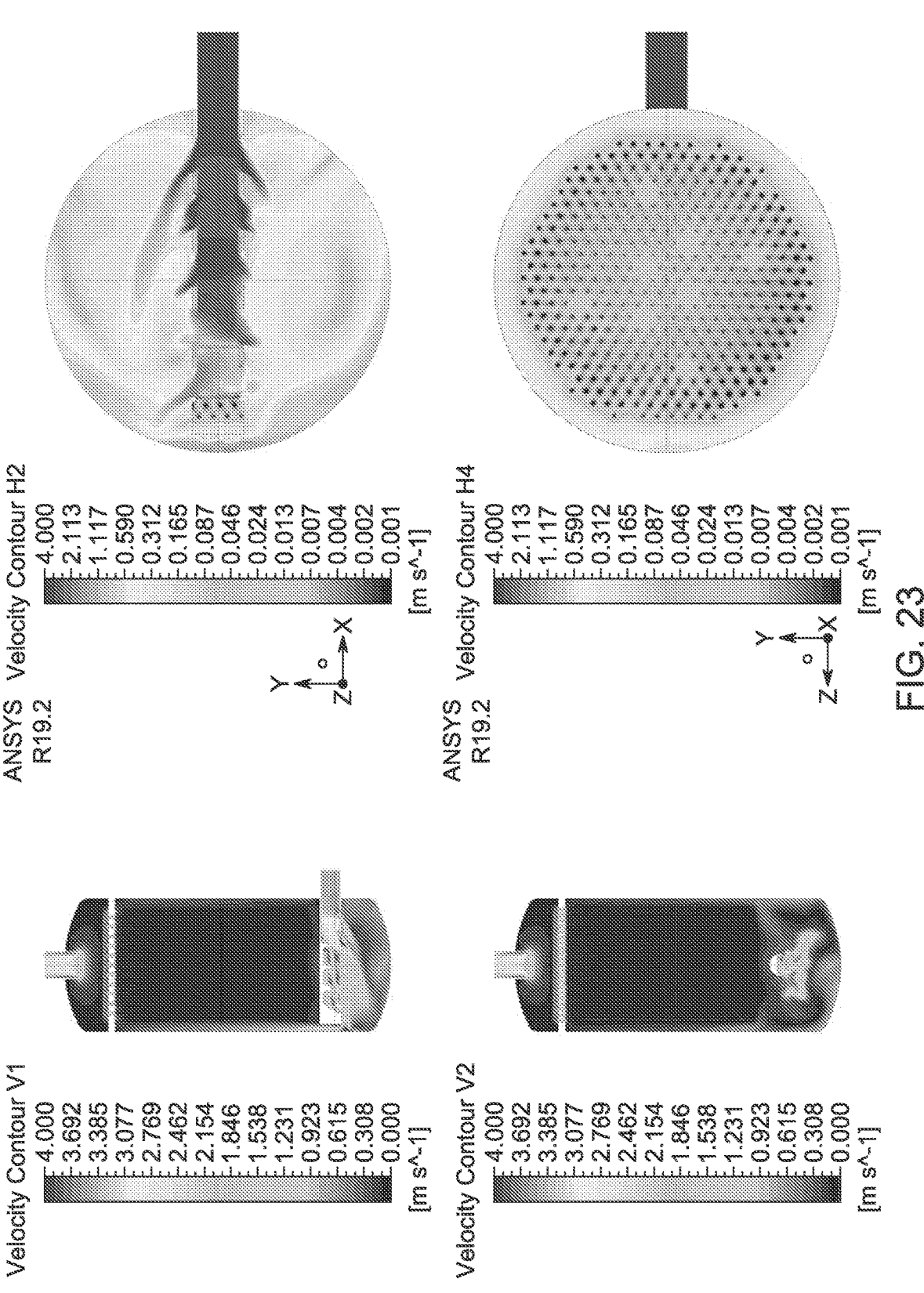
FIG. 23 illustrates flow velocity contours at various planes for a regenerative media filter vessel including the diffuser illustrated in FIG. 4G.
Figure 24:
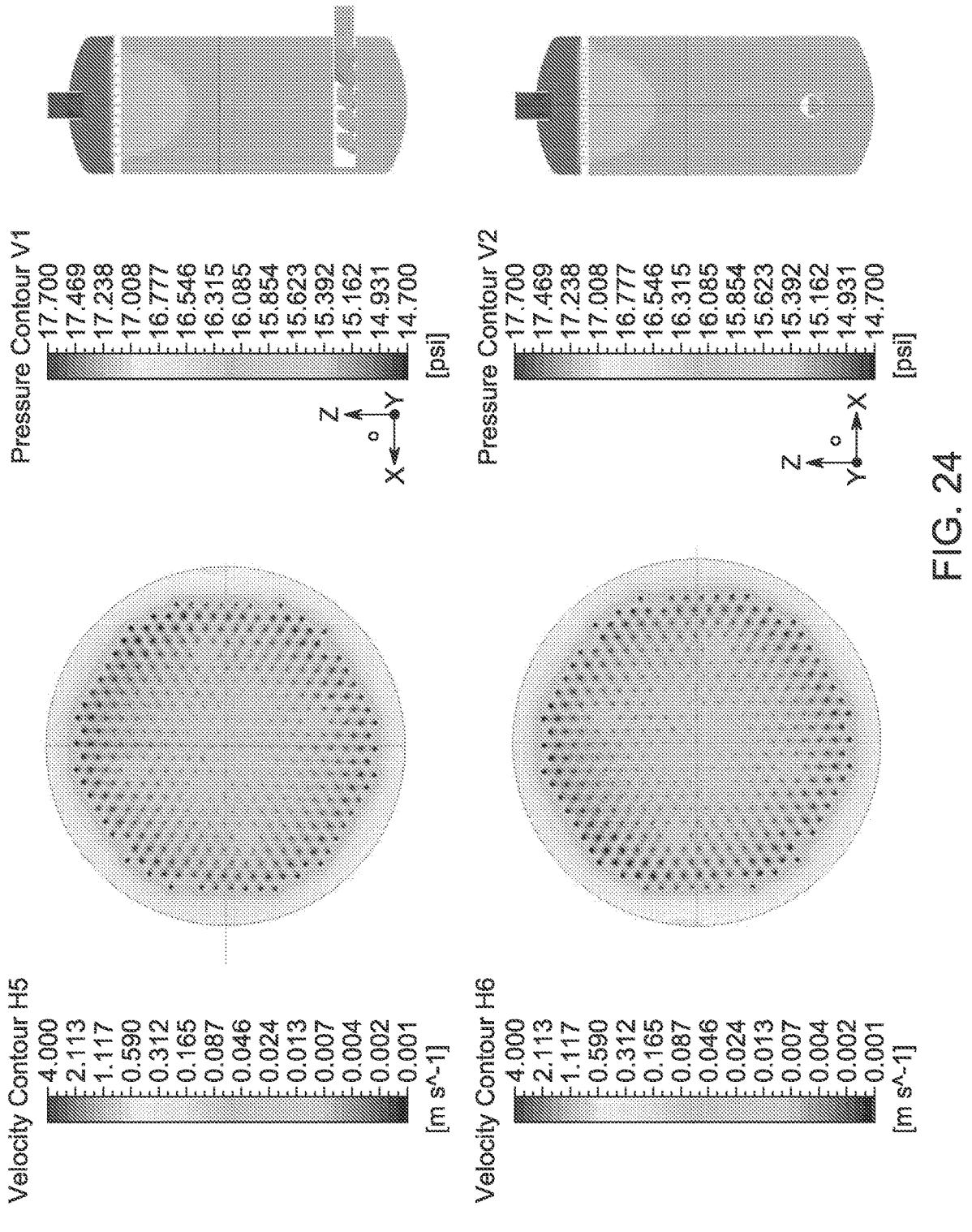
FIG. 24 illustrates flow velocity and fluid pressure contours at various planes for a regenerative media filter vessel including the diffuser illustrated in FIG. 4G.
Figure 25:
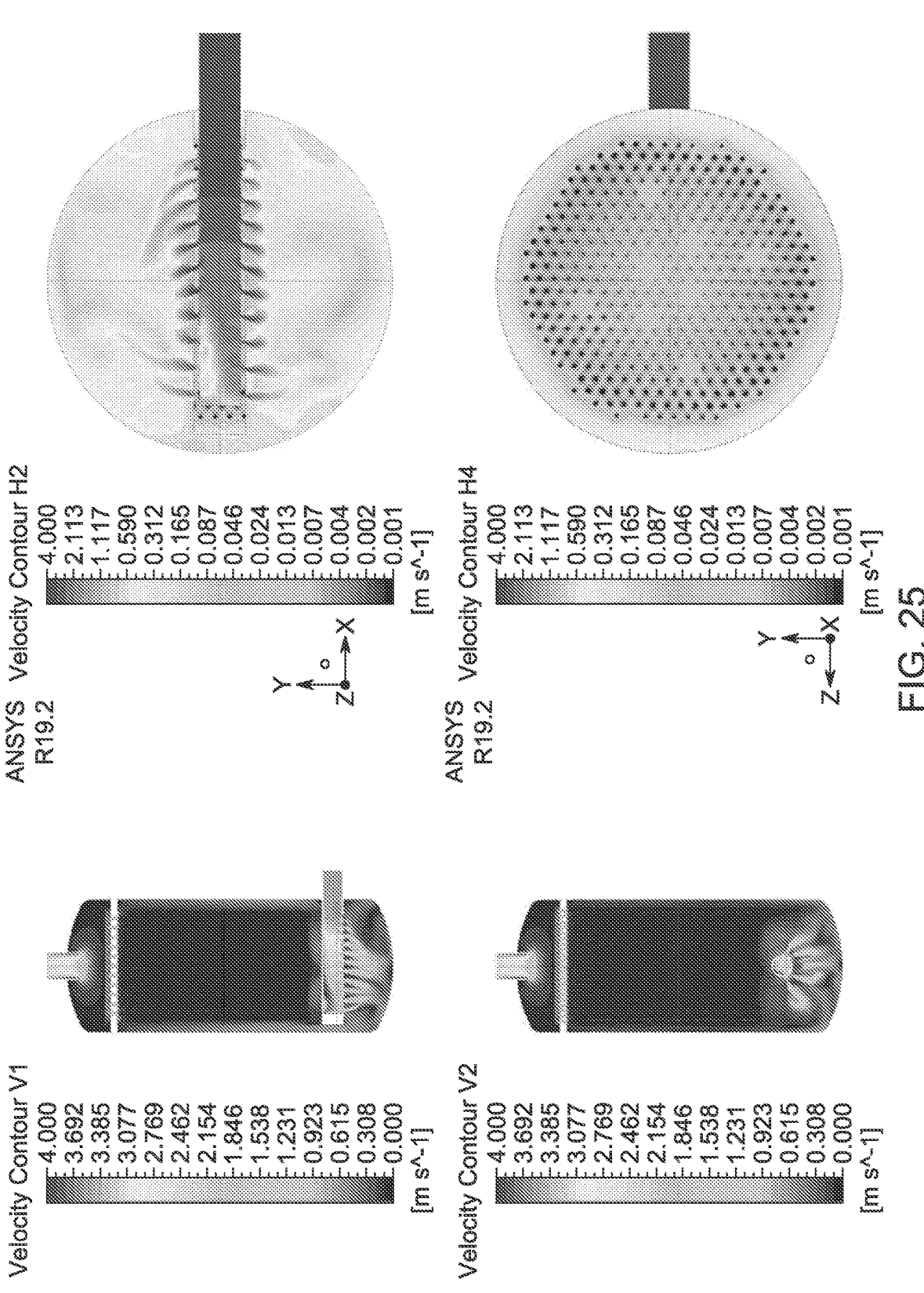
FIG. 25 illustrates flow velocity contours at various planes for a regenerative media filter vessel including the diffuser illustrated in FIG. 4H.
Figure 26:
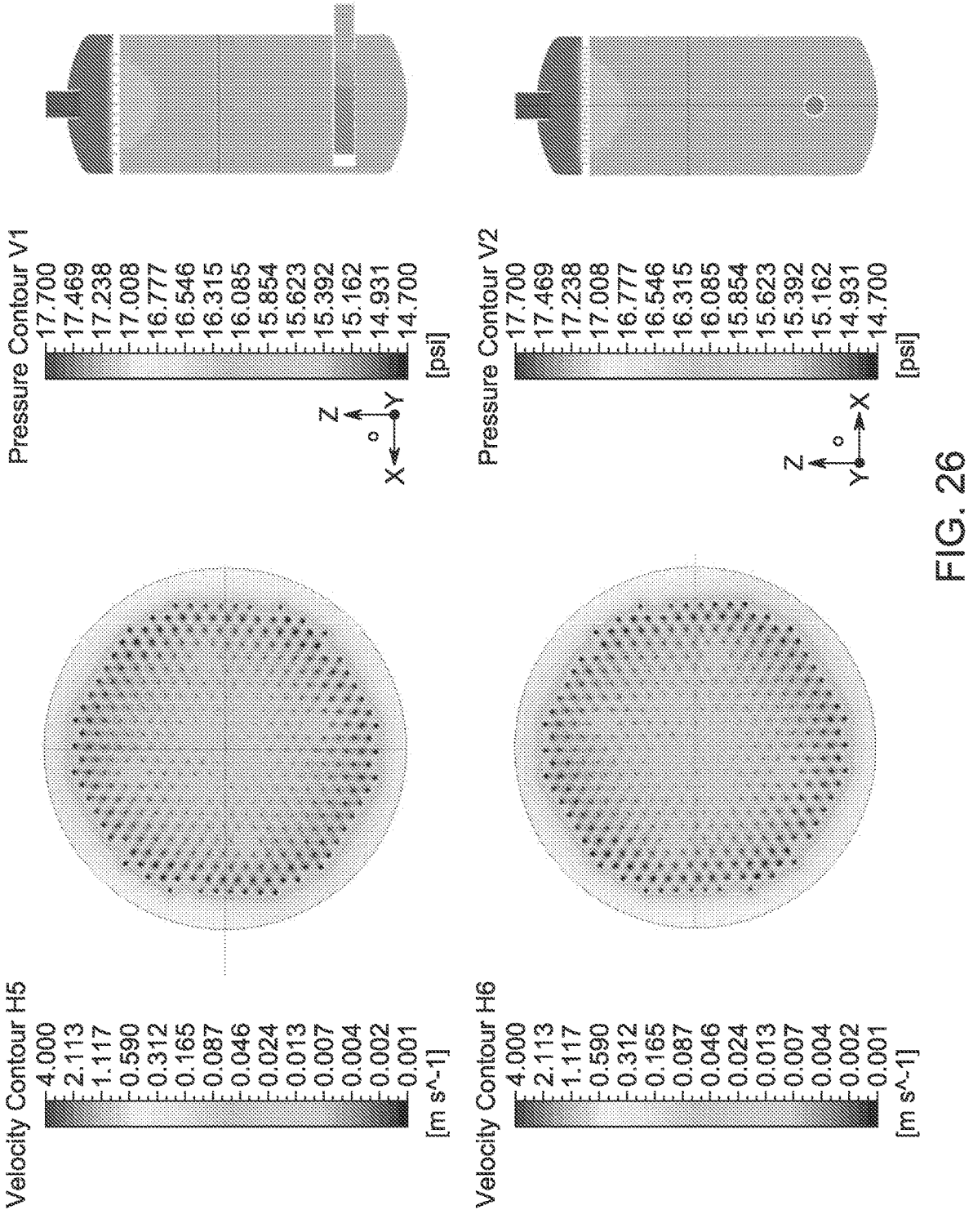
FIG. 26 illustrates flow velocity and fluid pressure contours at various planes for a regenerative media filter vessel including the diffuser illustrated in FIG. 4H.
Figure 27:
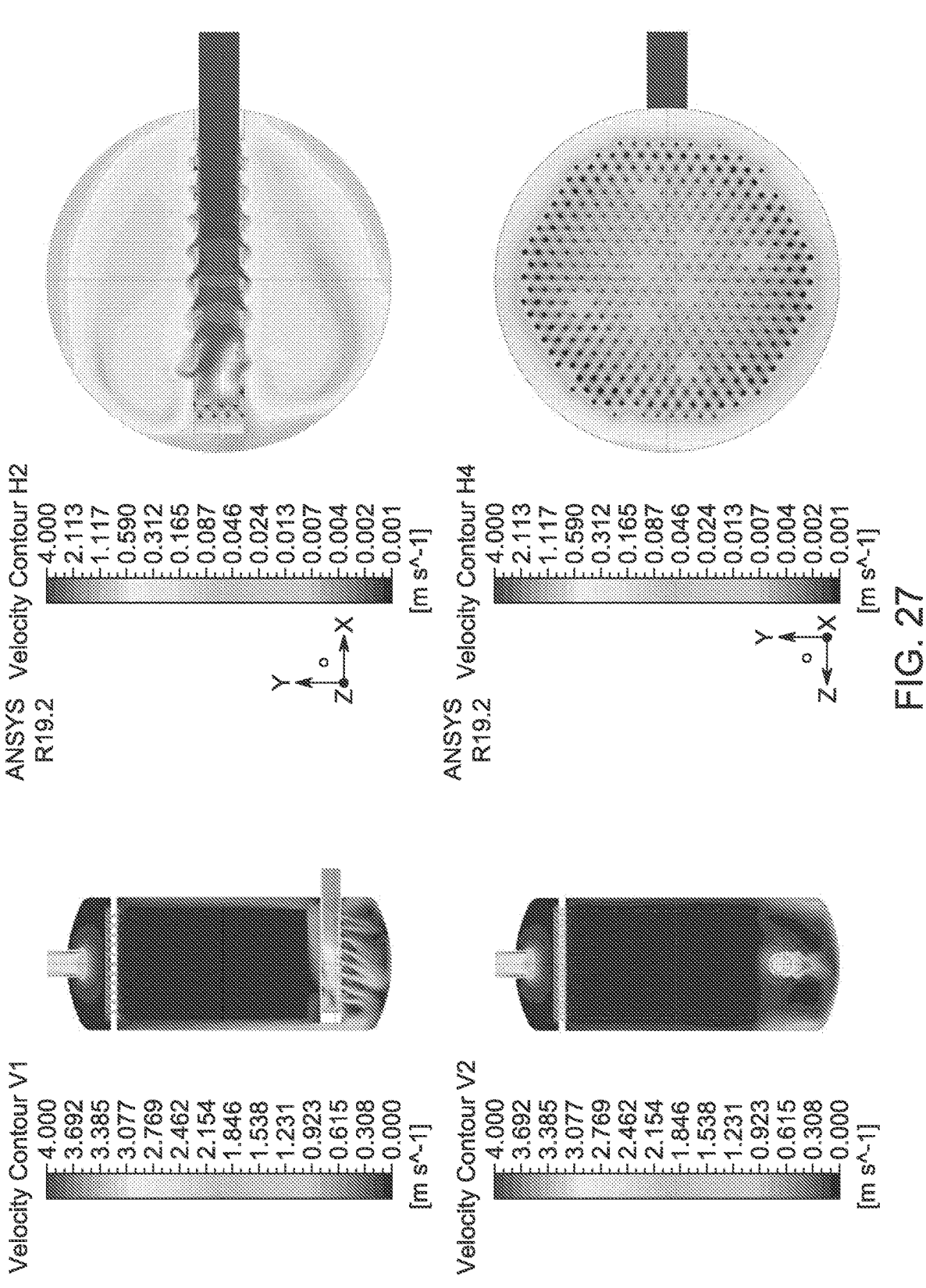
FIG. 27 illustrates flow velocity contours at various planes for a regenerative media filter vessel including the diffuser illustrated in FIG. 4I.
Figure 28:
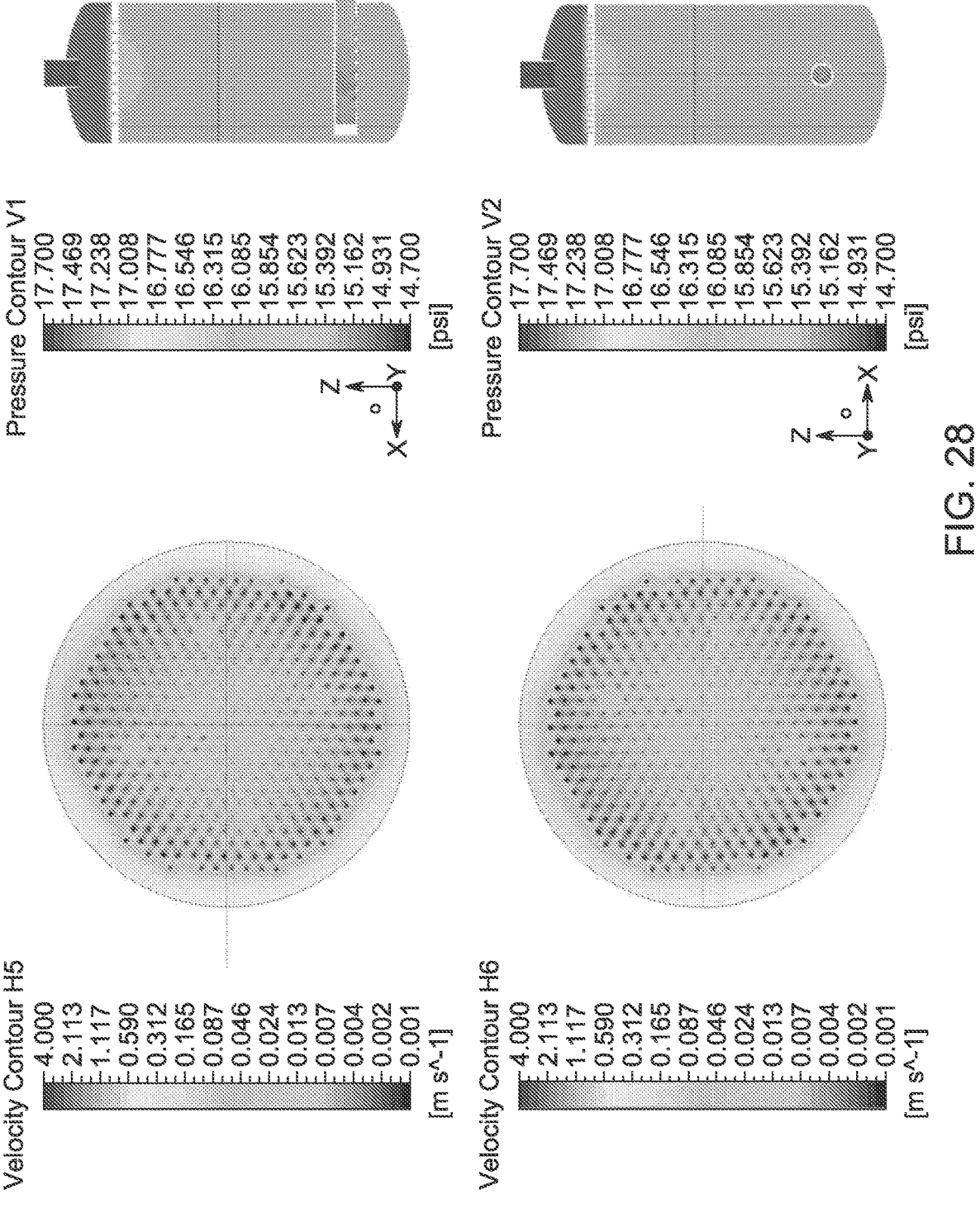
FIG. 28 illustrates flow velocity and fluid pressure contours at various planes for a regenerative media filter vessel including the diffuser illustrated in FIG. 4I.
Figure 29:
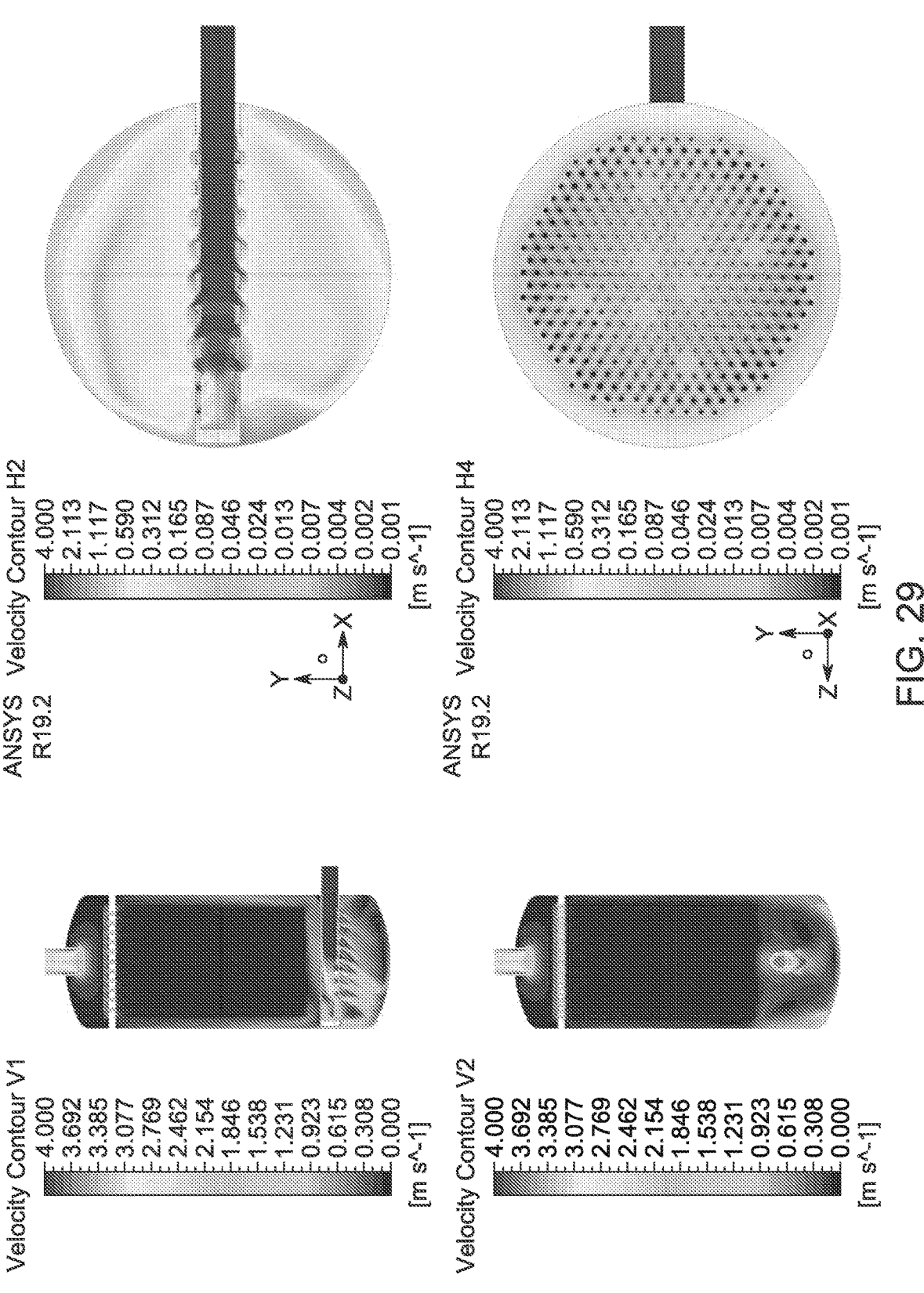
FIG. 29 illustrates flow velocity contours at various planes for a regenerative media filter vessel including the diffuser illustrated in FIG. 4J.
Figure 30:
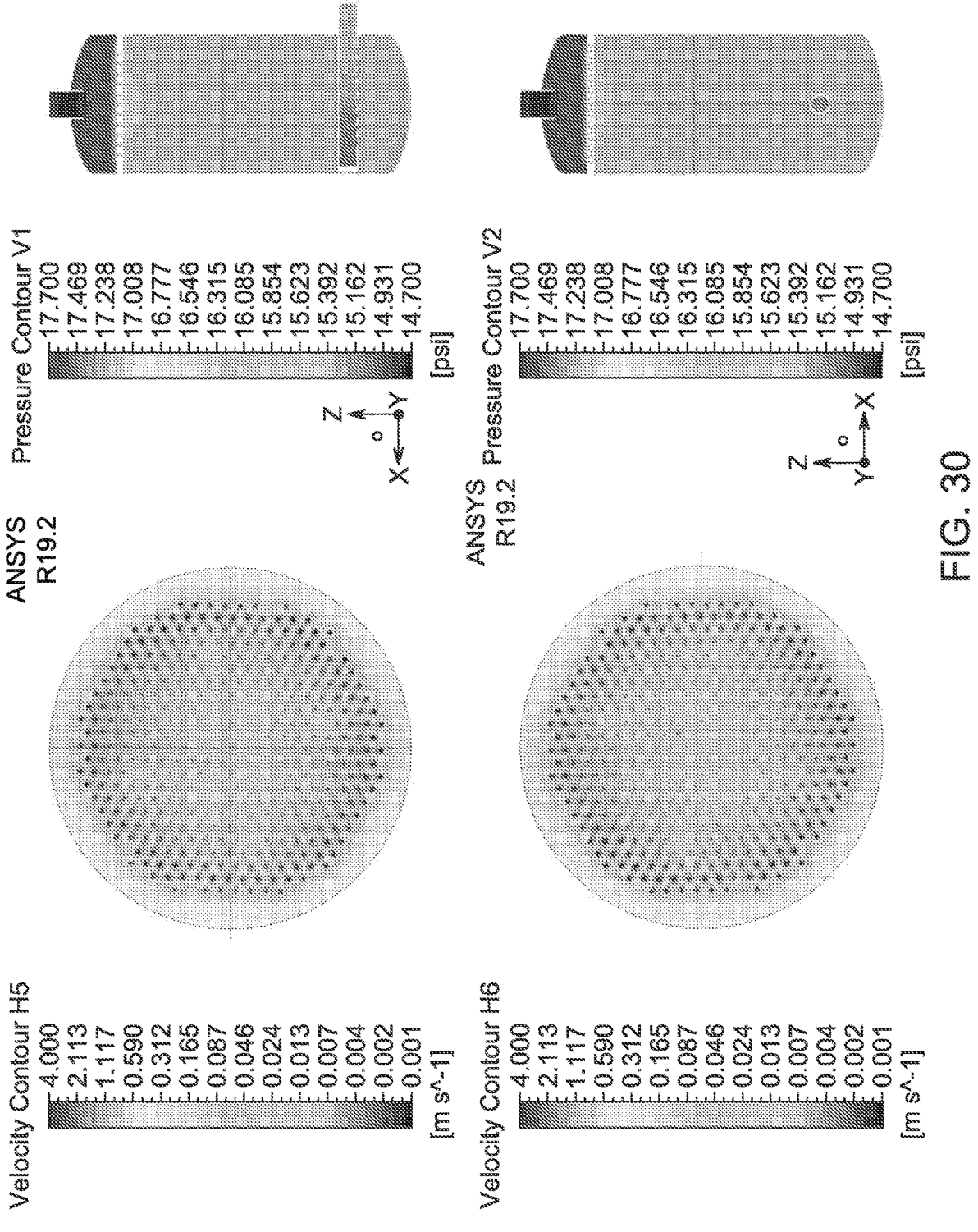
FIG. 30 illustrates flow velocity and fluid pressure contours at various planes for a regenerative media filter vessel including the diffuser illustrated in FIG. 4J.

Fluid flow through each of the diffuser designs illustrated in FIGS. 4A-4J was modeled using a steady and incompressible flow of water into the inlet at 303 gallons per minute with a water temperature of 25° C. (77° F.). The porous media was modeled to represent the fluid resistance created by the cluster to tube elements to the flow. Both the viscous resistance and inertial resistance, as loss coefficients, were calculated for the porous media. The results of the modeling for each diffuser design is illustrated in FIGS. 11-30. In FIGS. 11-30, the velocity contours for each of the six fluid planes labeled in FIG. 10B are shown. The fluid pressure drop measured at planes V1 and V2 is shown for each diffuser illustrated in FIGS. 4A-4J in the even numbered figures beginning at FIG. 12 (that is, FIGS. 12, 14, 16, and so on).

As is seen in FIGS. 11-30, each diffuser design reduced the velocity of water from approximately 4 m/s at the inlet to the regenerative media filter vessel down to approximately 0.3 m/s measured between the tube elements and the outlet of the regenerative media filter vessel and a minimum flow velocity of approximately 0.0013 m/s observed inside the porous media. Each diffuser design further produced a pressure drop of about 3 psi from the inlet to the regenerative media filter vessel to the outlet of the regenerative media filter vessel. What differentiated the diffuser designs is the efficiency of the flow diffusion as measured in plane H2 directly below the plurality of apertures. The H2 velocity contour shown in FIG. 11 for the diffuser illustrated in FIG. 4A having tapered longitudinally extending apertures with the largest overall length indicated that the fluid velocity was close to inlet velocity (that is, 4 m/s) at locations near the inner wall of the regenerative media filter vessel at the end of the diffuser. The H2 velocity contour shown in FIG. 13 for the diffuser illustrated in FIG. 4B having shorter longitudinally extending apertures arranged in parallel indicated that the fluid velocity was close to inlet velocity at locations near the inner wall of the regenerative media filter vessel. The H2 velocity contour shown in FIG. 15 for the diffuser illustrated in FIG. 4C having asymmetrically spaced circular apertures of uniform diameter indicated that the fluid velocity was effectively diffused at points just beyond the apertures with small areas of high velocity between the apertures. The H2 velocity contour shown in FIG. 17 for the diffuser illustrated in FIG. 4D having symmetrically spaced circular apertures of uniform diameter indicated that the fluid velocity was effectively diffused at points just beyond the apertures except at the end of the diffuser. At the end of the diffuser, there were two streams of high velocity fluid flow that penetrated out towards the inner wall of the regenerative media filter vessel. The H2 velocity contour shown in FIG. 19 for the diffuser illustrated in FIG. 4E having rectangular asymmetrically spaced transverse apertures of uniform width indicated that the fluid velocity was effectively diffused at points just beyond the apertures with minimal areas of high velocity between the apertures. The diffuser pattern of FIG. 4E provided for a uniform sweeping flow of water along the curvature of the concave lower portion of the regenerative media filter vessel and had the greatest overall performance of the modeled designs. The H2 velocity contour shown in FIG. 21 for the diffuser illustrated in FIG. 4F having shorter oblong longitudinally extending apertures arranged in parallel and a shorter overall length indicated that the fluid velocity was close to inlet velocity about halfway into the regenerative media filter vessel on either side of the diffuser. The H2 velocity contour shown in FIG. 23 for the diffuser illustrated in FIG. 4G having shorter oblong longitudinally extending apertures arranged in parallel with the internal structure positioned above the apertures indicated that the fluid velocity was effectively diffused at the end of the diffuser closest to the inner wall of the regenerative media filter vessel but not as effectively closest to the connection flange. The H2 velocity contour shown in FIG. 25 for the diffuser illustrated in FIG. 4H having symmetrically spaced circular apertures of decreasing diameter, that is, the diameter of the circular apertures decreased along the length of the diffuser, indicated that the fluid velocity was not significantly reduced directly at the apertures and decreased as fluid entered the vessel. The H2 velocity contours shown in FIGS. 27 and 29 for the diffusers illustrated in FIGS. 4I and 4J, respectively, have rectangular symmetrically spaced transverse apertures of non-uniform width that decreased from the connection flange along the length of the diffuser. As noted herein, the diffuser illustrated in FIG. 4I has a larger inner diameter than the diffuser illustrated in FIG. 4J. For both diffusers, the velocity contours indicated that the fluid velocity was effectively diffused at points just beyond the apertures with minimal areas of high velocity between the apertures. The diameter difference between these diffusers revealed that the narrower diameter of the diffuser of FIG. 4J contributed to the greater calculated flow velocity inside the diffuser, that is, plane V1, illustrated in FIGS. 27 and 29, respectively, for a given flow rate.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A water filtration method comprising the steps of:
providing a regenerative media filter vessel having:
    a cylindrical housing having a sidewall defining an inner diameter, a concave lower portion, and a top cover;
    an inlet extending through the sidewall;
    a diffuser having a plurality of apertures on a lower half thereof fluidly connected to the inlet to direct fluid toward the concave lower portion;
    an outlet extending through the top cover;
    a tube sheet dividing the cylindrical housing into an upper filtrate volume and a lower pre-filter volume;
    a plurality of porous tube elements suspended from the tube sheet;
    a particulate media disposed within the cylindrical housing;
selecting a length of the diffuser, a position of the diffuser, and the inner diameter of the regenerative media filter vessel such that, in operation, the diffuser provides a uniform fluid flow distribution of a flow of water directed into the regenerative media filter vessel, and selecting a ratio of the height to an inner diameter of the regenerative media filter vessel and a radius of curvature of the concave lower portion such that, in operation, the flow of water directed out of the diffuser and into the regenerative media filter vessel has a minimum flow velocity that exceeds a settling velocity of the particulate media in the regenerative media filter vessel;
flowing water into the regenerative media filter vessel through the inlet and diffuser causing the particulate media to coat the porous tube elements forming a coating thereon having a thickness; and
flowing water to be filtered into the regenerative media vessel through the inlet and diffuser after the coating has been formed, with a filtrate passing through the thickness of the coating into an interior of the porous tube elements, into the filtrate volume and out through the outlet, while particles too large to pass through the thickness of the coating are prevented from flowing therethrough.

2. The filtration method of claim 1 wherein, the particulate media is perlite.

3. The filtration method of claim 1 wherein, the particulate media is diatomaceous earth.

4. The filtration method of claim 1 wherein, the coating thickness is 2-5 mm.

5. The filtration method of claim 1 wherein, the coating thickness is approximately 5 mm.

6. The filtration method of claim 1 wherein, the coating prevents particles above ten microns in size from passing therethrough.

7. The filtration method of claim 1 wherein, the coating prevents particles above five microns in size from passing therethrough.

8. The filtration method of claim 1 wherein, the coating prevents particles above three microns in size from passing therethrough.

9. The filtration method of claim 1 wherein, the coating prevents particles above one micron in size from passing therethrough.

10. The filtration method of claim 1 wherein, the water being filtered is from a swimming pool.

* * * * *